(12) United States Patent
Tuffin et al.

(10) Patent No.: US 10,669,484 B2
(45) Date of Patent: Jun. 2, 2020

(54) PROCESS OF PREPARING A LIGHT MODULATION ELEMENT

(71) Applicant: MERCK PATENT GMBH, Darmstadt (DE)

(72) Inventors: Rachel Tuffin, Chandlers Ford (GB); Rebecca Proctor, Southampton (GB); Simon Siemianowski, Darmstadt (DE)

(73) Assignee: MERCK PATENT GMBH, Darmstadt (DE)

(*) Notice: Subject to any disclaimer, the term of this patent is extended or adjusted under 35 U.S.C. 154(b) by 25 days.

(21) Appl. No.: 15/741,383

(22) PCT Filed: Jun. 9, 2016

(86) PCT No.: PCT/EP2016/000947
§ 371 (c)(1),
(2) Date: Jan. 2, 2018

(87) PCT Pub. No.: WO2017/001041
PCT Pub. Date: Jan. 5, 2017

(65) Prior Publication Data
US 2018/0187081 A1     Jul. 5, 2018

(30) Foreign Application Priority Data

Jul. 2, 2015 (EP) .................................. 15001978
Jul. 2, 2015 (EP) .................................. 15001980

(51) Int. Cl.

| C09K 19/54 | (2006.01) |
|---|---|
| C09K 19/06 | (2006.01) |
| C09K 19/32 | (2006.01) |
| G02F 1/137 | (2006.01) |
| G02F 1/139 | (2006.01) |
| C09K 19/02 | (2006.01) |
| B05D 1/00 | (2006.01) |
| B05D 3/02 | (2006.01) |
| B32B 37/12 | (2006.01) |
| C09K 19/30 | (2006.01) |
| C09K 19/34 | (2006.01) |
| C09K 19/20 | (2006.01) |
| C09K 19/12 | (2006.01) |

(52) U.S. Cl.
CPC ............ *C09K 19/542* (2013.01); *B05D 1/005* (2013.01); *B05D 3/0272* (2013.01); *B32B 37/12* (2013.01); *C09K 19/0258* (2013.01); *C09K 19/063* (2013.01); *C09K 19/066* (2013.01); *C09K 19/3003* (2013.01); *C09K 19/32* (2013.01); *G02F 1/137* (2013.01); *G02F 1/1393* (2013.01); *G02F 1/13718* (2013.01); *B32B 2037/1253* (2013.01); *B32B 2457/20* (2013.01); *C09K 2019/122* (2013.01); *C09K 2019/123* (2013.01); *C09K 2019/2078* (2013.01); *C09K 2019/301* (2013.01); *C09K 2019/3004* (2013.01); *C09K 2019/3016* (2013.01); *C09K 2019/3425* (2013.01); *G02F 2001/13775* (2013.01)

(58) Field of Classification Search
CPC .................................................... C09K 19/542
See application file for complete search history.

(56) References Cited

U.S. PATENT DOCUMENTS

| 2002/0085130 | A1* | 7/2002 | Sharma | .................... G01T 1/204 349/1 |
|---|---|---|---|---|
| 2005/0224754 | A1* | 10/2005 | Hirai | .................. C09K 19/2007 252/299.01 |
| 2007/0269613 | A1* | 11/2007 | Chien | .................. C09K 19/544 428/1.1 |
| 2010/0195025 | A1* | 8/2010 | Bauer | .................... G02F 1/1334 349/89 |

OTHER PUBLICATIONS

Coles et al., "Strong flexoelectric behavior in bimesogenic liquid crystals", 2006, J. Appl. Phys., 99, p. 034104. (Year: 2006).*
International Search Report PCT/EP2016/000947 dated Aug. 12, 2016. (WO2017001041A1).
Coles H et al: "Strong flexoelectric behavior in bimesogenic liquid crystals", Journal of Applied Physics, American Institute of Physics, US, vol. 99, No. 3, Feb. 10, 2006 (Feb. 10, 2006), pp. 34104-034104, XP012083744, ISSN: 0021-8979.

* cited by examiner

*Primary Examiner* — Robert A Vetere
(74) *Attorney, Agent, or Firm* — Millen White Zelano and Branigan, PC; Csaba Henter

(57) ABSTRACT

The present invention relates to a process of preparing a light modulation element of the PS-ULH (polymer stabilised ULH) type, which allows to reduce the operational voltage and allows to improve the switching time of the light modulation element.

16 Claims, No Drawings

PROCESS OF PREPARING A LIGHT MODULATION ELEMENT

FIELD OF THE INVENTION

The present invention relates to a process of preparing a liquid crystal light modulation element of the PS-ULH (polymer stabilised ULH) type, which allows to reduce the operational voltage and allows to improve the switching time of the light modulation element.

BACKGROUND AND PRIOR ART

Liquid Crystal Displays (LCDs) are widely used to display information. LCDs are used for direct view displays, as well as for projection type displays. The electro-optical mode, which is employed for most displays, still is the twisted nematic (TN)-mode with its various modifications. Besides this mode, the super twisted nematic (STN)-mode and more recently the optically compensated bend (OCB)-mode and the electrically controlled birefringence (ECB)-mode with their various modifications, as e.g. the vertically aligned nematic (VAN), the patterned ITO vertically aligned nematic (PVA)-, the polymer stabilized vertically aligned nematic (PSVA)-mode and the multi domain vertically aligned nematic (MVA)-mode, as well as others, have been increasingly used. All these modes use an electrical field, which is substantially perpendicular to the substrates, respectively to the liquid crystal layer. Besides these modes there are also electro-optical modes employing an electrical field substantially parallel to the substrates, respectively the liquid crystal layer, like e.g. the In Plane Switching (short IPS) mode (as disclosed e.g. in DE 40 00 451 and EP 0 588 568) and the Fringe Field Switching (FFS) mode. Especially the latter mentioned electro-optical modes, which have good viewing angle properties and improved response times, are increasingly used for LCDs for modern desktop monitors and even for displays for TV and for multimedia applications and thus are competing with the TN-LCDs.

Further to these displays, new display modes using cholesteric liquid crystals having a relatively short cholesteric pitch have been proposed for use in displays exploiting the so-called "flexoelectric" effect, which is described inter alia by Meyer et al., Liquid Crystals 1987, 58, 15; Chandrasekhar, "Liquid Crystals", 2nd edition, Cambridge University Press (1992); and P. G. deGennes et al., "The Physics of Liquid Crystals", 2nd edition, Oxford Science Publications (1995).

Displays exploiting flexoelectric effect are generally characterized by fast response times typically ranging from 500 µs to 3 ms and further feature excellent grey scale capabilities.

In these displays, the cholesteric liquid crystals are e.g. oriented in the "uniformly lying helix" arrangement (ULH), which also give this display mode its name. For this purpose, a chiral substance, which is mixed with a nematic material, induces a helical twist whilst transforming the material into a chiral nematic material, which is equivalent to a cholesteric material.

The uniform lying helix texture is realized using a chiral nematic liquid crystal with a short pitch, typically in the range from 0.2 µm to 2 µm, preferably of 1.5 µm or less, in particular of 1.0 µm or less, which is unidirectional aligned with its helical axis parallel to the substrates of a liquid crystal cell. In this configuration, the helical axis of the chiral nematic liquid crystal is equivalent to the optical axis of a birefringent plate.

If an electrical field is applied to this configuration normal to the helical axis, the optical axis is rotated in the plane of the cell, similar as the director of a ferroelectric liquid crystal rotate as in a surface stabilized ferroelectric liquid crystal display.

The field induces a splay bend structure in the director, which is accommodated by a tilt in the optical axis. The angle of the rotation of the axis is in first approximation directly and linearly proportional to the strength of the electrical field. The optical effect is best seen when the liquid crystal cell is placed between crossed polarizers with the optical axis in the unpowered state at an angle of 22.5° to the absorption axis of one of the polarizers. This angle of 22.5° is also the ideal angle of rotation of the electric field, as thus, by the inversion the electrical field, the optical axis is rotated by 45° and by appropriate selection of the relative orientations of the preferred direction of the axis of the helix, the absorption axis of the polarizer and the direction of the electric field, the optical axis can be switched from parallel to one polarizer to the center angle between both polarizers. The optimum contrast is then achieved when the total angle of the switching of the optical axis is 45°. In that case, the arrangement can be used as a switchable half wave plate, provided the optical retardation, i.e. the product of the effective birefringence of the liquid crystal and the cell gap, is selected to be the quarter of the wavelength. In this context, the wavelength referred to is 550 nm, the wavelength for which the sensitivity of the human eye is highest.

The angle of rotation of the optical axis ($\Phi$) is given in good approximation by formula (1)

$$\tan \Phi = \bar{e} P_0 E / (2\pi K) \tag{1}$$

wherein $P_0$ is the undisturbed pitch of the cholesteric liquid crystal,
$\bar{e}$ is the average $[\bar{e}=\frac{1}{2}(e_{splay}+e_{bend})]$ of the splay flexoelectric coefficient ($e_{splay}$) and the bend flexoelectric coefficient ($e_{bend}$),
E is the electrical field strength and
K is the average $[K=\frac{1}{2}(k_{11}+k_{33})]$ of the splay elastic constant ($k_{11}$) and the bend elastic constant ($K_{33}$)
and wherein
$\bar{e}/K$ is called the flexo-elastic ratio.

This angle of rotation is half the switching angle in a flexoelectric switching element.

The response time ($\tau$) of this electro-optical effect is given in good approximation by formula (2)

$$\tau = [P_0/(2\pi)]^2 \cdot \gamma / K \tag{2}$$

wherein
$\gamma$ is the effective viscosity coefficient associated with the distortion of the helix.

There is a critical field ($E_c$) to unwind the helix, which can be obtained from equation (3)

$$E_c = (\pi^2/P_0) \cdot [k_{22}/(\varepsilon_0 \cdot \Delta\varepsilon)]^{1/2} \tag{3}$$

wherein
$k_{22}$ is the twist elastic constant,
$\varepsilon_0$ is the permittivity of vacuum and
$\Delta\varepsilon$ is the dielectric anisotropy of the liquid crystal.

At higher electric fields, when the dielectric coupling becomes strong, the helix could be partially or completely unwound depending on the magnitude of the applied voltage. If the cholesteric liquid crystal possesses a positive dielectric anisotropy sD«.0d, the unwound state will be homeotropic and thus totally black when the cell is placed between crossed polarizers. The helix unwinding is a quadratic effect in contrast to the flexoelectro-optic effect which is a polar and linear effect. It should be noted that the helix unwinding by the applied electric field usually destroys irreversibly the ULH texture thus resulting in deterioration of the flexoelectro-optic mode of the device. In order to be practical, an electro-optic device based on the flexoelectrooptic effect must withstand a large temperature and field variation and still work functionally. This means, that such a device requires a stable ULH texture which after unwinding by the applied electric field, for instance, will be able to recover completely after switching off the field. The same should be valid for exposing the sample to high temperatures.

A further development are the so-called PS (polymer stabilised) displays. In these, a small amount of a polymerisable compound is added to the LC medium and, after introduction into the LC cell, is polymerised or crosslinked in situ, usually by UV photopolymerisation. The addition of polymerisable mesogenic or liquid-crystalline compounds, also known as "reactive mesogens" (RMs), to the LC mixture has proven particularly suitable in order to stabilize the ULH texture.

PS-ULH displays are described, for example, in WO 2005/072460 A2, U.S. Pat. No. 8,081,272 B2 or in Komitov et al. Appl. Phys. Lett. 2005, 86, 161118.

However, all attempts are connected with an increase of the operational voltage and a reduction of the switching speed.

Thus, one aim of the invention is to provide an alternative or preferably improved process of preparing a liquid crystal (LC) light modulation elements of the PS-ULH (polymer stabilised ULH) type, which does not have the drawbacks of the prior art, and preferably have the advantages mentioned above and below.

These advantages are amongst others favourable high switching angles, favorable fast response times, favorable low voltage required for addressing, compatible with common driving electronics, and finally, a favorable really dark "off state", which should be achieved by an long term stable alignment of the ULH texture.

Other aims of the present invention are immediately evident to the person skilled in the art from the following detailed description.

Surprisingly, the inventors have found out that one or more of the above-defined aims can be achieved by providing process as defined in claim 1.

SUMMARY OF THE INVENTION

The invention relates to a process of preparing a light modulation element comprising the steps of a) providing a layer of a liquid crystal medium comprising one or more bimesogenic compounds, one or more chiral compounds, and one or more polymerisable compounds between two substrates, wherein at least one substrate is transparent to light and electrodes are provided on both sides of the opposing substrates, b) heating liquid crystal medium to its isotropic phase, c) cooling the liquid crystal medium up to 10° or less below the clearing point while applying voltage between the electrodes, which is sufficient to switch the liquid crystal medium between switched states, d) exposing said layer of a liquid crystal medium to photoradiation that induces photopolymerisation of the polymerisable compounds while applying voltage between the electrodes.

The light modulation element is preferably a PS-display, particularly preferably a, PS-ULH.

Terms and Definitions

The following meanings apply above and below:

The term "liquid crystal", "mesomorphic compound", or "mesogenic compound" (also shortly referred to as "mesogen") means a compound that under suitable conditions of temperature, pressure and concentration can exist as a mesophase (nematic, smectic, etc.) or in particular as a LC phase. Non-amphiphilic mesogenic compounds comprise for example one or more calamitic, banana-shaped or discotic mesogenic groups.

The term "mesogenic group" means in this context, a group with the ability to induce liquid crystal (LC) phase behaviour. The compounds comprising mesogenic groups do not necessarily have to exhibit an LC phase themselves. It is also possible that they show LC phase behaviour only in mixtures with other compounds. For the sake of simplicity, the term "liquid crystal" is used hereinafter for both mesogenic and LC materials.

Throughout the application, the term "aryl and heteroaryl groups" encompass groups, which can be monocyclic or polycyclic, i.e. they can have one ring (such as, for example, phenyl) or two or more rings, which may also be fused (such as, for example, naphthyl) or covalently linked (such as, for example, biphenyl), or contain a combination of fused and linked rings. Heteroaryl groups contain one or more heteroatoms, preferably selected from O, N, S and Se. Particular preference is given to mono-, bi- or tricyclic aryl groups having 6 to 25 C atoms and mono-, bi- or tricyclic heteroaryl groups having 2 to 25 C atoms, which optionally contain fused rings, and which are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another. Preferred aryl groups are, for example, phenyl, biphenyl, terphenyl, [1,1':3',1"]terphenyl-2'-yl, naphthyl, anthracene, binaphthyl, phenanthrene, pyrene, dihydropyrene, chrysene, perylene, tetracene, pentacene, benzopyrene, fluorene, indene, indenofluorene, spirobifluorene, more preferably 1,4-phenylene, 4,4'-biphenylene, 1,4-tephenylene.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiadiazothiophene, or combinations of these groups. The heteroaryl groups may also be substituted by alkyl, alkoxy, thioalkyl, fluorine, fluoroalkyl or further aryl or heteroaryl groups.

In the context of this application, the term "(non-aromatic) alicyclic and heterocyclic groups" encompass both saturated rings, i.e. those that contain exclusively single bonds, and partially unsaturated rings, i.e. those that may also contain multiple bonds. Heterocyclic rings contain one or more heteroatoms, preferably selected from Si, O, N, S and Se. The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 3 to 25 C atoms, which optionally contain fused rings and that are optionally substituted. Preference is furthermore given to 5-, 6-, 7- or 8-membered carbocyclic groups in which, in addition, one or more C atoms may be replaced by Si and/or one or more CH groups may be replaced by N and/or one or more non-adjacent $CH_2$ groups may be replaced by —O— and/or —S—. Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]pentane-1,3-diyl, bicyclo[2.2.2]octane-1,4-diyl, spiro[3.3]heptane-2,6-diyl, octahydro-4,7-methanoindane-2,5-diyl, more preferably 1,4-cyclohexylene 4,4'-bicyclohexylene, 3,17-hexadecahydro-cyclopenta[a]phenanthrene, optionally being substituted by one or more identical or different groups L.

Especially preferred aryl-, heteroaryl-, alicyclic- and heterocyclic groups are 1,4-phenylene, 4,4'-biphenylene, 1,4-terphenylene, 1,4-cyclohexylene, 4,4'-bicyclohexylene, and 3,17-hexadecahydro-cyclopenta[a]-phenanthrene, optionally being substituted by one or more identical or different groups L.

Preferred substituents (L) of the above-mentioned aryl-, heteroaryl-, alicyclic- and heterocyclic groups are, for example, solubility-promoting groups, such as alkyl or alkoxy and electron-withdrawing groups, such as fluorine, nitro or nitrile. Particularly preferred substituents are, for example, F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$ or $OC_2F_5$.

Above and below "halogen" denotes F, Cl, Br or I.

Above and below, the terms "alkyl", "aryl", "heteroaryl", etc., also encompass polyvalent groups, for example alkylene, arylene, heteroarylene, etc. The term "aryl" denotes an aromatic carbon group or a group derived there from. The term "heteroaryl" denotes "aryl" in accordance with the above definition containing one or more heteroatoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclo-pentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoro-methyl, perfluoro-n-butyl, 2,2,2-trifluoroethyl, perfluorooctyl, perfluoro-hexyl, etc.

Preferred alkoxy groups are, for example, methoxy, ethoxy, 2-methoxy-ethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl.

Preferred alkynyl groups are, for example, ethynyl, propynyl, butynyl, pentynyl, hexynyl, octynyl.

Preferred amino groups are, for example, dimethylamino, methylamino, methylphenylamino, phenylamino.

The term "chiral" in general is used to describe an object that is non-superimposable on its mirror image.

"Achiral" (non-chiral) objects are objects that are identical to their mirror image.

The terms "chiral nematic" and "cholesteric" are used synonymously in this application, unless explicitly stated otherwise.

The pitch induced by the chiral substance ($P_0$) is in a first approximation inversely proportional to the concentration (c) of the chiral material used. The constant of proportionality of this relation is called the helical twisting power (HTP) of the chiral substance and defined by equation (4)

$$HTP \equiv 1/(c \cdot P_0) \quad (4)$$

wherein
c is concentration of the chiral compound.

The term "bimesogenic compound" relates to compounds comprising two mesogenic groups in the molecule. Just like normal mesogens, they can form many mesophases, depending on their structure. In particular, bimesogenic compound may induce a second nematic phase, when added to a nematic liquid crystal medium. Bimesogenic compounds are also known as "dimeric liquid crystals".

The term "alignment" or "orientation" relates to alignment (orientation ordering) of anisotropic units of material such as small molecules or fragments of big molecules in a common direction named "alignment direction". In an aligned layer of liquid-crystalline material, the liquid-crystalline director coincides with the alignment direction so that the alignment direction corresponds to the direction of the anisotropy axis of the material.

The term "planar orientation/alignment", for example in a layer of an liquid-crystalline material, means that the long molecular axes (in case of calamitic compounds) or the short molecular axes (in case of discotic compounds) of a proportion of the liquid-crystalline molecules are oriented substantially parallel (about 180°) to the plane of the layer.

The term "homeotropic orientation/alignment", for example in a layer of a liquid-crystalline material, means that the long molecular axes (in case of calamitic compounds) or the short molecular axes (in case of discotic compounds) of a proportion of the liquid-crystalline molecules are oriented at an angle θ ("tilt angle") between about 80° to 90° relative to the plane of the layer.

The wavelength of light generally referred to in this application is 550 nm, unless explicitly specified otherwise.

The birefringence Δn herein is defined in equation (5)

$$\Delta n = n_e - n_o \quad (5)$$

wherein $n_e$ is the extraordinary refractive index and $n_o$ is the ordinary refractive index, and the average refractive index $n_{av.}$ is given by the following equation (6).

$$n_{av.} = [(2n_o^2 + n_e^2)/3]^{1/2} \quad (6)$$

The extraordinary refractive index $n_e$ and the ordinary refractive index $n_o$ can be measured using an Abbe refractometer. Δn can then be calculated from equation (5).

In the present application the term "dielectrically positive" is used for compounds or components with $\Delta\varepsilon>3.0$, "dielectrically neutral" with $-1.5\leq\Delta\varepsilon\leq3.0$ and "dielectrically negative" with $\Delta\varepsilon<-1.5$. $\Delta\varepsilon$ is determined at a frequency of 1 kHz and at 20° C. The dielectric anisotropy of the respective compound is determined from the results of a solution of 10 of the respective individual compound in a nematic host mixture. In case the solubility of the respective compound in the host medium is less than 10% its concentration is reduced by a factor of 2 until the resultant medium is stable enough at least to allow the determination of its properties. Preferably, the concentration is kept at least at 5%, however, in order to keep the significance of the results a high as possible. The capacitance of the test mixtures are determined both in a cell with homeotropic and with homogeneous alignment. The cell gap of both types of cells is approximately 20 μm. The voltage applied is a rectangular wave with a frequency of 1 kHz and a root mean square value typically of 0.5 V to 1.0 V, however, it is always selected to be below the capacitive threshold of the respective test mixture.

$\Delta\varepsilon$ is defined as $(\varepsilon_{\parallel}-\varepsilon_{\perp})$, whereas $\varepsilon_{av.}$ is $(\varepsilon_{\parallel}+2\varepsilon_{\perp})/3$.

The dielectric permittivity of the compounds is determined from the change of the respective values of a host medium upon addition of the compounds of interest. The values are extrapolated to a concentration of the compounds of interest of 100%. The host mixture is disclosed in H. J. Coles et al., J. Appl. Phys. 2006, 99, 034104 and has the composition given in the table 1.

TABLE 1

Host mixture composition

| Compound | Concentration |
|---|---|
| F-PGI-ZI-9-ZGP-F | 25% |
| F-PGI-ZI-11-ZGP-F | 25% |
| FPGI-O-5-O-PP-N | 9.5% |
| FPGI-O-7-O-PP-N | 39% |
| CD-1 | 1.5% |

Furthermore, the definitions as given in C. Tschierske, G. Pelzl and S. Diele, Angew. Chem. 2004, 116, 6340-6368 shall apply to non-defined terms related to liquid crystal materials in the instant application.

DETAILED DESCRIPTION OF THE INVENTION

In a preferred embodiment of the invention the utilized substrates are substantially transparent. Transparent materials suitable for the purpose of the present invention are commonly known by the skilled person. In accordance with the invention, the substrates may consist, inter alia, each and independently from another of a polymeric material, of metal oxide, for example ITO and of glass or quartz plates, preferably each and independently of another of glass and/or ITO, in particular glass/glass.

Suitable and preferred polymeric substrates are for example films of cyclo olefin polymer (COP), cyclic olefin copolymer (COC), polyester such as polyethyleneterephthalate (PET) or polyethylene-naphthalate (PEN), polyvinylalcohol (PVA), polycarbonate (PC) or triacetylcellulose (TAC), very preferably PET or TAC films. PET films are commercially available for example from DuPont Teijin Films under the trade name Melinex®. COP films are commercially available for example from ZEON Chemicals L.P. under the trade name Zeonor® or Zeonex®. COC films are commercially available for example from TOPAS Advanced Polymers Inc. under the trade name Topas®.

The substrate layers can be kept at a defined separation from one another by, for example, spacers, or projecting structures in the layer. Typical spacer materials are commonly known to the expert and are selected, for example, from plastic, silica, epoxy resins, etc.

In a preferred embodiment, the substrates are arranged with a separation in the range from approximately 1 μm to approximately 50 μm from one another, preferably in the range from approximately 1 μm to approximately 25 μm from one another, and more preferably in the range from approximately 1 μm to approximately 15 μm from one another. The layer of the cholesteric liquid-crystalline medium is thereby located in the interspace.

The light modulation element in accordance with the present invention comprises electrode structure each provided directly on the opposing substrates, which are capable to allow the application of an electric field, which is substantially perpendicular to the substrates or the liquid-crystalline medium layer.

Suitable transparent electrode materials are commonly known to the expert, as for example electrode structures made of metal or metal oxides, such as, for example transparent indium tin oxide (ITO), which is preferred according to the present invention.

Thin films of ITO are commonly deposited on substrates by physical vapour deposition, electron beam evaporation, or sputter deposition techniques.

In a preferred embodiment, the light modulation element comprises at least one dielectric layer, which is provided on the electrode structure.

In another preferred embodiment, the light modulation element comprises at least two dielectric layers, which are provided on the opposing electrode structures.

Typical dielectric layer materials are commonly known to the expert, such as, for example, SiOx, SiNx, Cytop, Teflon, and PMMA.

The dielectric layer materials can be applied onto the substrate or electrode layer by conventional coating techniques like spin coating, roll-coating, blade coating, or vacuum deposition such as PVD or CVD. It can also be applied to the substrate or electrode layer by conventional printing techniques which are known to the expert, like for example screen printing, offset printing, reel-to-reel printing, letter press printing, gravure printing, rotogravure printing, flexographic printing, intaglio printing, pad printing, heat-seal printing, ink-jet printing or printing by means of a stamp or printing plate.

In further preferred embodiment at least one alignment layer is provided on the electrode structure.

In another preferred embodiment, the light modulation element comprises at least two alignment layers, which are provided on the opposing electrode structures.

Preferably the alignment layer induces a homeotropic alignment, tilted homeotropic or planar alignment to the adjacent liquid crystal molecules, and which is provided on the common electrode structure and/or alignment electrode structure as described above.

Preferably, the alignment layer(s) is/are made of homeotropic alignment layer materials, which are commonly known to the expert, such as, for example, layers made of alkoxysilanes, alkyltrichlorosilanes, CTAB, lecithin or polyimides, such as for example SE-5561, commercially available for example from Nissan, or AL-3046, 5561 commercially available for example from JSR Corporation.

The alignment layer materials can be applied onto the substrate array or electrode structure by conventional coating techniques like spin coating, roll-coating, dip coating or blade coating. It can also be applied by vapour deposition or conventional printing techniques which are known to the expert, like for example screen printing, offset printing, reel-to-reel printing, letter press printing, gravure printing, rotogravure printing, flexographic printing, intaglio printing, pad printing, heat-seal printing, ink-jet printing or printing by means of a stamp or printing plate.

If two alignment layers are present, which are each provided on opposing common electrode structure and/or alignment electrode structures, it is likewise preferred, that the rubbing direction of one of the alignment layers is preferably in the range of +/−45°, more preferably in the range of +/−20°, even more preferably in the range of +/−10, and in particular in the range of the direction +/−5° with respect to the longitudinal axis of the stripe pattern of the alignment electrode structure or the length of the stripes and the rubbing direction of the opposing alignment layer is substantially antiparallel.

The term "substantially antiparallel" encompasses also rubbing directions having small deviations in their antiparallelism to each other, such as deviations less than 10°, preferably less than 5°, in particular less than 2° with respect to their orientation to each other.

Further suitable methods to achieve homeotropic alignment are described for example in J. Cognard, Mol. Cryst. Liq. Cryst. 78, Supplement 1, 1-77 (1981).

In a further preferred embodiment, the alignment layer substitutes the dielectric layer and the alignment layer is provided on electrode structure.

In a preferred embodiment, the alignment layer are preferably rubbed by rubbing techniques known to the skilled person in the art.

In a preferred embodiment of the invention, the light modulation element comprises two or more polarisers, at least one of which is arranged on one side of the layer of the liquid-crystalline medium and at least one of which is arranged on the opposite side of the layer of the liquid-crystalline medium. The layer of the liquid-crystalline medium and the polarisers here are preferably arranged parallel to one another.

The polarisers can be linear polarisers. Preferably, precisely two polarisers are present in the light modulation element. In this case, it is furthermore preferred for the polarisers either both to be linear polarisers. If two linear polarisers are present in the light modulation element, it is preferred in accordance with the invention for the polarisation directions of the two polarisers to be crossed.

It is furthermore preferred in the case where two circular polarisers are present in the light modulation element for these to have the same polarisation direction, i.e. either both are right-hand circular-polarised or both are left-hand circular-polarised.

The polarisers can be reflective or absorptive polarisers. A reflective polariser in the sense of the present application reflects light having one polarisation direction or one type of circular-polarised light, while being transparent to light having the other polarisation direction or the other type of circular-polarised light. Correspondingly, an absorptive polariser absorbs light having one polarisation direction or one type of circular-polarised light, while being transparent to light having the other polarisation direction or the other type of circular-polarised light. The reflection or absorption is usually not quantitative; meaning that complete polarisation of the light passing through the polariser does not take place.

For the purposes of the present invention, both absorptive and reflective polarisers can be employed. Preference is given to the use of polarisers, which are in the form of thin optical films. Examples of reflective polarisers which can be used in the light modulation element according to the invention are DRPF (diffusive reflective polariser film, 3M), DBEF (dual brightness enhanced film, 3M), DBR (layered-polymer distributed Bragg reflectors, as described in U.S. Pat. Nos. 7,038,745 and 6,099,758) and APF (advanced polariser film, 3M).

Examples of absorptive polarisers, which can be employed in the light modulation elements according to the invention, are the Itos XP38 polariser film and the Nitto Denko GU-1220DUN polariser film. An example of a circular polariser, which can be used in accordance with the invention, is the APNCP37-035-STD polariser (American Polarizers). A further example is the CP42 polariser (ITOS).

The light modulation element may furthermore comprise filters, which block light of certain wavelengths, for example, UV filters. In accordance with the invention, further functional layers commonly known to the expert may also be present, such as, for example, protective films and/or compensation films.

Suitable cholesteric liquid crystalline media for the light modulation element according to the present invention are commonly known by the expert and typically comprise at least one bimesogenic compound and at least one chiral compound.

In view of the bimesogenic compounds for the ULH-mode, the Coles group published a paper (Coles et al., 2012 (Physical Review E 2012, 85, 012701)) on the structure-property relationship for dimeric liquid crystals.

Further bimesogenic compounds are known in general from prior art (cf. also Hori, K., Limuro, M., Nakao, A., Toriumi, H., J. Mol. Struc. 2004, 699, 23-29 or GB 2 356 629).

Symmetrical dimeric compounds showing liquid crystalline behaviour are further disclosed in Joo-Hoon Park et al. "Liquid Crystalline Properties of Dimers Having o-, m- and p- Positional Molecular structures", Bill. Korean Chem. Soc., 2012, Vol. 33, No. 5, pp. 1647-1652.

Similar liquid crystal compositions with short cholesteric pitch for flexoelectric devices are known from EP 0 971 016, GB 2 356 629 and Coles, H. J., Musgrave, B., Coles, M. J., and Willmott, J., J. Mater. Chem., 11, p. 2709-2716 (2001). EP 0 971 016 reports on mesogenic estradiols, which, as such, have a high flexoelectric coefficient.

Typically, for light modulation elements utilizing the ULH mode the optical retardation $d*\Delta n$ (effective) of the cholesteric liquid-crystalline medium should preferably be such that the equation (7)

$$\sin 2(\pi \cdot d \cdot \Delta n/\lambda)=1 \qquad (7)$$

wherein
d is the cell gap and
$\lambda$ is the wavelength of light
is satisfied. The allowance of deviation for the right hand side of equation is +/−3%.

The dielectric anisotropy ($\Delta\varepsilon$) of a suitable cholesteric liquid-crystalline medium should be chosen in that way that unwinding of the helix upon application of the addressing voltage is prevented. Typically, $\Delta\varepsilon$ of a suitable liquid crystalline medium is preferably higher than −5, and more preferably 0 or more, but preferably 10 or less, more preferably 5 or less and most preferably 3 or less.

The utilized cholesteric liquid-crystalline medium preferably have a clearing point of approximately 65° C. or more, more preferably approximately 70° C. or more, still more preferably 80° C. or more, particularly preferably approximately 85° C. or more and very particularly preferably approximately 90° C. or more.

The nematic phase of the utilized cholesteric liquid-crystalline medium according to the invention preferably extends at least from approximately 0° C. or less to approximately 65° C. or more, more preferably at least from approximately −20° C. or less to approximately 70° C. or more, very preferably at least from approximately −30° C. or less to approximately 70° C. or more and in particular at least from approximately −40° C. or less to approximately 90° C. or more. In individual preferred embodiments, it may be necessary for the nematic phase of the media according to the invention to extend to a temperature of approximately 100° C. or more and even to approximately 110° C. or more.

Typically, the cholesteric liquid-crystalline medium utilized in a light modulation element in accordance with the present invention comprises one or more bimesogenic compounds which are preferably selected from the group of compounds of formulae A-I to A-III,

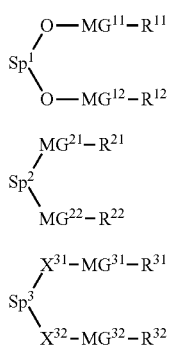

and wherein
$R^{11}$ and $R^{12}$,
$R^{21}$ and $R^{22}$,
and $R^{31}$ and $R^{32}$ are each independently H, F, Cl, CN, NCS or a straight-chain or branched alkyl group with 1 to 25 C atoms which may be unsubstituted, mono- or polysubstituted by halogen or CN, it being also possible for one or more non-adjacent $CH_2$ groups to be replaced, in each occurrence independently from one another, by —O—, —S—, —NH—, —N($CH_3$)—, —CO—, —COO—, —OCO—, —O—CO—O—, —S—CO—, —CO—S—, —CH=CH—, —CH=CF—, —CF=CF— or —C≡C— in such a manner that oxygen atoms are not linked directly to one another,
$MG^{11}$ and $MG^{12}$,
$MG^{21}$ and $MG^{22}$,
and $MG^{31}$ and $MG^{32}$ are each independently a mesogenic group,
$Sp^1$, $Sp^2$ and $Sp^3$ are each independently a spacer group comprising 5 to 40 C atoms, wherein one or more non-adjacent $CH_2$ groups, with the exception of the $CH_2$ groups of $Sp^1$ linked to O-$MG^{11}$ and/or O-$MG^{12}$, of $Sp^2$ linked to $MG^{21}$ and/or $MG^{22}$ and of $Sp^3$ linked to $X^{31}$ and $X^{32}$, may also be replaced by —O—, —S—, —NH—, —N($CH_3$)—, —CO—, —O—CO—, —S—CO—, —O—COO—, —CO—S—, —CO—O—, —CH (halogen)-, —CH (CN)—, —CH=CH— or —C≡C—, however in such a way that no two O-atoms are adjacent to one another, no two —CH=CH— groups are adjacent to each other, and no two groups selected from —O—CO—, —S—CO—, —O—COO—, —CO—S—, —CO—O— and —CH=CH— are adjacent to each other and $X^{31}$ and $X^{32}$ are independently from one another a linking group selected from —CO—O—, —O—CO—, —CH=CH—, —C≡C— or —S—, and, alternatively, one of them may also be either —O— or a single bond, and, again alternatively, one of them may be —O— and the other one a single bond.

Preferably used are compounds of formulae A-I to A-III wherein
$Sp^1$, $Sp^2$ and $Sp^3$ are each independently —$(CH_2)_n$— with n is an integer from 1 to 15, most preferably an uneven integer, wherein one or more —$CH_2$— groups may be replaced by —CO—.

Especially preferably used are compounds of formula A-III wherein
—$X^{31}$—$Sp^3$-$X^{32}$— is —$Sp^3$-O—, —$Sp^3$-CO—O—, —$Sp^3$-O—CO—, —O—$Sp^3$-, —O—$Sp^3$-CO—O—, —O—$Sp^3$-O—CO—, —O—CO—$Sp^3$-O—, —O—CO—$Sp^3$-O—CO—, —CO—O—$Sp^3$-O— or —CO—O—$Sp^3$-CO—O—, however under the condition that in —$X^{31}$—$Sp^3$-$X^{32}$— no two O-atoms are adjacent to one another, no two —CH=CH— groups are adjacent to each other and no two groups selected from —O—CO—, —S—CO—, —O—COO—, —CO—S—, —CO—O— and
—CH=CH— are adjacent to each other.

Preferably used are compounds of formula A-I in which $MG^{11}$ and $MG^{12}$ are independently from one another -$A^{11}$-$(Z^1$-$A^{12})_m$-
wherein
$Z^1$ is —COO—, —OCO—, —O—CO—O—, —OCH$_2$—, —CH$_2$O—, —CH$_2$CH$_2$—, —$(CH_2)_4$—, —CF$_2$CF$_2$—, —CH=CH—, —CF=CF—, —CH=CH—COO—, —OCO—CH=CH—, —C≡C— or a single bond,
$A^{11}$ and $A^{12}$ are each independently in each occurrence 1,4-phenylene, wherein in addition one or more CH groups may be replaced by N, trans-1,4-cyclo-hexylene in which, in addition, one or two non-adjacent $CH_2$ groups may be replaced by O and/or S, 1,4-cyclohexenylene, 1,4-bicyclo-(2,2,2)-octylene, piperidine-1,4-diyl, naphthalene-2,6-diyl, decahydro-naphthalene-2,6-diyl, 1,2,3,4-tetrahydro-naphthalene-2,6-diyl, cyclobutane-1,3-diyl, spiro[3.3]heptane-2,6-diyl or dispiro[3.1.3.1]decane-2,8-diyl, it being possible for all these groups to be unsubstituted, mono-, di-, tri- or tetrasubstituted with F, Cl, CN or alkyl, alkoxy, alkylcarbonyl or alkoxycarbonyl groups with 1 to 7 C atoms, wherein one or more H atoms may be substituted by F or Cl, and
m is 0, 1, 2 or 3.

Preferably used are compounds of formula A-II in which $MG^{21}$ and $MG^{22}$ are independently from one another -$A^{21}$-$(Z^2$-$A^{22})_m$-
wherein
$Z^2$ is —COO—, —OCO—, —O—CO—O—, —OCH$_2$—, —CH$_2$O—, —CH$_2$CH$_2$—, —$(CH_2)_4$—, —CF$_2$CF$_2$—, —CH=CH—, —CF=CF—, —CH=CH—COO—, —OCO—CH=CH—, —C≡C— or a single bond,
$A^{21}$ and $A^{22}$ are each independently in each occurrence 1,4-phenylene, wherein in addition one or more CH groups may be replaced by N, trans-1,4-cyclo-hexylene in which, in addition, one or two non-adjacent CH₂ groups may be replaced by O and/or S, 1,4-cyclohexenylene, 1,4-bicyclo-(2,2,2)-octylene, piperidine-1,4-diyl, naphthalene-2,6-diyl, decahydro-naphthalene-2,6-diyl, 1,2,3,4-tetrahydro-naphthalene-2,6-diyl, cyclobutane-1,3-diyl, spiro[3.3]heptane-2,6-diyl or dispiro[3.1.3.1]decane-2,8-diyl, it being possible for all these groups to be unsubstituted, mono-, di-, tri- or tetrasubstituted with F, Cl, CN or alkyl, alkoxy, alkylcarbonyl or alkoxycarbonyl groups with 1 to 7 C atoms, wherein one or more H atoms may be substituted by F or Cl, and m is 0, 1, 2 or 3.

Most preferably used are compounds of formula A-III in which $MG^{31}$ and $MG^{32}$ are independently from one another -$A^{31}$-$(Z^3-A^{32})_m$- wherein $Z^3$ is —COO—, —OCO—, —O—CO—O—, —OCH₂—, —CH₂O—, —CH₂CH₂—, —(CH₂)₄—, —CF₂CF₂—, —CH═CH—, —CF═CF—, —CH═CH—COO—, —OCO—CH═CH—, —C≡C— or a single bond, $A^{31}$ and $A^{32}$ are each independently in each occurrence 1,4-phenylene, wherein in addition one or more CH groups may be replaced by N, trans-1,4-cyclo-hexylene in which, in addition, one or two non-adjacent CH₂ groups may be replaced by O and/or S, 1,4-cyclohexenylene, 1,4-bicyclo-(2,2,2)-octylene, piperidine-1,4-diyl, naphthalene-2,6-diyl, decahydro-naphthalene-2,6-diyl, 1,2,3,4-tetrahydro-naphthalene-2,6-diyl, cyclobutane-1,3-diyl, spiro[3.3]heptane-2,6-diyl or dispiro[3.1.3.1]decane-2,8-diyl, it being possible for all these groups to be unsubstituted, mono-, di-, tri- or tetrasubstituted with F, Cl, CN or alkyl, alkoxy, alkylcarbonyl or alkoxycarbonyl groups with 1 to 7 C atoms, wherein one or more H atoms may be substituted by F or Cl, and m is 0, 1, 2 or 3.

Preferably, the compounds of formula A-III are asymmetric compounds, preferably having different mesogenic groups $MG^{31}$ and $MG^{32}$.

Generally preferred are compounds of formulae A-I to A-III in which the dipoles of the ester groups present in the mesogenic groups are all oriented in the same direction, i.e. all —CO—O— or all —O—CO—.

Especially preferred are compounds of formulae A-I and/or A-II and/or A-III wherein the respective pairs of mesogenic groups ($MG^{11}$ and $MG^{12}$) and ($MG^{21}$ and $MG^{22}$) and ($MG^{31}$ and $MG^{32}$) at each occurrence independently from each other comprise one, two or three six-atomic rings, preferably two or three six-atomic rings.

A smaller group of preferred mesogenic groups is listed below. For reasons of simplicity, Phe in these groups is 1,4-phenylene, PheL is a 1,4-phenylene group which is substituted by 1 to 4 groups L, with L being preferably F, Cl, CN, OH, NO₂ or an optionally fluorinated alkyl, alkoxy or alkanoyl group with 1 to 7 C atoms, very preferably F, Cl, CN, OH, NO₂, CH₃, C₂H₅, OCH₃, OC₂H₅, COCH₃, COC₂H₅, COOCH₃, COOC₂H₅, CF₃, OCF₃, OCHF₂, OC₂F₅, in particular F, Cl, CN, CH₃, C₂H₅, OCH₃, COCH₃ and OCF₃, most preferably F, Cl, CH₃, OCH₃ and COCH₃ and Cyc is 1,4-cyclohexylene. This list comprises the sub-formulae shown below as well as their mirror images

| | |
|---|---|
| -Phe-Z-Phe- | II-1 |
| -Phe-Z-Cyc- | II-2 |
| -Cyc-Z-Cyc- | II-3 |
| -PheL-Z-Phe- | II-4 |
| -PheL-Z-Cyc- | II-5 |
| -PheL-Z-PheL- | II-6 |
| -Phe-Z-Phe-Z-Phe- | II-7 |
| -Phe-Z-Phe-Z-Cyc- | II-8 |
| -Phe-Z-Cyc-Z-Phe- | II-9 |
| -Cyc-Z-Phe-Z-Cyc- | II-10 |
| -Phe-Z-Cyc-Z-Cyc- | II-11 |
| -Cyc-Z-Cyc-Z-Cyc- | II-12 |
| -Phe-Z-Phe-Z-PheL- | II-13 |
| -Phe-Z-PheL-Z-Phe- | II-14 |
| -PheL-Z-Phe-Z-Phe- | II-15 |
| -PheL-Z-Phe-Z-PheL- | II-16 |
| -PheL-Z-PheL-Z-Phe- | II-17 |
| -PheL-Z-PheL-Z-PheL- | II-18 |
| -Phe-Z-PheL-Z-Cyc- | II-19 |
| -Phe-Z-Cyc-Z-PheL- | II-20 |
| -Cyc-Z-Phe-Z-PheL- | II-21 |
| -PheL-Z-Cyc-Z-PheL- | II-22 |
| -PheL-Z-PheL-Z-Cyc- | II-23 |
| -PheL-Z-Cyc-Z-Cyc- | II-24 |
| -Cyc-Z-PheL-Z-Cyc- | II-25 |

Particularly preferred are the sub formulae II-1, II-4, II-6, II-7, II-13, II-14, II-15, II-16, II-17 and II-18.

In these preferred groups, Z in each case independently has one of the meanings of $Z^1$ as given above for $MG^{21}$ and $MG^{22}$. Preferably Z is —COO—, —OCO—, —CH₂CH₂—, —C≡C— or a single bond, especially preferred is a single bond.

Very preferably the mesogenic groups $MG^{11}$ and $MG^{12}$, $MG^{21}$ and $MG^{22}$ and $MG^{31}$ and $MG^{32}$ are each and independently selected from the following formulae and their mirror images Very preferably, at least one of the respective pairs of mesogenic groups $MG^{11}$ and $MG^{12}$, $MG^{21}$ and $MG^{22}$ and $MG^{31}$ and $MG^{32}$ is, and preferably, both of them are each and independently, selected from the following formulae IIa to IIn (the two reference Nos. "II i" and "II l" being deliberately omitted to avoid any confusion) and their mirror images

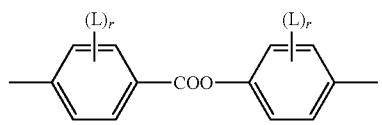

IIa

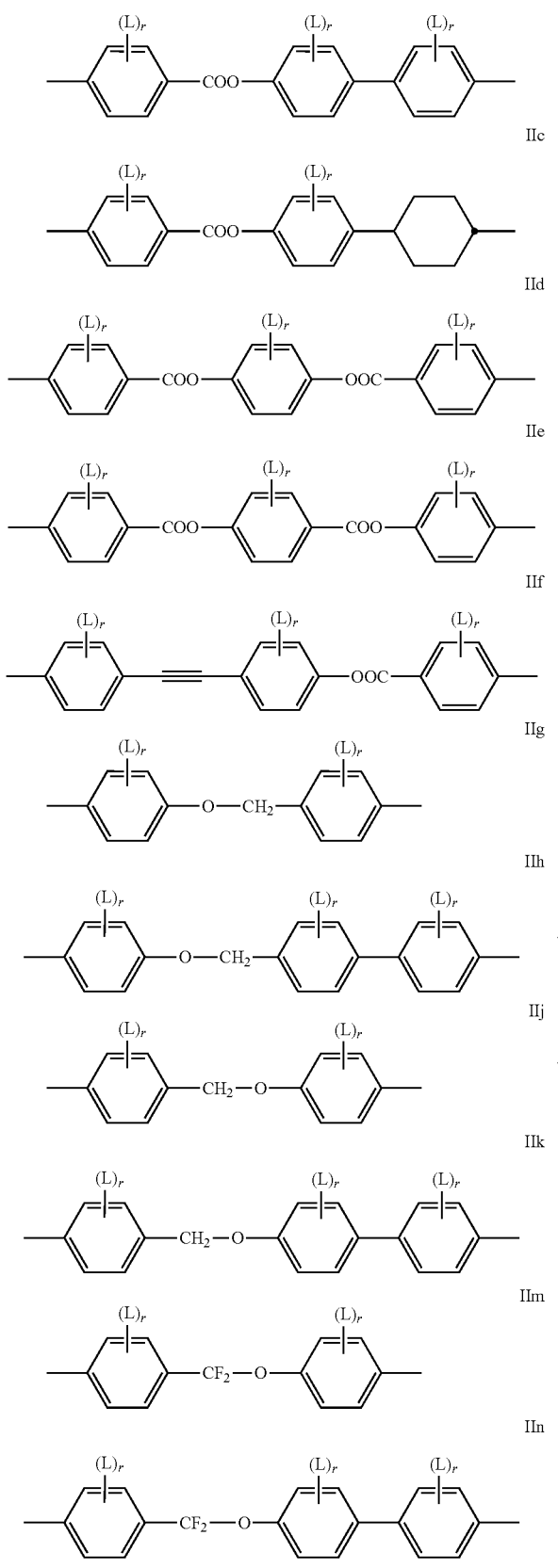

wherein
L is in each occurrence independently of each other F or Cl, preferably F and
r is in each occurrence independently of each other 0, 1, 2 or 3, preferably 0, 1 or 2.

The group

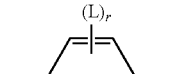

in these preferred formulae is very preferably denoting

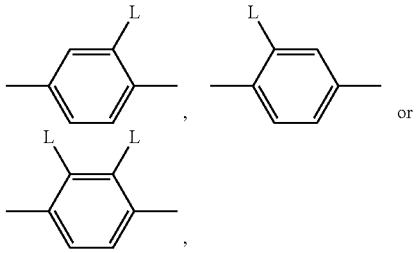

furthermore

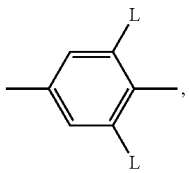

Particularly preferred are the sub formulae IIa, IId, IIg, IIh, IIi, IIk and IIo, in particular the sub formulae IIa and IIg.

In case of compounds with a non-polar group, $R^{11}$, $R^{12}$, $R^{21}$, $R^{22}$, $R^{31}$, and $R^{32}$ are preferably alkyl with up to 15 C atoms or alkoxy with 2 to 15 C atoms.

If $R^{11}$ and $R^{12}$, $R^{21}$ and $R^{22}$ and $R^{31}$ and $R^{32}$ are an alkyl or alkoxy radical, i.e. where the terminal CH$_2$ group is replaced by —O—, this may be straight chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, nonoxy, decoxy, undecoxy, dodecoxy, tridecoxy or tetradecoxy, for example.

Oxaalkyl, i.e. where one CH$_2$ group is replaced by —O—, is preferably straight-chain 2-oxapropyl (=methoxymethyl), 2- (=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-, 7-, 8- or 9-oxadecyl, for example.

In case of a compounds with a terminal polar group, $R^{11}$ and $R^{12}$, $R^{21}$ and $R^{22}$ and $R^{31}$ and $R^{32}$ are selected from CN, NO$_2$, halogen, OCH$_3$, OCN, SCN, COR$^x$, COOR$^x$ or a mono- oligo- or polyfluorinated alkyl or alkoxy group with 1 to 4 C atoms. R$^x$ is optionally fluorinated alkyl with 1 to 4, preferably 1 to 3 C atoms. Halogen is preferably F or Cl.

Especially preferably $R^{11}$ and $R^{12}$, $R^{21}$ and $R^{22}$ and $R^{31}$ and $R^{32}$ in formulae A-I, A-II, respectively A-III are selected of H, F, Cl, CN, $NO_2$, $OCH_3$, $COCH_3$, $COC_2H_5$, $COOCH_3$, $COOC_2H_5$, $CF_3$, $C_2F_5$, $OCF_3$, $OCHF_2$, and $OC_2F_5$, in particular of H, F, Cl, CN, $OCH_3$ and $OCF_3$, especially of H, F, CN and $OCF_3$.

In addition, compounds of formulae A-I, A-II, respectively A-III containing an achiral branched group $R^{11}$ and/or $R^{21}$ and/or $R^{31}$ may occasionally be of importance, for example, due to a reduction in the tendency towards crystallization. Branched groups of this type generally do not contain more than one chain branch. Preferred achiral branched groups are isopropyl, isobutyl (=methylpropyl), isopentyl (=3-methylbutyl), isopropoxy, 2-methyl-propoxy and 3-methylbutoxy.

The spacer groups $Sp^1$, $Sp^2$ and $Sp^3$ are preferably a linear or branched alkylene group having 5 to 40 C atoms, in particular 5 to 25 C atoms, very preferably 5 to 15 C atoms, in which, in addition, one or more non-adjacent and non-terminal $CH_2$ groups may be replaced by —O—, —S—, —NH—, —N($CH_3$)—, —CO—, —O—CO—, —O—COO—, —CO—S—, —CH (halogen)-, —CH(CN)—, —CH=CH— or "Terminal" $CH_2$ groups are those directly bonded to the mesogenic groups. Accordingly, "non-terminal" $CH_2$ groups are not directly bonded to the mesogenic groups $R^{11}$ and $R^{12}$, $R^{21}$ and $R^{22}$ and $R^{31}$ and $R^{32}$.

Typical spacer groups are for example —$(CH_2)_o$—, —$(CH_2CH_2O)_p$—$CH_2CH_2$—, with o being an integer from 5 to 40, in particular from 5 to 25, very preferably from 5 to 15, and p being an integer from 1 to 8, in particular 1, 2, 3 or 4.

Preferred spacer groups are pentylene, hexylene, heptylene, octylene, nonylene, decylene, undecylene, dodecylene, octadecylene, diethyleneoxyethylene, dimethyleneoxybutylene, pentenylene, heptenylene, nonenylene and undecenylene, for example.

Especially preferred are compounds of formulae A-I, A-II and A-III wherein $Sp^1$, $Sp^2$, respectively $Sp^3$ are alkylene with 5 to 15 C atoms. Straight-chain alkylene groups are especially preferred.

Preferred are spacer groups with even numbers of a straight-chain alkylene having 6, 8, 10, 12 and 14 C atoms.

In another embodiment of the present invention are the spacer groups preferably with odd numbers of a straight-chain alkylene having 5, 7, 9, 11, 13 and 15 C atoms. Very preferred are straight-chain alkylene spacers having 5, 7, or 9 C atoms.

Especially preferred are compounds of formulae A-I, A-II and A-III wherein $Sp^1$, $Sp^2$, respectively $Sp^3$ are completely deuterated alkylene with 5 to 15 C atoms. Very preferred are deuterated straight-chain alkylene groups. Most preferred are partially deuterated straight-chain alkylene groups.

Preferred are compounds of formula A-I wherein the mesogenic groups $R^{11}$-$MG^{11}$- and $R^{12}$-$MG^1$- are different. Especially preferred are compounds of formula A-I wherein $R^{11}$-$MG^{11}$- and $R^{12}$-$MG^{12}$- in formula A-I are identical.

Preferred compounds of formula A-I are selected from the group of compounds of formulae A-I-1 to A-I-3

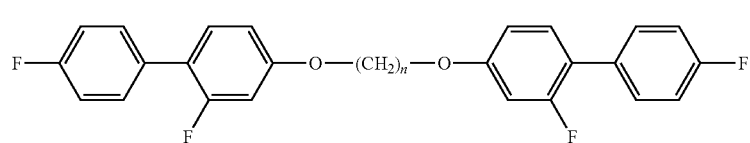

A-I-1

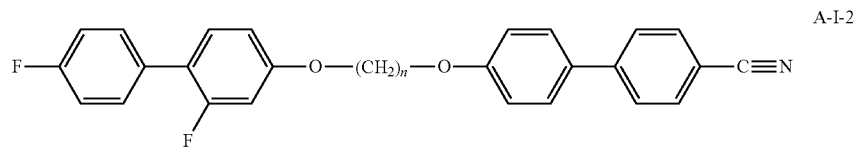

A-I-2

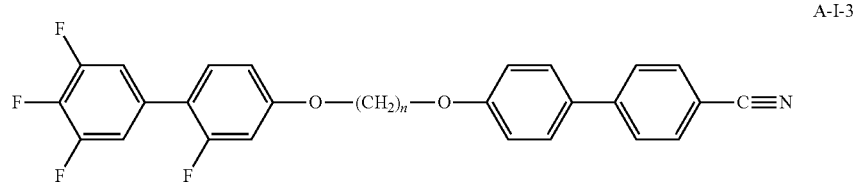

A-I-3 wherein the parameter n has the meaning given above and preferably is 3, 5, 7 or 9, more preferably 5, 7 or 9.

Preferred compounds of formula A-II are selected from the group of compounds of formulae A-II-1 to A-II-4

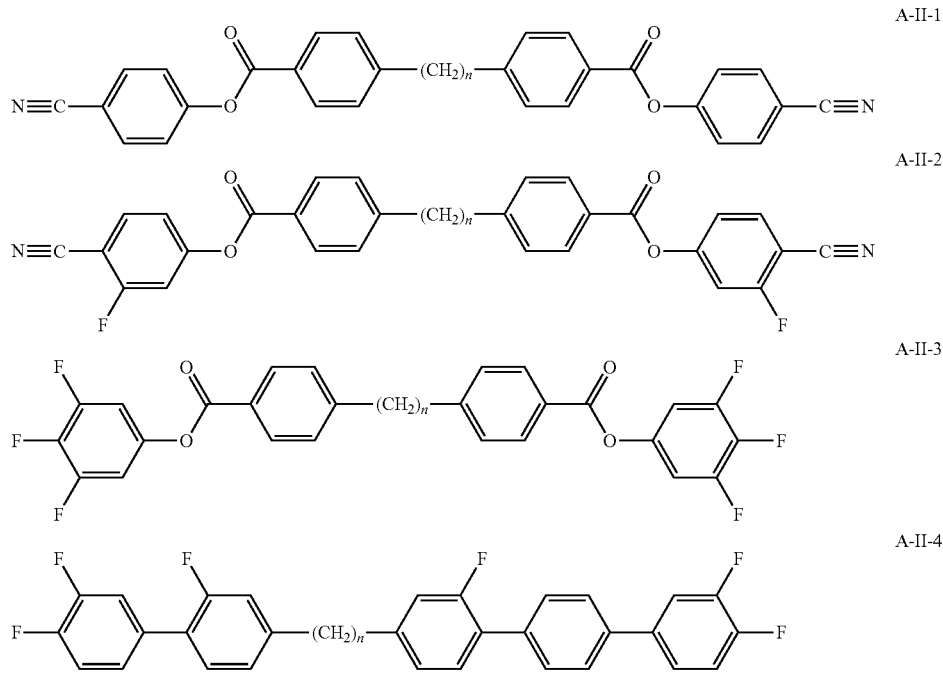

wherein the parameter n has the meaning given above and preferably is 3, 5, 7 or 9, more preferably 5, 7 or 9.

Preferred compounds of formula A-III are selected from the group of compounds of formulae A-III-1 to A-III-11

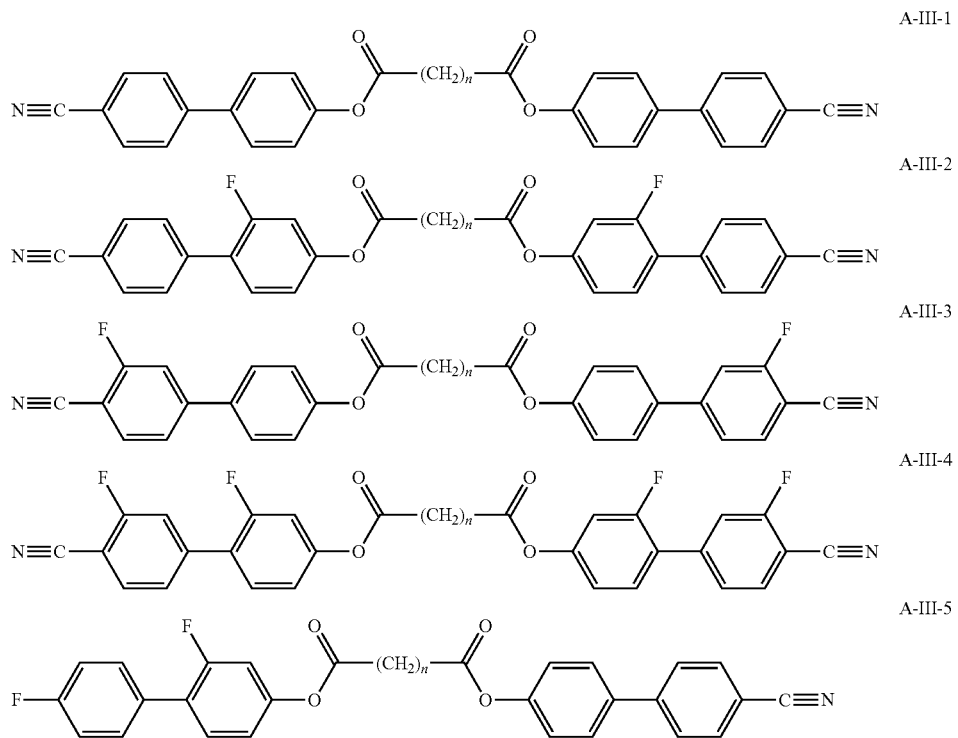

-continued
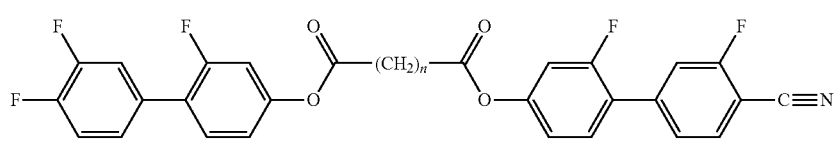
A-III-6
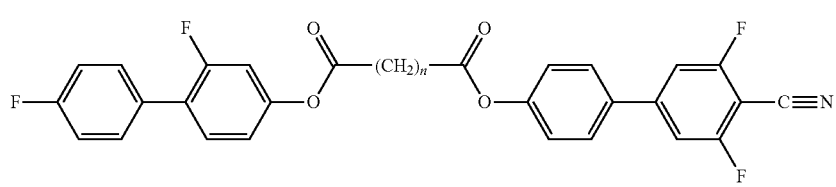
A-III-7
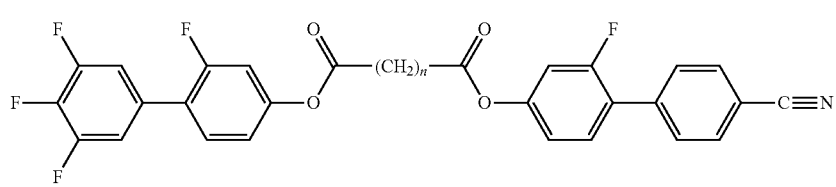
A-III-8
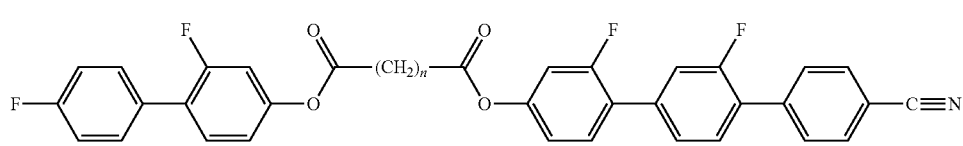
A-III-9
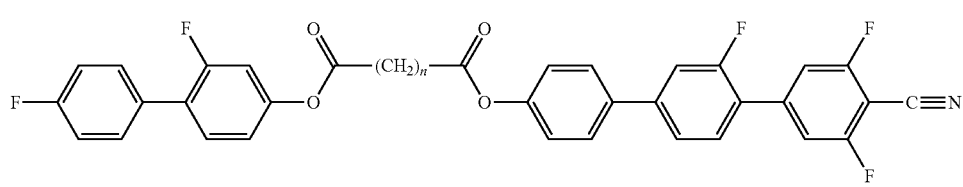
A-III-10
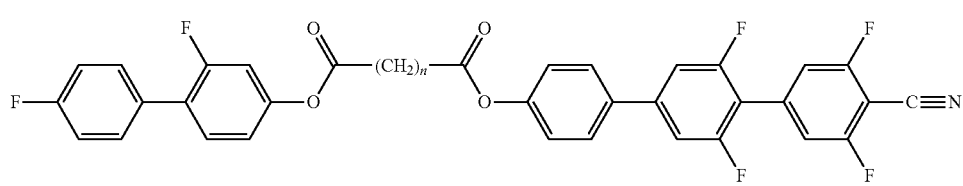
A-III-11
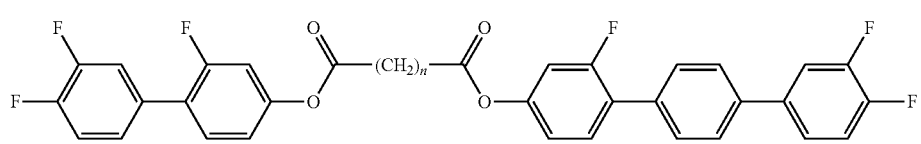
A-III-12
wherein the parameter n has the meaning given above and preferably is 3, 5, 7 or 9, more preferably 5, 7 or 9.
Particularly preferred exemplary compounds of formulae A-I are the following compounds:
symmetrical ones:
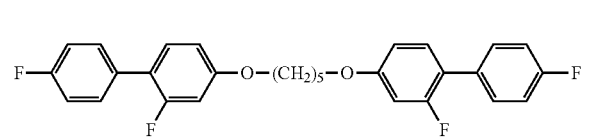
-continued
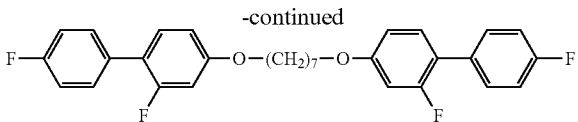
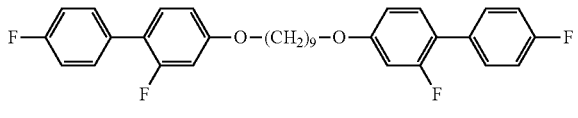

and non-symmetrical ones:
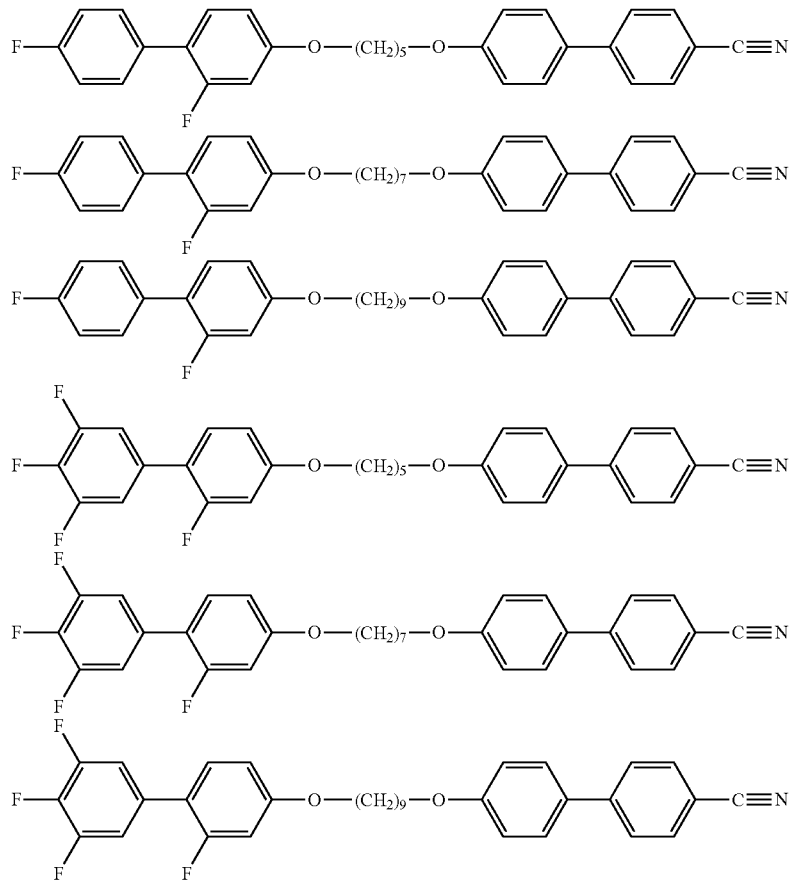
Particularly preferred exemplary compounds of formulae A-II are the following compounds:
symmetrical ones:
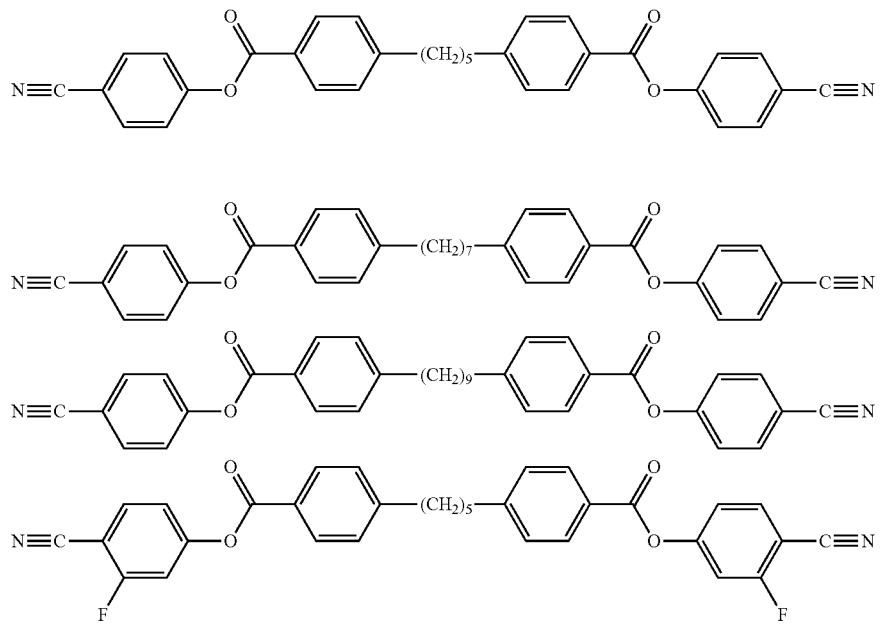

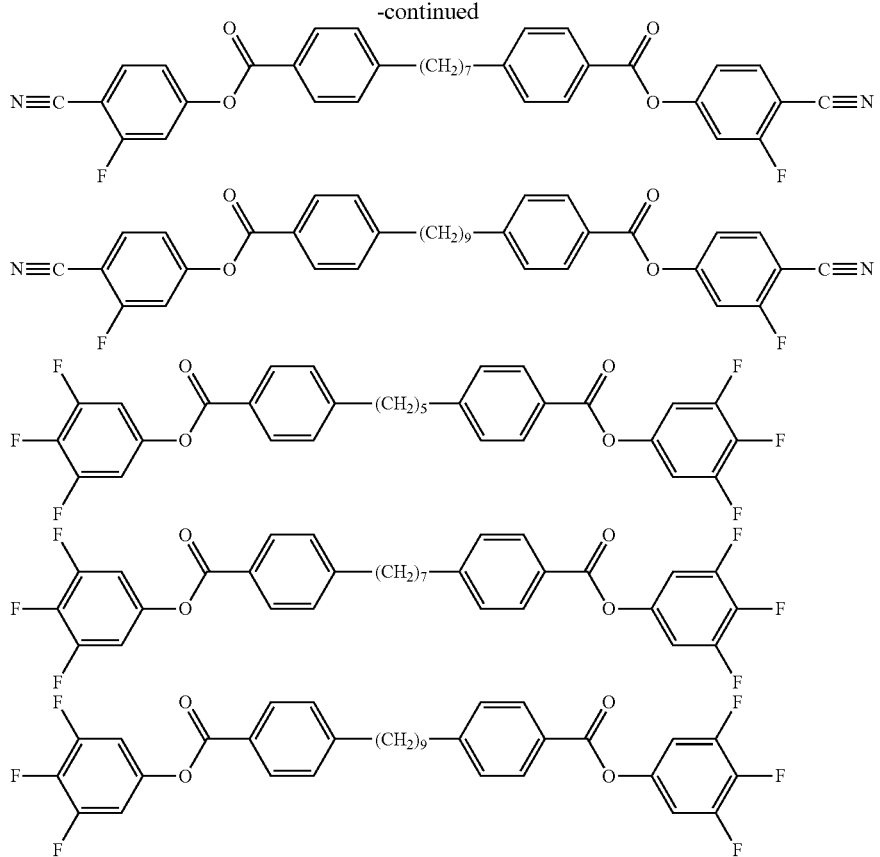
and non-symmetrical ones:
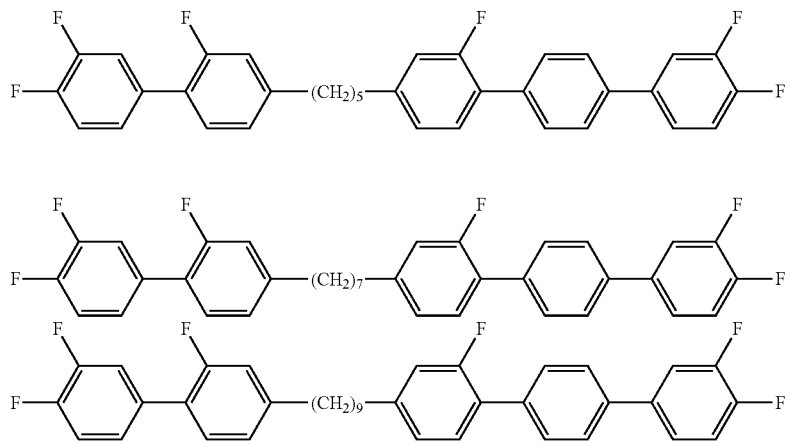
Particularly preferred exemplary compounds of formulae A-III are the following compounds:
symmetrical ones:
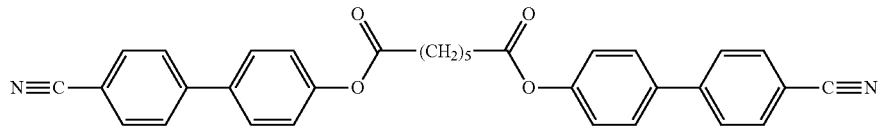

-continued
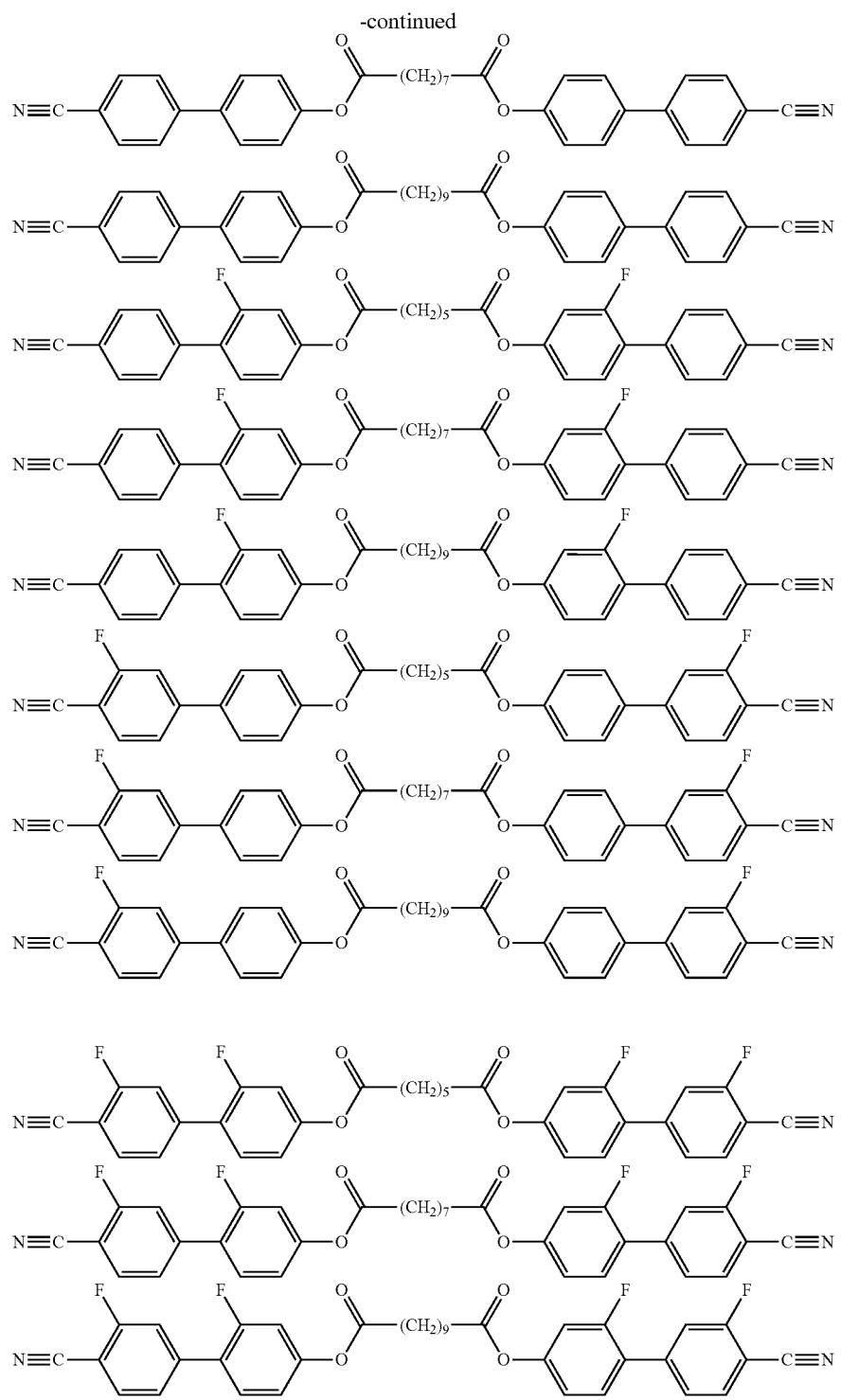
and non-symmetrical ones:
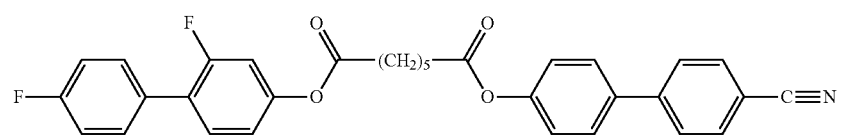

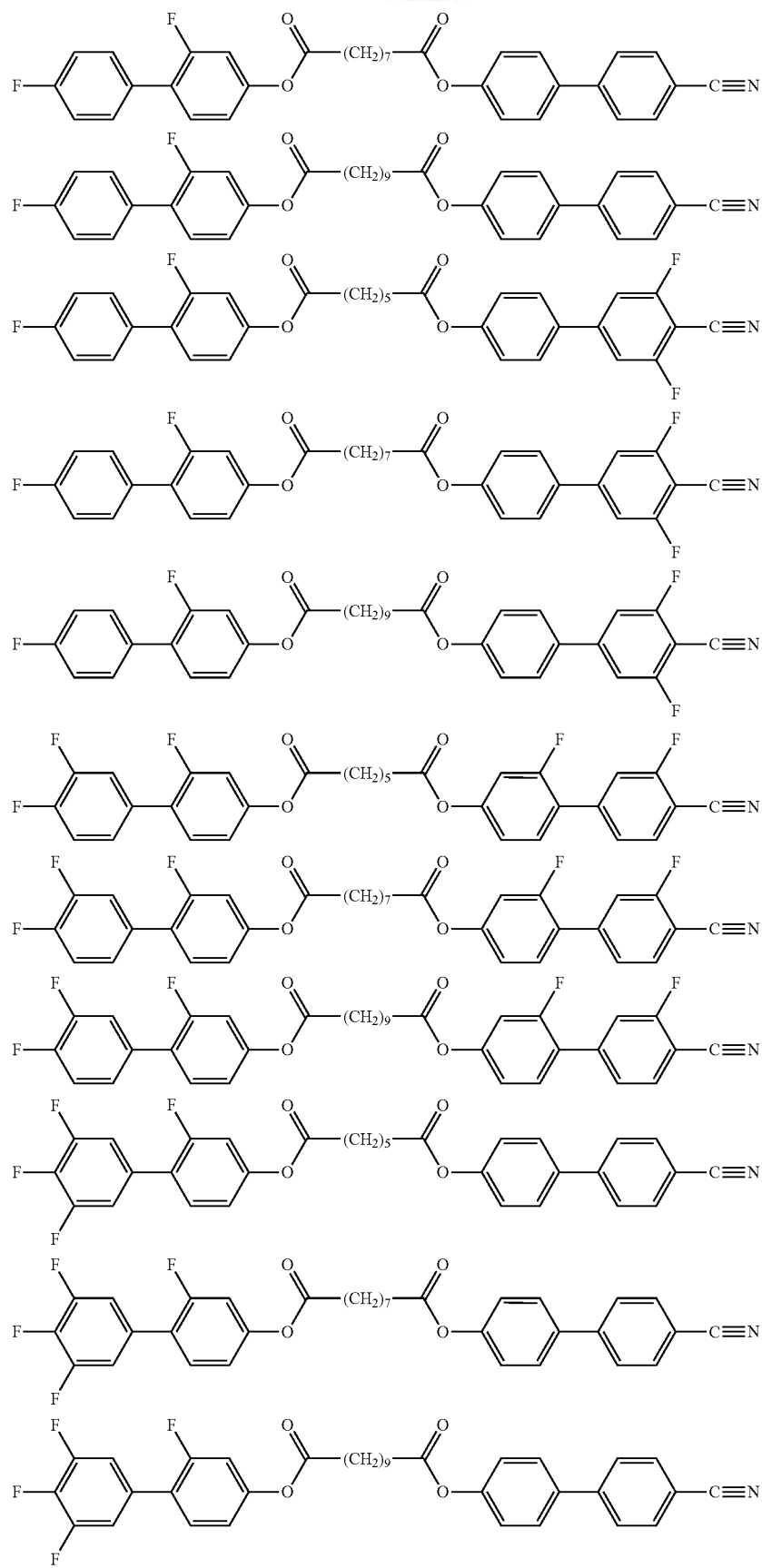

-continued
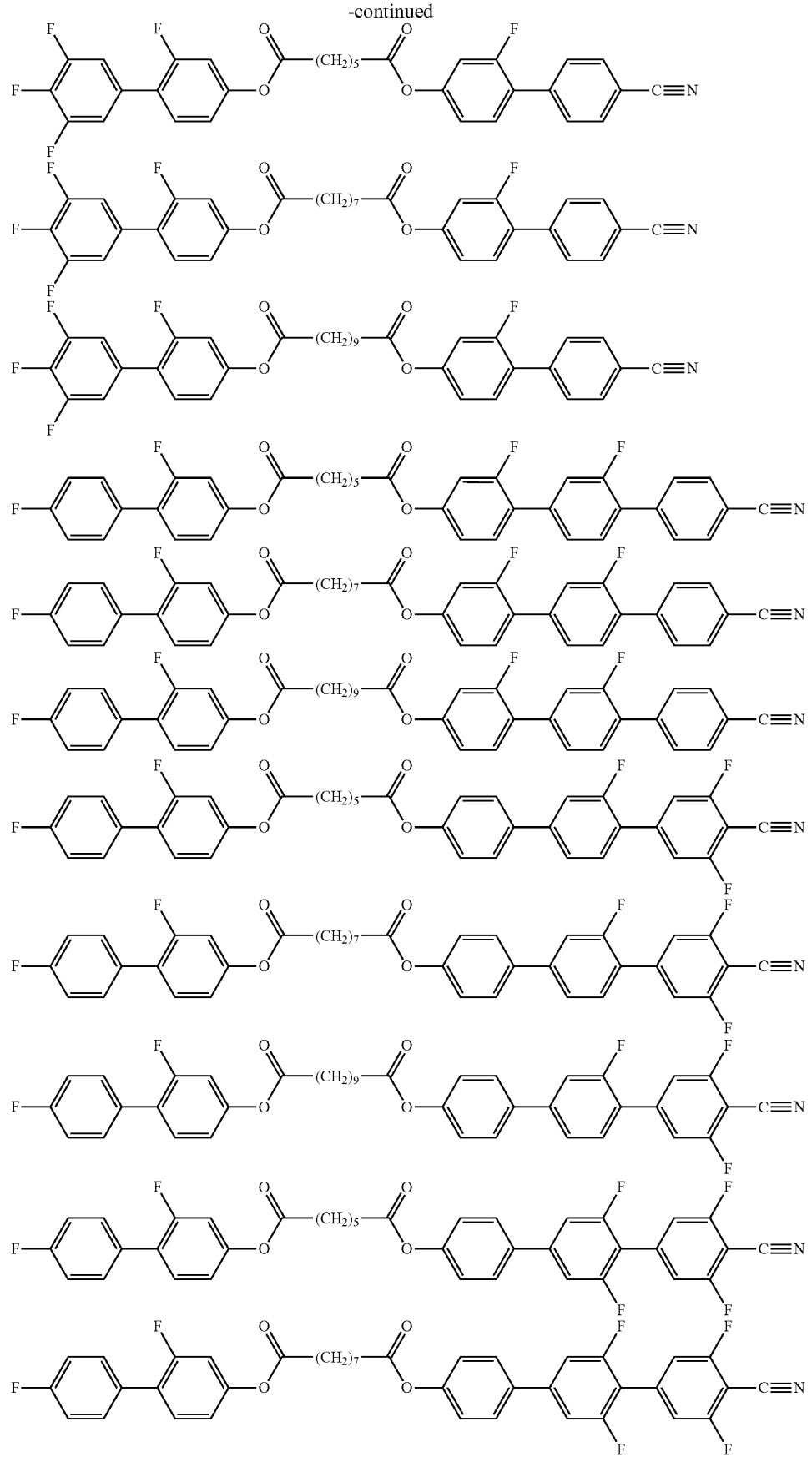

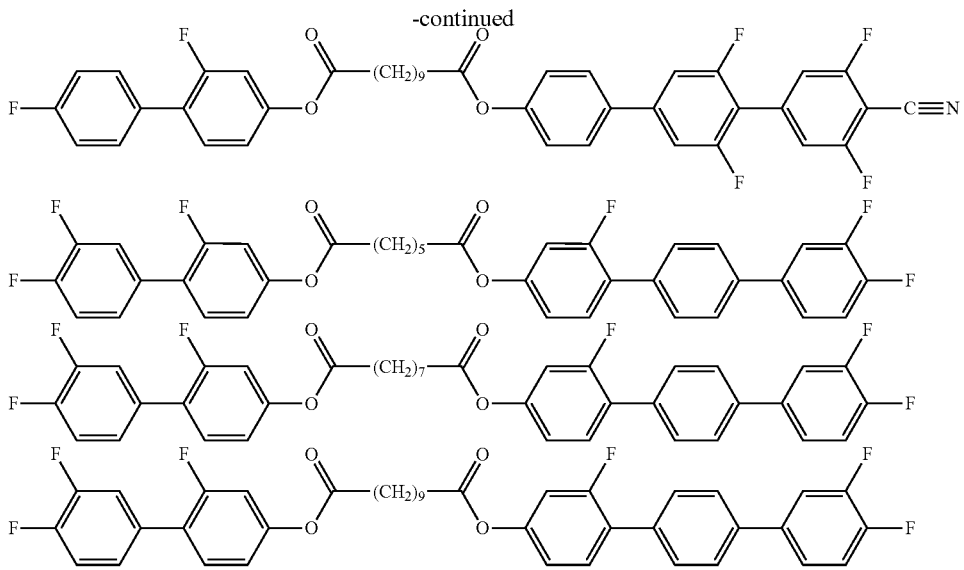

The bimesogenic compounds of formula A-I to A-III are particularly useful in flexoelectric liquid crystal light modulation elements as they can easily be aligned into macroscopically uniform orientation, and lead to high values of the elastic constant $k_{11}$ and a high flexoelectric coefficient e in the applied liquid crystalline media.

The compounds of formulae A-I to A-III can be synthesized according to or in analogy to methods which are known per se and which are described in standard works of organic chemistry such as, for example, Houben-Weyl, Methoden der organischen Chemie, Thieme-Verlag, Stuttgart.

In a preferred embodiment, the cholesteric liquid crystalline medium optionally comprise one or more nematogenic compounds, which are preferably selected from the group of compounds of formulae B-I to B-III

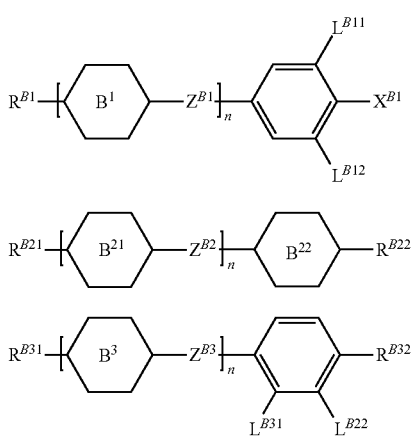

wherein
$L^{B11}$ to $L^{31}$ are independently H or F, preferably one is H and the other H or F and most preferably both are H or both are F.
$R^{B1}$, $R^{B21}$ and $R^{B22}$ and
$R^{B31}$ and $R^{B32}$ are each independently H, F, Cl, CN, NCS or a straight-chain or branched alkyl group with 1 to 25 C atoms which may be unsubstituted, mono- or polysubstituted by halogen or CN, it being also possible for one or more non-adjacent $CH_2$ groups to be replaced, in each occurrence independently from one another, by —O—, —S—, —NH—, —N(CH$_3$)—, —CO—, —COO—, —OCO—, —O—CO—O—, —S—CO—, —CO—S—, —CH=CH—, —CH=CF—, —CF=CF— or —C≡C— in such a manner that oxygen atoms are not linked directly to one another,
$X^{B1}$ is F, Cl, CN, NCS, preferably CN,
$Z^{B1}$, $Z^{B2}$ and $Z^{B3}$ are in each occurrence independently —CH$_2$—CH$_2$—, —CO—O—, —O—CO—, —CF$_2$—O—, —O—CF$_2$—, —CH=CH— or a single bond, preferably —CH$_2$—CH$_2$—, —CO—O—, —CH=CH— or a single bond, more preferably —CH$_2$—CH$_2$— or a single bond, even more preferably one of the groups present in one compound is —CH$_2$—CH$_2$— and the others are a single bond, most preferably all are a single bond,

are in each occurrence independently

-continued

most preferably

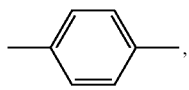

alternatively one or more of

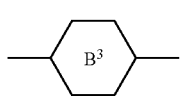 are 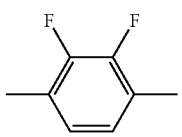

and
n is 1, 2 or 3, preferably 1 or 2.

Further preferred are cholesteric liquid-crystalline media comprising one or more nematogens of formula B-I selected from the from the group of formulae B-I-1 to B-I-, preferably of formula B-I-2 and/or B-I-4, most preferably B-I-4

B-I-1
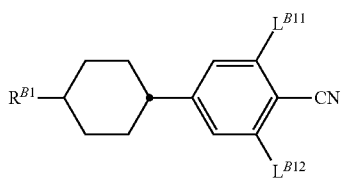

B-I-2
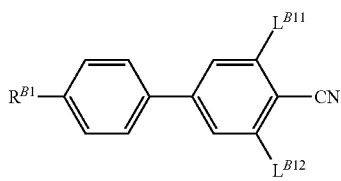

B-I-3
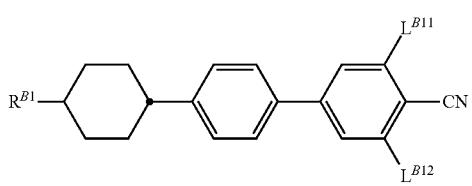

B-I-4
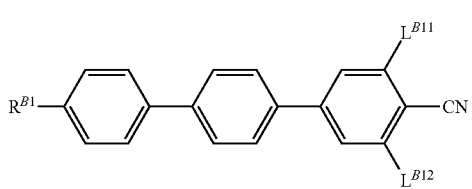

wherein the parameters have the meanings given above and preferably
$R^{B1}$ is alkyl, alkoxy, alkenyl or alkenyloxy with up to 12 C atoms, and
$L^{B11}$ and $L^{B12}$ are independently H or F, preferably one is H and the other H or F and most preferably both are H.

Further preferred are cholesteric liquid-crystalline media comprising one or more nematogens of formula B-II selected from the from the group of formulae B-II-1 and B-II-2, preferably of formula B-II-2 and/or B-II-4, most preferably of formula B-II-1

B-II-1
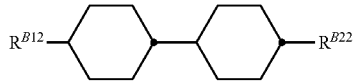

B-II-2
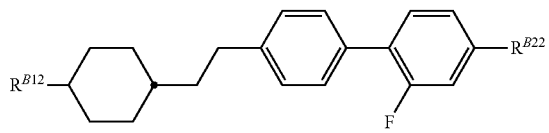

B-II-3
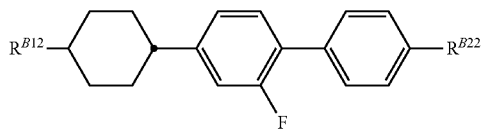

B-II-4
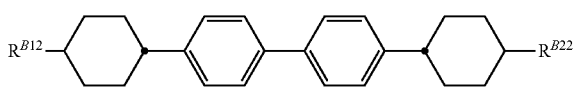

wherein the parameters have the meanings given above and preferably
$R^{B21}$ and $R^{B22}$ are independently alkyl, alkoxy, alkenyl or alkenyloxy with up to 12 C atoms, more preferably $R^{B21}$ is alkyl and $R^{B22}$ is alkyl, alkoxy or alkenyl and in formula B-II-1 most preferably alkenyl, in particular vinyl or 1-propenyl, and in formula B-II-2, most preferably alkyl.

Further preferred are cholesteric liquid-crystalline media comprising one or more nematogens of formula B-III, preferably selected from the group compounds of formulae B-III-1 to B-III-3

B-III-1
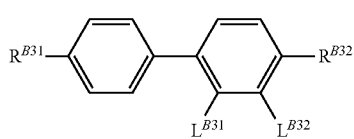

B-III-2
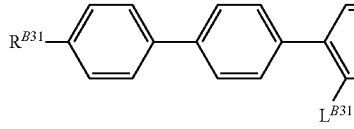

B-III-3
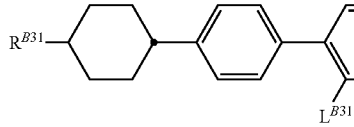

wherein the parameters have the meanings given above and preferably $R^{B31}$ and $R^{B32}$ are independently alkyl, alkoxy, alkenyl or alkenyloxy with up to 12 C atoms, more preferably $R^{B31}$ is alkyl and $R^{B32}$ is alkyl or alkoxy and most preferably alkoxy, and $L^{B22}$ and $L^{B31}$ $L^{B32}$ are independently H or F, preferably one is F and the other H or F and most preferably both are F.

The compounds of formulae B-I to B-III are either known to the expert and can be synthesized according to or in analogy to methods which are known per se and which are described in standard works of organic chemistry such as, for example, Houben-Weyl, Methoden der organischen Chemie, Thieme-Verlag, Stuttgart.

Suitable cholesteric liquid-crystalline media for the ULH mode comprise one or more chiral compounds with a suitable helical twisting power (HTP), in particular those disclosed in WO 98/00428.

Preferably, the chiral compounds are selected from the group of compounds of formulae C-I to C-III, Further, typically used chiral compounds are e.g. the commercially available R/S-5011, CD-1, R/S-811 and CB-15 (from Merck KGaA, Darmstadt, Germany).

The above mentioned chiral compounds R/S-5011 and CD-1 and the (other) compounds of formulae C—I, C—II and C-III exhibit a very high helical twisting power (HTP), and are therefore particularly useful for the purpose of the present invention.

The cholesteric liquid-crystalline medium preferably comprises preferably 1 to 5, in particular 1 to 3, very preferably 1 or 2 chiral compounds, preferably selected from the above formula C-II, in particular CD-1, and/or formula C—III and/or R-5011 or S-5011, very preferably, the chiral compound is R-5011, S-5011 or CD-1.

The amount of chiral compounds in the cholesteric liquid-crystalline medium is preferably from 0.5 to 20%, more preferably from 1 to 15%, even more preferably 1 to 10%, and most preferably 1 to 5%, by weight of the total mixture.

C-I

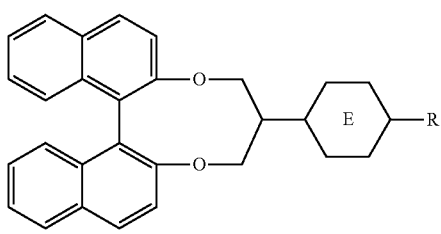

C-II

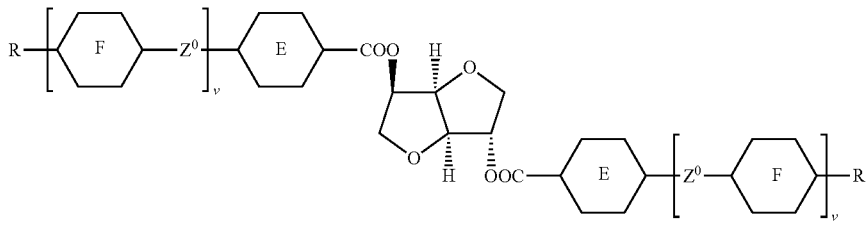

C-III

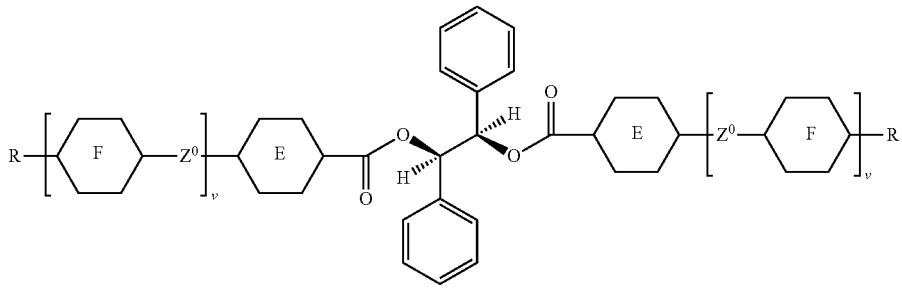

the latter ones including the respective (S,S) enantiomers, wherein E and F are each independently 1,4-phenylene or trans-1,4-cyclo-hexylene, v is 0 or 1, $Z^0$ is —COO—, —OCO—, —CH$_2$CH$_2$— or a single bond, and R is alkyl, alkoxy or alkanoyl with 1 to 12 C atoms.

Particularly preferred cholesteric liquid-crystalline media comprise at least one or more chiral compounds which themselves do not necessarily have to show a liquid crystalline phase and give good uniform alignment themselves.

The compounds of formula C—II and their synthesis are described in WO 98/00428. Especially preferred is the compound CD-1, as shown in table D below. The compounds of formula C—III and their synthesis are described in GB 2 328 207.

In a further preferred embodiment, a small amount (for example 0.3% by weight, typically <8% by weight per compound type) of a polymerisable compound is added to the above described cholesteric liquid-crystalline medium and, after introduction into the light modulation element, is polymerised or cross-linked in situ, usually by UV photopolymerisation. The addition of polymerisable mesogenic or liquid-crystalline compounds, also known as "reactive mesogens" (RMs), to the LC mixture has been proven particularly suitable in order further to stabilise the ULH texture (eg. Lagerwall et al., Liquid Crystals 1998, 24, 329-334.).

Suitable polymerisable liquid-crystalline compounds are preferably selected from the group of compounds of formula D, P-Sp-MG-$R^0$  D wherein
P is a polymerisable group,
Sp is a spacer group or a single bond,
MG is a rod-shaped mesogenic group, which is preferably selected of formula M,
M is $-(A^{D21}-Z^{D21})_k-A^{D22}-(Z^{D22}-A^{D23})_l-$,
$A^{D21}$ to $A^{D23}$ are in each occurrence independently of one another an aryl-, heteroaryl-, heterocyclic- or alicyclic group optionally being substituted by one or more identical or different groups L, preferably 1,4-cyclohexylene or 1,4-phenylene, 1,4 pyridine, 1,4-pyrimidine, 2,5-thiophene, 2,6-dithieno[3,2-b:2',3'-d]thiophene, 2,7-fluorine, 2,6-naphtalene, 2,7-phenanthrene optionally being substituted by one or more identical or different groups L,
$Z^{D21}$ and $Z^{D22}$ are in each occurrence independently from each other, —O—, —S—, —CO—, —COO—, —OCO—, —S—CO—, —CO—S—, —O—COO—, —CO—NR$^{O1}$—, —NR$^{O1}$—CO—, —NR$^{O1}$—CO—NR$^{O2}$—, —NR$^{O1}$—CO—O—, —O—CO—NR$^{O1}$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_4$—, —CF$_2$CH$_2$—, —CH$_2$CF$_2$—, —CF$_2$CF$_2$—, —CH=N—, —N=CH—, —N=N—, —CH=CR$^{O1}$—, —CY$^{O1}$=CY$^{O2}$—, —C≡C—, —CH=CH—COO—, —OCO—CH=CH—, or a single bond, preferably —COO—, —OCO—, —CO—O—, —O—CO—, —OCH$_2$—, —CH$_2$O—, -, —CH$_2$CH$_2$—, —(CH$_2$)$_4$—, —CF$_2$CH$_2$—, —CH$_2$CF$_2$—, —CF$_2$CF$_2$—, —C≡C—, —CH=CH—COO—, —OCO—CH=CH—, or a single bond,
L is in each occurrence independently of each other F, Cl or optionally fluorinated alkyl, alkoxy, thioalkyl, alkylcarbonyl, alkoxycarbonyl, alkylcarbonyloxy or alkoxycarbonyloxy with 1 to 20 C atoms more,
R$^0$ is H, alkyl, alkoxy, thioalkyl, alkylcarbonyl, alkoxycarbonyl, alkylcarbonyloxy or alkoxycarbonyloxy with 1 to 20 C atoms more, preferably 1 to 15 C atoms which are optionally fluorinated, or is Y$^{D0}$ or P-Sp-,
Y$^{D0}$ is F, Cl, CN, NO$_2$, OCH$_3$, OCN, SCN, optionally fluorinated alkylcarbonyl, alkoxycarbonyl, alkylcarbonyloxy or alkoxycarbonyloxy with 1 to 4 C atoms, or mono-oligo- or polyfluorinated alkyl or alkoxy with 1 to 4 C atoms, preferably F, Cl, CN, NO$_2$, OCH$_3$, or mono-oligo- or polyfluorinated alkyl or alkoxy with 1 to 4 C atoms
Y$^{O1}$ and Y$^{O2}$ each, independently of one another, denote H, F, Cl or CN,
R$^{O1}$ and R$^{O2}$ have each and independently the meaning as defined above R$^0$, and
k and l are each and independently 0, 1, 2, 3 or 4, preferably 0, 1 or 2, most preferably 1.

Preferred polymerisable mono-, di-, or multireactive liquid crystalline compounds are disclosed for example in WO 93/22397, EP 0 261 712, DE 195 04 224, WO 95/22586, WO 97/00600, U.S. Pat. Nos. 5,518,652, 5,750,051, 5,770,107 and 6,514,578.

Preferred polymerisable groups are selected from the group consisting of CH$_2$=CW$^1$—COO—, CH$_2$=CW$^1$—CO—

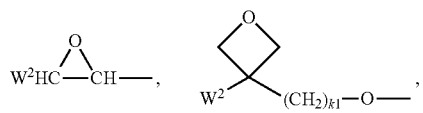

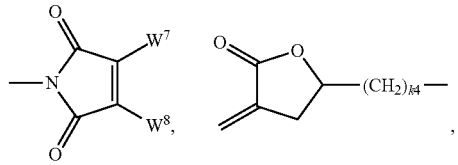

CH$_2$=CW$^2$—(O)$_{k3}$—, CW$^1$=CH—CO—(O)$_{k3}$—, CW$^1$=CH—CO—NH—, CH$_2$=CW$^1$—CO—NH—, CH$_3$—CH=CH—O—, (CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, HO—CW$^2$W$^3$—, HS—CW$^2$W$^3$—, HW$^2$N—, HO—CW$^2$W$^3$—NH—, CH$_2$=CW$^1$—CO—NH—, CH$_2$=CH—(COO)$_{k1}$-Phe-(O)$_{k2}$—, CH$_2$=CH—(CO)$_{k1}$-Phe-(O)$_{k2}$—, Phe-CH=CH—, HOOC—, OCN— and W$^4$W$^5$W$^6$Si—, in which W$^1$ denotes H, F, Cl, CN, CF$_3$, phenyl or alkyl having 1 to 5 C atoms, in particular H, F, Cl or CH$_3$, W$^2$ and W$^3$ each, independently of one another, denote H or alkyl having 1 to 5 C atoms, in particular H, methyl, ethyl or n-propyl, W$^4$, W$^5$ and W$^6$ each, independently of one another, denote Cl, oxaalkyl or oxacarbonylalkyl having 1 to 5 C atoms, W$^7$ and W$^8$ each, independently of one another, denote H, Cl or alkyl having 1 to 5 C atoms, Phe denotes 1,4-phenylene, which is optionally substituted by one or more radicals L as being defined above but being different from P-Sp, and k$_1$, k$_2$ and k$_3$ each, independently of one another, denote 0 or 1, k$_3$ preferably denotes 1, and k$_4$ is an integer from 1 to 10.

Particularly preferred groups P are CH$_2$=CH—COO—, CH$_2$=C(CH$_3$)—COO—, CH$_2$=CF—COO—, CH$_2$=CH—, CH$_2$=CH—O—, (CH$_2$=CH)$_2$CH—OCO—, (CH$_2$=CH)$_2$CH—O—,

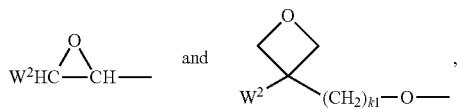

in particular vinyloxy, acrylate, methacrylate, fluoroacrylate, chloroacrylate, oxetane and epoxide.

In a further preferred embodiment of the invention, the polymerisable compounds of the formulae I* and II* and sub-formulae thereof contain, instead of one or more radicals P-Sp-, one or more branched radicals containing two or more polymerisable groups P (multifunctional polymerisable radicals). Suitable radicals of this type, and polymerisable compounds containing them, are described, for example, in U.S. Pat. No. 7,060,200 B1 or US 2006/0172090 A1. Particular preference is given to multifunctional polymerisable radicals selected from the following formulae:

 I*a

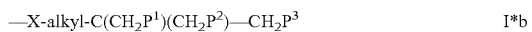 I*b

 I*c

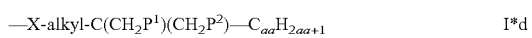 I*d

 I*e

 I*f

—X-alkyl-CP$^1$P$^2$—C$_{aa}$H$_{2aa+1}$     I*g

—X-alkyl-C(CH$_2$P$^1$)(CH$_2$P$^2$)—CH$_2$OCH$_2$—C(CH$_2$P$^3$)(CH$_2$P$^4$)CH$_2$P$^5$     I*h —X-alkyl-CH((CH$_2$)$_{aa}$P$^1$)((CH$_2$)$_{bb}$P$^2$)     I*i —X-alkyl-CHP$^1$CHP$^2$—C$_{aa}$H$_{2aa+1}$     I*k in which alkyl denotes a single bond or straight-chain or branched alkylene having 1 to 12 C atoms, in which one or more non-adjacent CH$_2$ groups may each be replaced, independently of one another, by —C(R$^x$)=C(R$^x$)—, —C≡C—, —N(R$^x$)—, —O—, —S—, —CO—, —CO—O—, —O—CO—, —O—CO—O— in such a way that O and/or S atoms are not linked directly to one another, and in which, in addition, one or more H atoms may be replaced by F, Cl or CN, where R$^x$ has the abovementioned meaning and preferably denotes R$^0$ as defined above, aa and bb each, independently of one another, denote 0, 1, 2, 3, 4, 5 or 6, X has one of the meanings indicated for X', and P$^{1-5}$ each, independently of one another, have one of the meanings indicated above for P.

Preferred spacer groups Sp are selected from the formula Sp'—X', so that the radical "P-Sp-" conforms to the formula "P-Sp'—X'—", where Sp' denotes alkylene having 1 to 20, preferably 1 to 12 C atoms, which is optionally mono- or polysubstituted by F, Cl, Br, I or CN and in which, in addition, one or more non-adjacent CH$_2$ groups may each be replaced, independently of one another, by —O—, —S—, —NH—, —NR$^x$—, —SiR$^x$R$^{xx}$—, —CO—, —COO—, —OCO—, —OCO—O—, —S—CO—, —CO—S—, —NR$^x$—CO—O—, —O—CO—NR$^x$—, —NR$^x$—CO—NR$^x$—, —CH═CH— or —C≡C— in such a way that O and/or S atoms are not linked directly to one another, X' denotes —O—, —S—, —CO—, —COO—, —OCO—, —O—COO—, —CO—NR$^x$—, —NR$^x$—CO—, —NR$^x$—CO—NR$^x$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH═N—, —N═CH—, —N═N—, —CH═CR$^x$—, —CY$^2$═CY$^3$—, —C≡C—, —CH═CH—COO—, —OCO—CH═CH— or a single bond, R$^x$ and R$^{xx}$ each, independently of one another, denote H or alkyl having 1 to 12 C atoms, and Y$^2$ and Y$^3$ each, independently of one another, denote H, F, Cl or CN.

X' is preferably
—O—, —S—, —CO—, —COO—, —OCO—, —O—COO—, —CO—NR$^x$—, —NR$^x$—CO—, —NR$^x$—CO—NR$^x$— or a single bond.

Typical spacer groups Sp' are, for example, —(CH$_2$)$_{p1}$—, —(CH$_2$CH$_2$O)$_{q1}$—CH$_2$CH$_2$—, —CH$_2$CH$_2$—S—CH$_2$CH$_2$—, —CH$_2$CH$_2$—NH—CH$_2$CH$_2$— or —(SiR$^x$R$^{xx}$—O)$_{p1}$—, in which p1 is an integer from 1 to 12, q1 is an integer from 1 to 3, and R$^x$ and R$^{xx}$ have the above-mentioned meanings.

Particularly preferred groups —X'—Sp'— are —(CH$_2$)$_{p1}$—, —O—(CH$_2$)$_{p1}$—, —OCO—(CH$_2$)$_{p1}$—, —OCOO—(CH$_2$)$_{p1}$—.

Particularly preferred groups Sp' are, for example, in each case straight-chain ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethyl-ene-N-methyliminoethylene, 1-methylalkylene, ethenylene, propenylene and butenylene.

Further preferred polymerisable mono-, di-, or multireactive liquid crystalline compounds are shown in the following list:

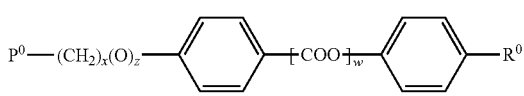

D-1

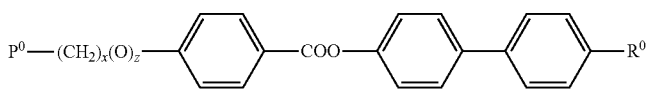

D-2

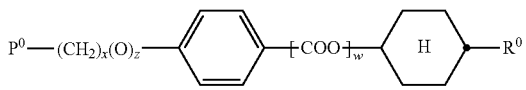

D-3

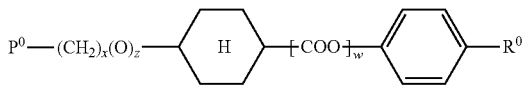

D-4

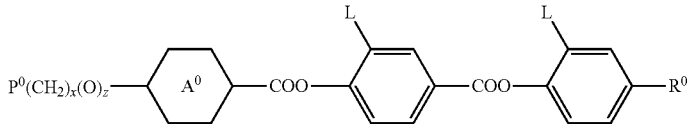

D-5

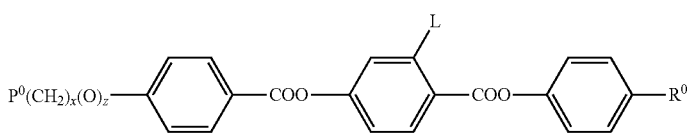

D-6

-continued
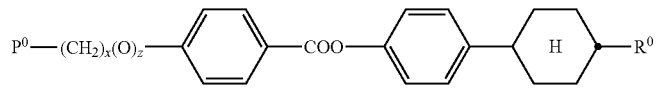
D-7
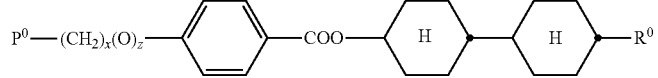
D-8
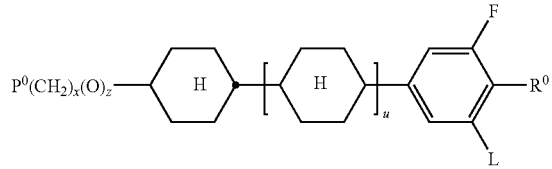
D-9
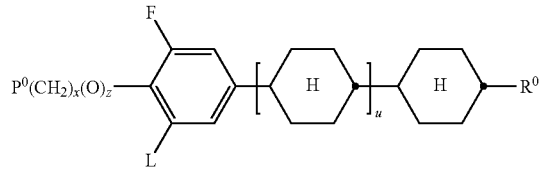
D-10
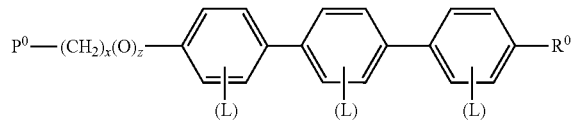
D-11
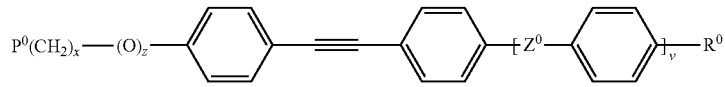
D-12
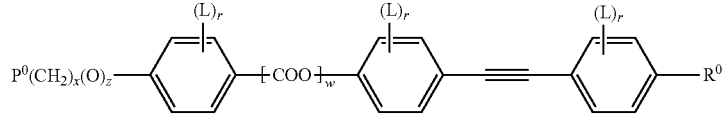
D-13
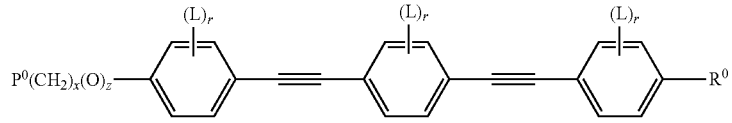
D-14
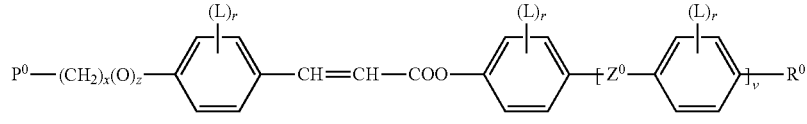
D-15
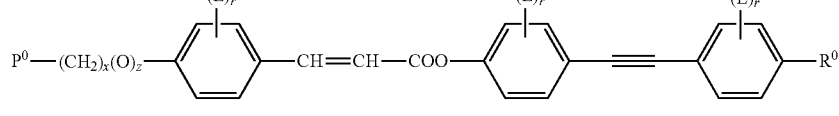
D-16
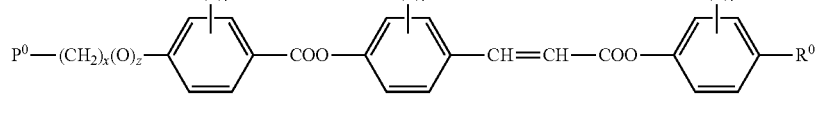
D-17
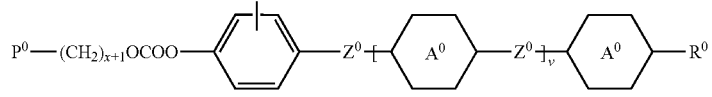
D-18

-continued
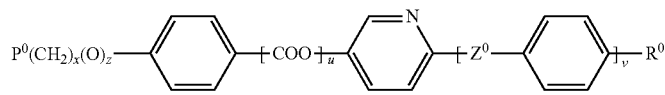
D-19
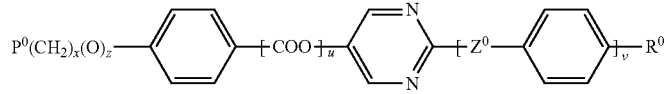
D-20
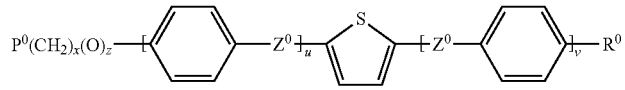
D-21
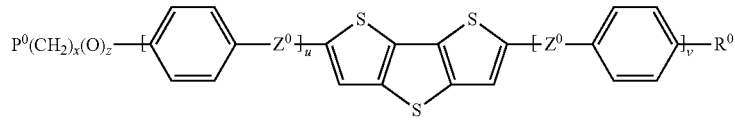
D-22
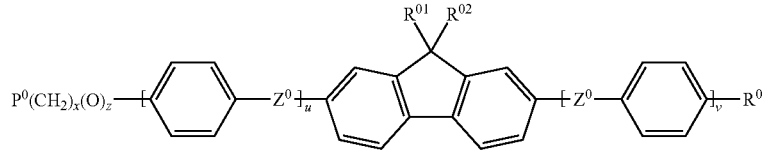
D-23
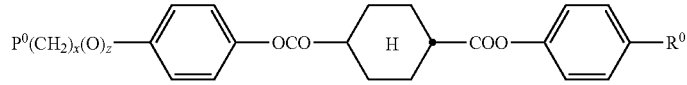
D-24
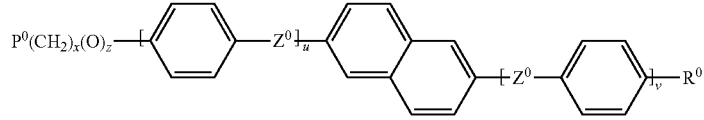
D-25
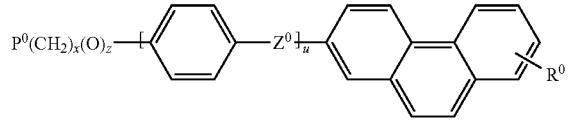
D-26
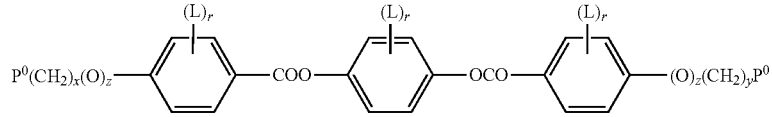
D-27
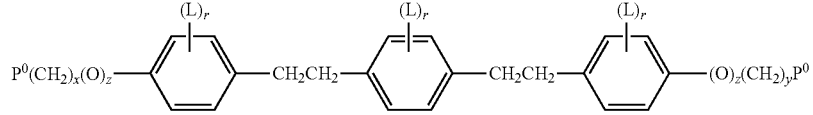
D-28
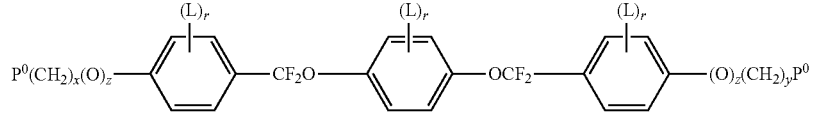
D-29
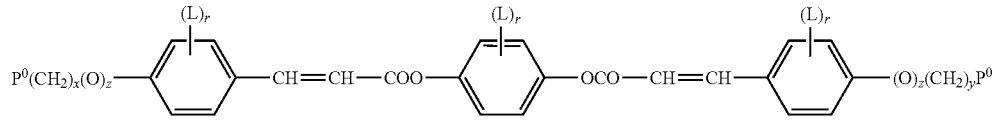
D-30

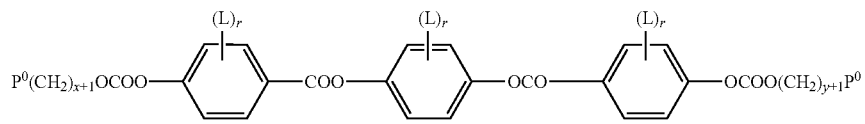

D-31

D-32

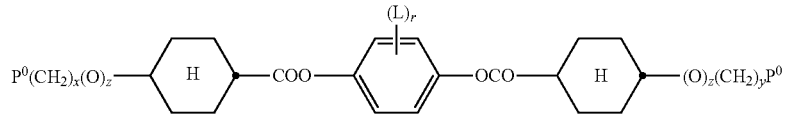

D-33

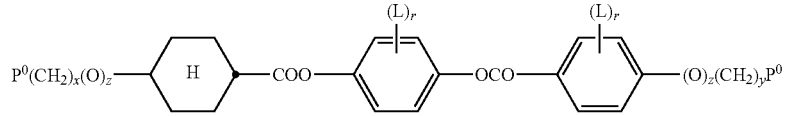

D-34 wherein $P^0$ is, in case of multiple occurrence independently of one another, a polymerisable group, preferably an acryl, methacryl, oxetane, epoxy, vinyl, vinyloxy, propenyl ether or styrene group, $A^0$ is, in case of multiple occurrence independently of one another, 1,4-phenylene that is optionally substituted with 1, 2, 3 or 4 groups L, or trans-1,4-cyclohexylene, $Z^0$ is, in case of multiple occurrence independently of one another, —COO—, —OCO—, —CH$_2$CH$_2$—, —C≡C—, —CH=CH—, —CH=CH—COO—, —OCO—CH=CH— or a single bond, r is 0, 1, 2, 3 or 4, preferably 0, 1 or 2, t is, in case of multiple occurrence independently of one another, 0, 1, 2 or 3, u and v are independently of each other 0, 1 or 2, w is 0 or 1, x and y are independently of each other 0 or identical or different integers from 1 to 12, z is 0 or 1, with z being 0 if the adjacent x or y is 0, in addition, wherein the benzene and naphthalene rings can additionally be substituted with one or more identical or different groups L and the parameter $R^0$, $Y^0$, $R^{01}$, $R^{02}$ and L have the same meanings as given above in formula D.

Especially preferred polymerisable mono-, di-, or multi-reactive liquid crystalline compounds are shown in table F further below.

The total concentration of these polymerisable compounds is in the range of 0.1% to 20%, preferably 0.1% to 8%, based on the total mixture. The concentrations of the individual polymerisable compounds used each are preferably in the range of 0.1% to 20%.

The polymerisable compounds are polymerised or cross-linked (if a compound contains two or more polymerisable groups) by in-situ polymerisation in the LC medium between the substrates of the LC light modulation element. Suitable and preferred polymerisation methods are, for example, thermal or photopolymerisation, preferably photopolymerisation, in particular UV photopolymerisation. If necessary, one or more initiators may also be added here. Suitable conditions for the polymerisation, and suitable types and amounts of initiators, are known to the person skilled in the art and are described in the literature. Suitable for free-radical polymerisation are, for example, the commercially available photoinitiators Irgacure651®, Irgacure184®, Irgacure907®, Irgacure369® or Darocure1173® (Ciba AG). If an initiator is employed, its proportion in the mixture as a whole is preferably 0.001 to 5% by weight, particularly preferably 0.001 to 1% by weight. However, the polymerisation can also take place without addition of an initiator. In a further preferred embodiment, the LC medium does not comprise a polymerisation initiator.

The polymerisable component or the cholesteric liquid-crystalline medium may also comprise one or more stabilisers in order to prevent undesired spontaneous polymerisation of the RMs, for example during storage or transport. Suitable types and amounts of stabilisers are known to the person skilled in the art and are described in the literature. Particularly suitable are, for example, the commercially available stabilisers of the Irganox® series (Ciba AG). If stabilisers are employed, their proportion, based on the total amount of RMs or polymerisable compounds, is preferably 10-5000 ppm, particularly preferably 50-500 ppm.

The above-mentioned polymerisable compounds are also suitable for polymerisation without initiator, which is associated with considerable advantages, such as, for example, lower material costs and in particular less contamination of the LC medium by possible residual amounts of the initiator or degradation products thereof.

The polymerisable compounds can be added individually to the cholesteric liquid-crystalline medium, but it is also possible to use mixtures comprising two or more polymerisable compounds. On polymerisation of mixtures of this type, copolymers are formed. The invention furthermore relates to the polymerisable mixtures mentioned above and below.

The cholesteric liquid-crystalline medium which can be used in accordance with the invention is prepared in a manner conventional per se, for example by mixing one or more of the above-mentioned compounds with one or more polymerisable compounds as defined above and optionally with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

It goes without saying to the person skilled in the art that the LC media may also comprise compounds in which, for example, H, N, O, Cl, F have been replaced by the corresponding isotopes.

The liquid crystal media may contain further additives like for example further stabilizers, inhibitors, chain-transfer agents, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colourants, dyes, pigments or nanoparticles in usual concentrations.

The total concentration of these further constituents is in the range of 0.1% to 20%, preferably 0.1% to 8%, based on the total mixture. The concentrations of the individual compounds used each are preferably in the range of 0.1% to 20%. The concentration of these and of similar additives is not taken into consideration for the values and ranges of the concentrations of the liquid crystal components and compounds of the liquid crystal media in this application. This also holds for the concentration of the dichroic dyes used in the mixtures, which are not counted when the concentrations of the compounds respectively the components of the host medium are specified. The concentration of the respective additives is always given relative to the final doped mixture.

In general, the total concentration of all compounds in the media according to this application is 100%.

The process for the production of the light modulation element will be now described in more detail.

The invention relates to a process of preparing a light modulation element comprising the steps of
a) providing a layer of a liquid crystal medium comprising one or more bimesogenic compounds, one or more chiral compounds, and one or more polymerisable compounds between two substrates, wherein at least one substrate is transparent to light and electrodes are provided on both sides of the opposing substrates,
b) heating liquid crystal medium to its isotropic phase,
c) cooling the liquid crystal medium up to 10° or less below the clearing point while applying voltage between the electrodes, which is sufficient to switch the liquid crystal medium between switched states,
c) exposing said layer of a liquid crystal medium to photoradiation that induces photopolymerisation of the polymerisable compounds while applying voltage between the electrodes.

In the first step (step a) the LC medium is provided as a layer between two substrates forming a cell. Typically the LC medium is filled into the cell. Conventional filling methods can be used which are known to the skilled person, like for example the so-called "one-drop filling" (ODF), which are preferably carried out in a vacuum.

The construction of the LC light modulation elements according to the invention corresponds to the usual geometry for ULH displays, as described in the prior art cited at the outset.

In the second step (step b) the LC medium is heated above the clearing point of the mixture into its isotropic phase. Preferably, the LC medium is heated 1° C. or more above the clearing point, more preferably 5° C. or more above the clearing point and even more preferably 10° C. above the clearing point of the utilized LC medium.

In the third step (step c) the LC medium is cooled below the clearing point of the mixture. Preferably, the LC medium is cooled 1° C. or less below the clearing point, more preferably 5° C. or less below the clearing point and even more preferably 10° C. or less below the clearing point of the utilized LC medium.

The cooling rate is preferably −10° C./min or less, more preferably −5° C./min or less, in particular −2° C./min or less.

Whilst cooling down a voltage, preferably an AC voltage, is applied to the electrodes of the light modulation element, which is sufficient to switch the liquid crystal medium between switched states. Suitable and preferred voltages are in the range from 5 to 30 V, preferably from 10 to 20 V.

In a preferred embodiment, the applied voltage stays constant during the following irradiation step. It is likewise preferred, that the applied voltage is increased or decreased.

In a irradiation step (step c), the light modulation element is exposed to photoradiation that causes photopolymerisation of the polymerisable functional groups of the polymerisable compounds contained in the LC medium. As a result these compounds are polymerised or crosslinked (in case of compounds with two or more polymerisable groups) in situ within the LC medium between the substrates forming the light modulation element. The polymerisation is induced for example by exposure to UV radiation.

The wavelength of the photoradiation should not be too low, in order to avoid damage to the LC molecules of the medium, and should preferably be different from, very preferably higher than, the UV absorption maximum of the LC host mixture (component B). On the other hand, the wavelength of the photoradiation should not be too high, so as to allow quick and complete UV photopolymerisation of the RMs, and should be not higher than, preferably the same as or lower than the UV absorption maximum of the polymerisable component (component A).

Suitable wavelengths are from 300 to 400 nm, for example 305, 320 or 340 nm or 376 nm.

The irradiation or exposure time should be selected such that polymerisation is as complete as possible, but still not be too high to allow a smooth production process. Also, the radiation intensity should be high enough to allow quick and complete polymerisation, but should not be too high to avoid damage to the LC medium.

Since the polymerisation speed also depends on the reactivity of the RMs, the irradiation time and the radiation intensity should be selected in accordance with the type and amount of RMs present in the LC medium.

Suitable and preferred exposure times are in the range from 10 seconds to 20 minutes, preferably from 30 seconds to 15 minutes.

Suitable and preferred radiation intensities are in the range from 10 to 150 mW/cm$^2$, preferably from 20 to 120 mW/cm$^2$.

During polymerisation a voltage, preferably an AC voltage, is applied to the electrodes of the light modulation element. Suitable and preferred voltages are in the range from 1 to 30 V, preferably from 5 to 20 V.

The irradiation step b) can be repeated once, twice or more than two times (optional step c). These subsequent irradiation steps can be carried out either with or without applying a voltage. The voltage in step c), if applied, can be the same as or different from that of step b). If a voltage is applied in step c), it is preferably the same as or lower than in step b).

The functional principle of the device according to the invention will be explained in detail below. It is noted that no restriction of the scope of the claimed invention, which is not present in the claims, is to be derived from the comments on the assumed way of functioning.

Starting from the ULH texture, the cholesteric liquid-crystalline medium can be subjected to flexoelectric switching by application of an electric field between the driving electrode structures and common electrode structure, which are directly provided on the substrates. This causes rotation of the optic axis of the material in the plane of the cell substrates, which leads to a change in transmission when placing the material between crossed polarizers. The flexoelectric switching of inventive materials is further described in detail in the introduction above and in the examples.

The homeotropic "off state" of the light modulation element in accordance with the present invention provides excellent optical extinction and therefore a favourable contrast.

The required applied electric field strength is mainly dependent on two parameters. One is the electric field strength across the common electrode structure and driving electrode structure, the other is the $\Delta\varepsilon$ of the host mixture. The applied electric field strengths are typically lower than approximately 10 V/μm-1, preferably lower than approximately 8 V/μm-1 and more preferably lower than approximately 6 V/μm-1. Correspondingly, the applied driving voltage of the light modulation element according to the present invention is preferably lower than approximately 30 V, more preferably lower than approximately 24 V, and even more preferably lower than approximately 18 V.

The light modulation element according to the present invention can be operated with a conventional driving waveform as commonly known by the expert.

The light modulation element of the present invention can be used in various types of optical and electro-optical devices.

Said optical and electro optical devices include, without limitation electro-optical displays, liquid crystal displays (LCDs), non-linear optic (NLO) devices, and optical information storage devices.

Unless the context clearly indicates otherwise, as used herein plural forms of the terms herein are to be construed as including the singular form and vice versa.

The parameter ranges indicated in this application all include the limit values including the maximum permissible errors as known by the expert. The different upper and lower limit values indicated for various ranges of properties in combination with one another give rise to additional preferred ranges.

Throughout this application, the following conditions and definitions apply, unless expressly stated otherwise. All concentrations are quoted in percent by weight and relate to the respective mixture as a whole, all temperatures are quoted in degrees Celsius and all temperature differences are quoted in differential degrees. All physical properties are determined in accordance with "Merck Liquid Crystals, Physical Properties of Liquid Crystals", Status November 1997, Merck KGaA, Germany, and are quoted for a temperature of 20° C., unless expressly stated otherwise. The optical anisotropy ($\Delta n$) is determined at a wavelength of 589.3 nm. The dielectric anisotropy ($\Delta\varepsilon$) is determined at a frequency of 1 kHz or if explicitly stated at a frequency 19 GHz. The threshold voltages, as well as all other electro-optical properties, are determined using test cells produced at Merck KGaA, Germany. The test cells for the determination of $\Delta\varepsilon$ have a cell thickness of approximately 20 μm. The electrode is a circular ITO electrode having an area of 1.13 cm$^2$ and a guard ring. The orientation layers are SE-1211 from Nissan Chemicals, Japan, for homeotropic orientation ($\varepsilon_\parallel$) and polyimide AL-1054 from Japan Synthetic Rubber, Japan, for homogeneous orientation ($\varepsilon_\perp$). The capacitances are determined using a Solatron 1260 frequency response analyser using a sine wave with a voltage of 0.3 $V_{rms}$. The light used in the electro-optical measurements is white light. A set-up using a commercially available DMS instrument from Autronic-Melchers, Germany, is used here.

Throughout the description and claims of this specification, the words "comprise" and "contain" and variations of the words, for example "comprising" and "comprises", mean "including but not limited to", and are not intended to (and do not) exclude other components. On the other hand, the word "comprise" also encompasses the term "consisting of" but is not limited to it.

It will be appreciated that many of the features described above, particularly of the preferred embodiments, are inventive in their own right and not just as part of an embodiment of the present invention. Independent protection may be sought for these features in addition to, or alternative to any invention presently claimed.

Throughout the present application it is to be understood that the angles of the bonds at a C atom being bound to three adjacent atoms, e.g. in a C=C or C=O double bond or e.g. in a benzene ring, are 120° and that the angles of the bonds at a C atom being bound to two adjacent atoms, e.g. in a C≡C or in a C≡N triple bond or in an allylic position C=C=C are 180°, unless these angles are otherwise restricted, e.g. like being part of small rings, like 3-, 5- or 5-atomic rings, notwithstanding that in some instances in some structural formulae these angles are not represented exactly.

It will be appreciated that variations to the foregoing embodiments of the invention can be made while still falling within the scope of the invention. Alternative features serving the same, equivalent or similar purpose may replace each feature disclosed in this specification, unless stated otherwise. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

Without further elaboration, it is believed that one skilled in the art can, using the preceding description, utilize the present invention to its fullest extent. The following examples are, therefore, to be construed as merely illustrative and not limitative of the remainder of the disclosure in any way whatsoever.

For the present invention,

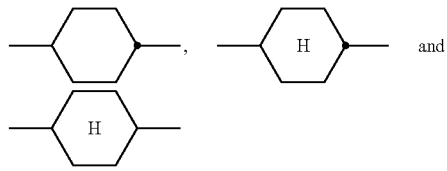

denote trans-1,4-cyclohexylene, and

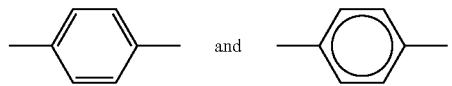

denote 1,4-phenylene.

The following abbreviations are used to illustrate the liquid crystalline phase behavior of the compounds: K=crystalline; N=nematic; N2=second nematic; S=smectic; Ch=cholesteric; I=isotropic; Tg=glass transition. The numbers between the symbols indicate the phase transition temperatures in ° C.

In the present application and especially in the following examples, the structures of the liquid crystal compounds are represented by abbreviations, which are also called "acronyms". The transformation of the abbreviations into the corresponding structures is straightforward according to the following three tables A to C.

All groups $C_nH_{2n+1}$, $C_mH_{2m+1}$, and $C_lH_{2l+1}$ are preferably straight chain alkyl groups with n, m and l C-atoms, respectively, all groups $C_nH_{2n}$, $C_mH_{2m}$ and $C_lH_{2l}$ are preferably $(CH_2)_n$, $(CH_2)_m$ and $(CH_2)_l$, respectively and —CH═CH— preferably is trans-respectively E vinylene.

Table A lists the symbols used for the ring elements, table B those for the linking groups and table C those for the symbols for the left hand and the right hand end groups of the molecules.

Table D lists exemplary molecular structures together with their respective codes.

TABLE A

| Ring Elements | |
| --- | --- |
| C | (cyclohexane) |
| P | (1,4-phenylene) |
| D | (1,3-dioxane) |
| DI | (1,3-dioxane, inverted) |
| A | (tetrahydropyran) |
| AI | (tetrahydropyran, inverted) |
| G | (2-fluoro-1,4-phenylene) |
| GI | (3-fluoro-1,4-phenylene) |

TABLE A-continued

| Ring Elements | |
| --- | --- |
| G(Cl) | (2-chloro-1,4-phenylene) |
| GI(Cl) | (3-chloro-1,4-phenylene) |
| G(1) | (2-methyl-1,4-phenylene) |
| GI(1) | (3-methyl-1,4-phenylene) |
| U | (2,3-difluoro-1,4-phenylene) |
| UI | (2,3-difluoro-1,4-phenylene, inverted) |
| Y | (2,3-difluoro-1,4-phenylene) |
| M | (pyrimidine) |
| MI | (pyrimidine, inverted) |
| N | (pyridine) |
| NI | (pyridine, inverted) |

TABLE A-continued

Ring Elements

| Code | Structure |
|---|---|
| np | naphthalene-2,6-diyl |
| n3f | trifluoronaphthalene-2,6-diyl |
| n3fI | trifluoronaphthalene (inverted) |
| th | tetrahydronaphthalene-2,6-diyl |
| thI | tetrahydronaphthalene (inverted) |
| th2f | difluoro-tetrahydronaphthalene |
| th2fI | difluoro-tetrahydronaphthalene (inverted) |
| o2f | difluoro-chromane |
| o2fI | difluoro-chromane (inverted) |
| dh | decahydronaphthalene-2,6-diyl |
| K | trifluoro-indane |
| KI | trifluoro-indane (inverted) |
| L | cyclohexene-1,4-diyl |
| LI | cyclohexene-1,4-diyl (inverted) |
| F | fluoro-cyclohexene |
| FI | fluoro-cyclohexene (inverted) |

TABLE B

Linking Groups

| Code | Group | Code | Group |
|---|---|---|---|
| n | $(-CH_2-)_n$ | | "n" is an integer except 0 and 2 |
| E | $-CH_2-CH_2-$ | | |
| V | $-CH=CH-$ | | |
| T | $-C\equiv C-$ | | |
| W | $-CF_2-CF_2-$ | | |
| B | $-CF=CF-$ | | |
| Z | $-CO-O-$ | ZI | $-O-CO-$ |
| X | $-CF=CH-$ | XI | $-CH=CF-$ |
| O | $-CH_2-O-$ | OI | $-O-CH_2-$ |
| Q | $-CF_2-O-$ | QI | $-O-CF_2-$ |

TABLE C

End Groups

| Left hand side, used alone or in combination with others | | Right hand side, used alone or in combination with others | |
|---|---|---|---|
| -n- | $C_nH_{2n+1}$— | -n | —$C_nH_{2n+1}$ |
| -nO- | $C_nH_{2n+1}$—O— | -nO | —O—$C_nH_{2n+1}$ |
| —V— | $CH_2$=CH— | —V | —CH=$CH_2$ |
| -nV- | $C_nH_{2n+1}$—CH=CH— | -nV | —$C_nH_{2n}$—CH=$CH_2$ |
| -Vn- | $CH_2$=CH—$C_nH_{2n}$— | -Vn | —CH=CH—$C_nH_{2n+1}$ |
| -nVm- | $C_nH_{2n+1}$—CH=CH—$C_mH_{2m}$— | -nVm | —$C_nH_{2n}$—CH=CH—$C_mH_{2m+1}$ |
| —N— | N≡C— | —N | —C≡N |
| —S— | S=C=N— | —S | —N=C=S |
| —F— | F— | —F | —F |
| -CL- | Cl— | -CL | —Cl |
| -M- | $CFH_2$— | -M | —$CFH_2$ |
| -D- | $CF_2H$— | -D | —$CF_2H$ |
| -T- | $CF_3$— | -T | —$CF_3$ |
| -MO- | $CFH_2$O— | -OM | —$OCFH_2$ |
| -DO- | $CF_2$HO— | -OD | —$OCF_2H$ |
| -TO- | $CF_3$O— | -OT | —$OCF_3$ |
| -A- | H—C≡C— | -A | —C≡C—H |
| -nA- | $C_nH_{2n+1}$—C≡C— | -An | —C≡C—$C_nH_{2n+1}$ |
| -NA- | N≡C—C≡C— | -AN | —C≡C—C≡N |

| Left hand side, used in combination with others only | | Right hand side, used in combination with others only | |
|---|---|---|---|
| -...n...- | —$C_nH_{2n}$— | -...n... | —$C_nH_{2n}$— |
| -...M...- | —CFH— | -...M... | —CFH— |
| -...D...- | —$CF_2$— | -...D... | —$CF_2$— |
| -...V...- | —CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | wherein n and m each are integers and three points " . . . " indicate a space for other symbols of this table.

Preferably, the liquid crystalline media according to the present invention comprise one or more compounds selected from the group of compounds of the formulae of the following table.

TABLE D

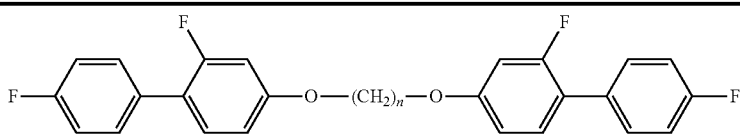

F-PGI-O-n-O-GP-F

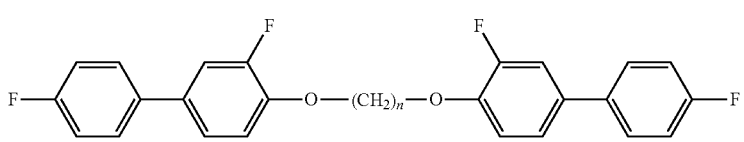

F-PG-O-n-O-GIP-F

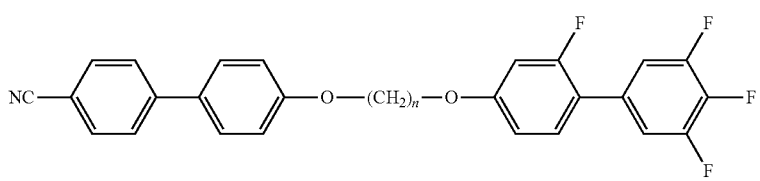

N-PP-O-n-O-GU-F

TABLE D-continued
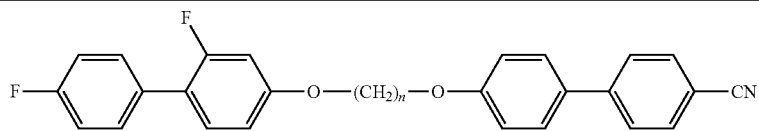
F-PGI-O-n-O-PP-N
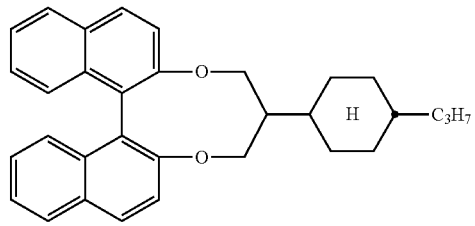
R-5011 respectively S-5011
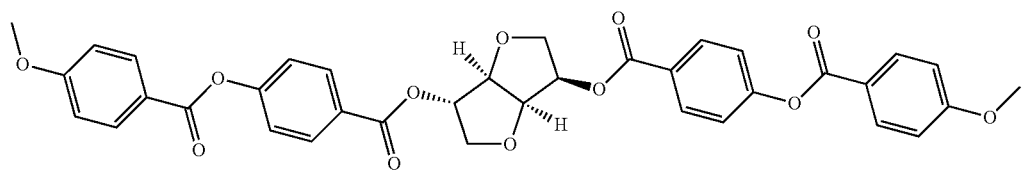
CD-1
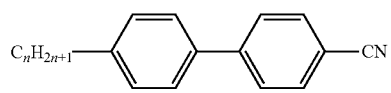
PP-n-N
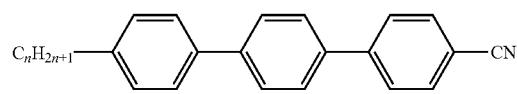
PPP-n-N
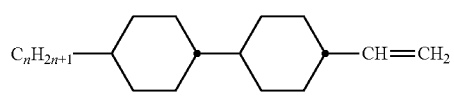
CC-n-V
CPP-n-m
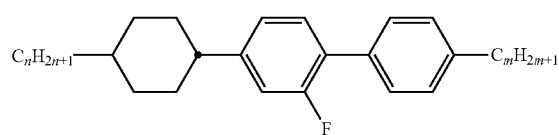
CGP-n-m
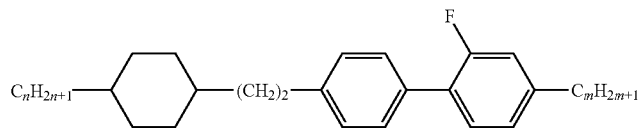
CEPGI-n-m TABLE D-continued
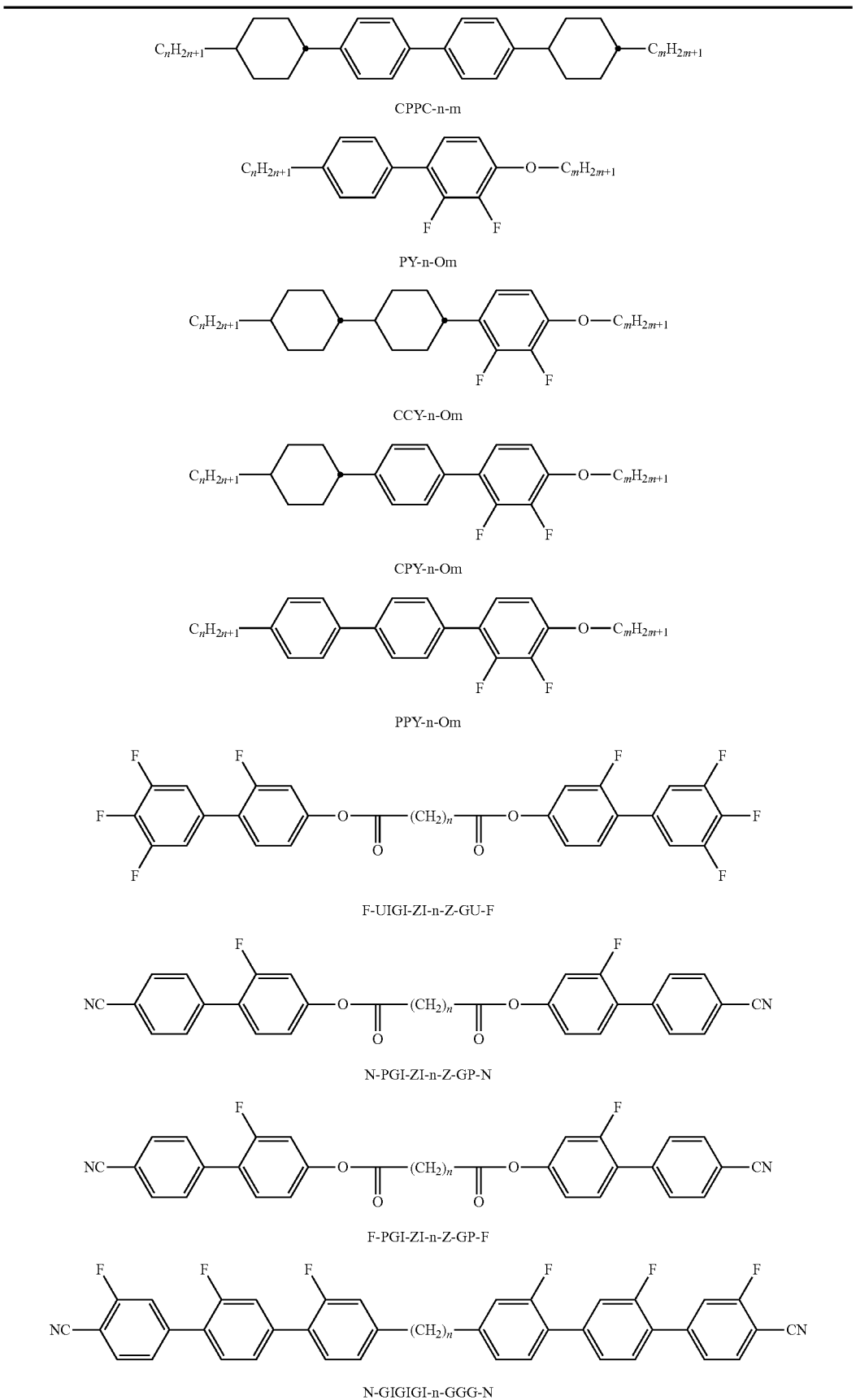

TABLE D-continued
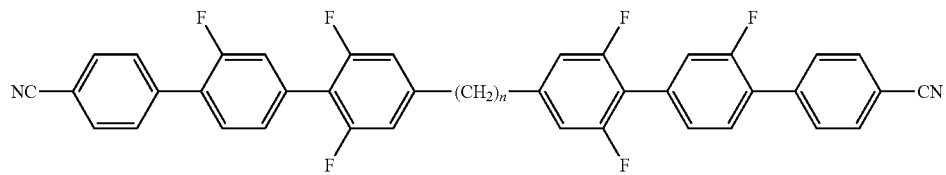
N-PGIUI-n-UGP-N
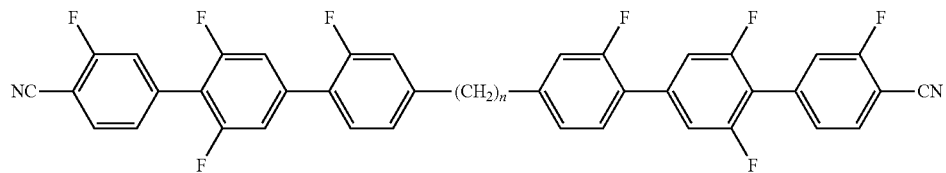
N-GIUIGI-n-GUG-N
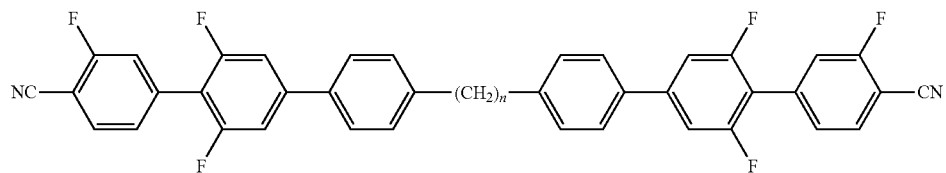
N-GIUIP-n-PUG-N
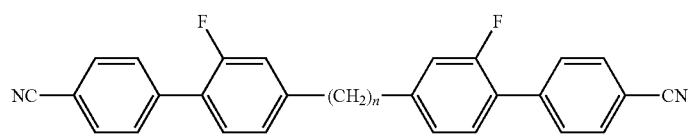
N-PGI-n-GP-N
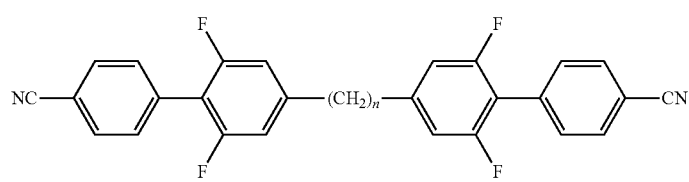
N-PUI-n-UP-N
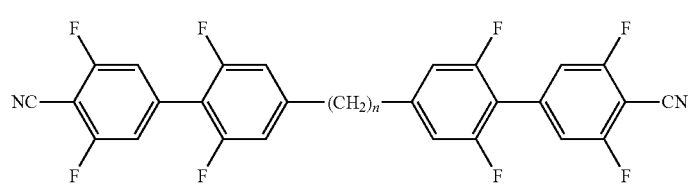
N-UIUI-n-UU-N
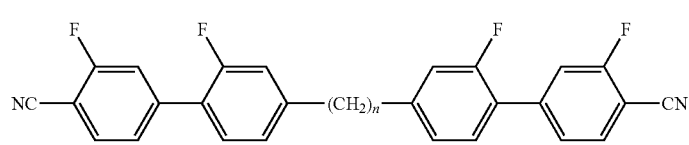
N-GIGI-n-GG-N TABLE D-continued
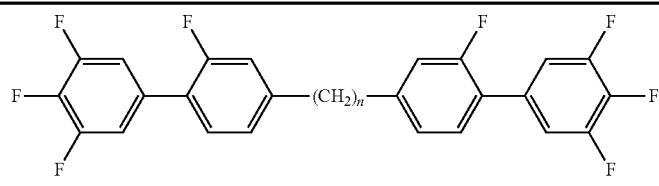
F-UIGI-n-GU-F
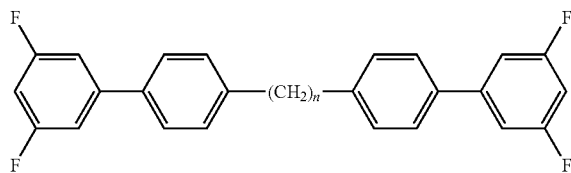
UIP-n-PU
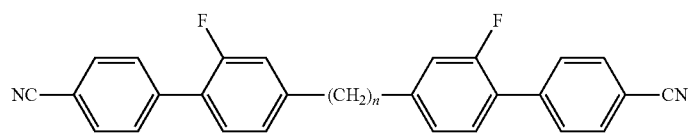
N-PGI-n-GP-N
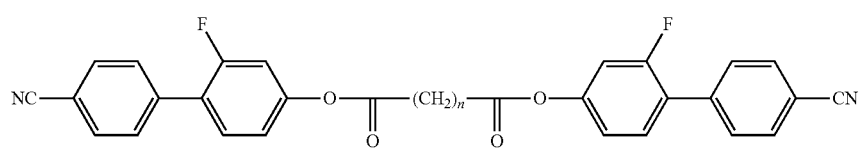
N-PGI-ZI-n-Z-GP-N
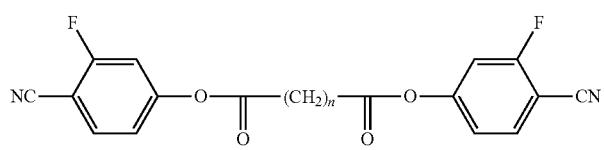
N-GI-ZI-n-Z-G-N
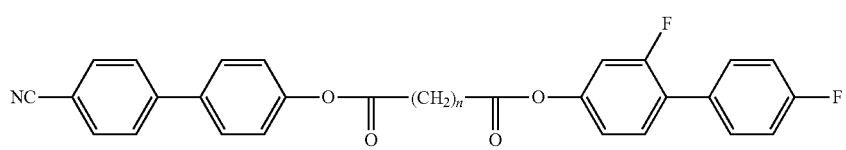
N-PP-ZI-n-Z-GP-F
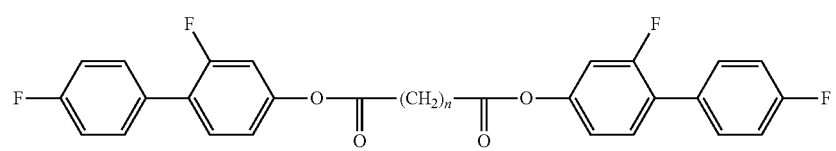
F-PGI-ZI-n-Z-GP-F
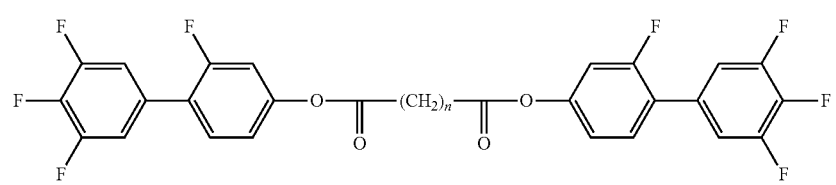
F-UIGI-ZI-n-Z-GU-F TABLE D-continued
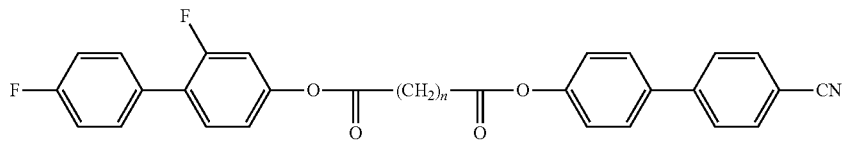
F-PGI-ZI-n-Z-PP-N
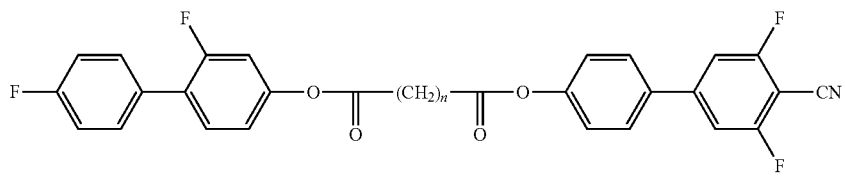
F-PGI-ZI-n-Z-PU-N
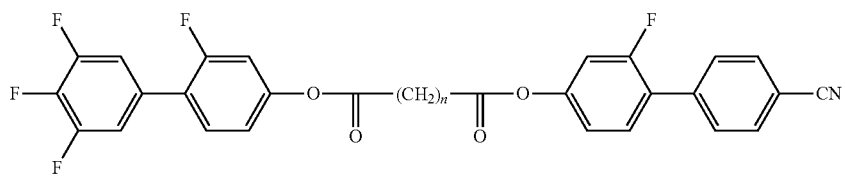
F-UIGI-ZI-n-Z-GP-N
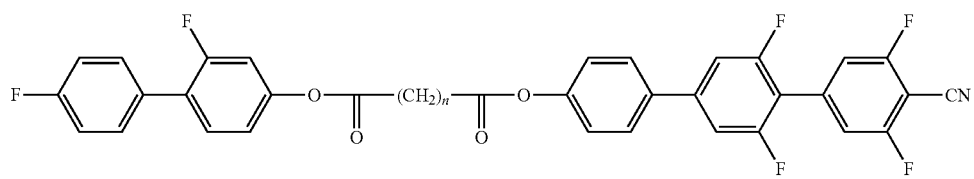
F-PGI-ZI-n-Z-PUU-N
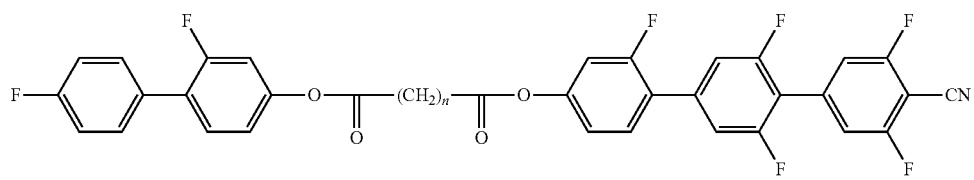
F-PGI-ZI-n-Z-GUU-N
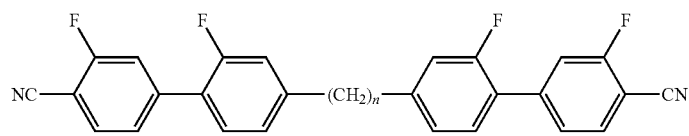
N-GIGI-n-GG-N
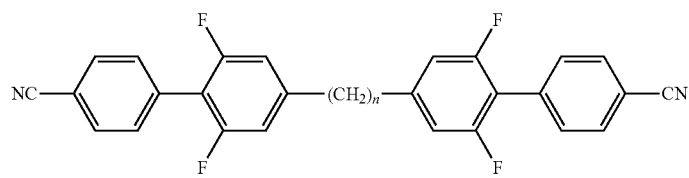
N-PUI-n-UP-N
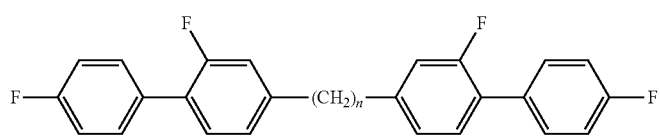

TABLE D-continued
F-PGI-n-GP-F
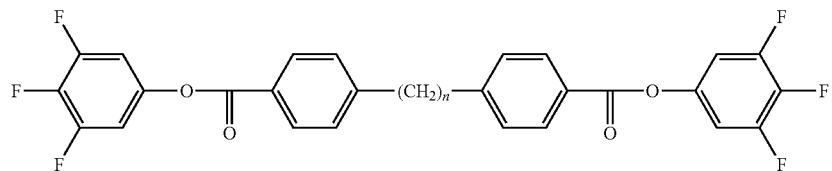
F-UIZIP-n-PZU-F
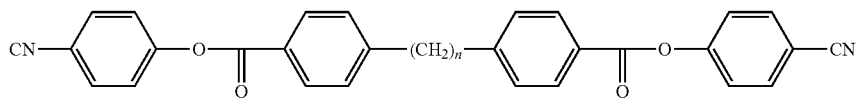
N-PZIP-n-PZP-N
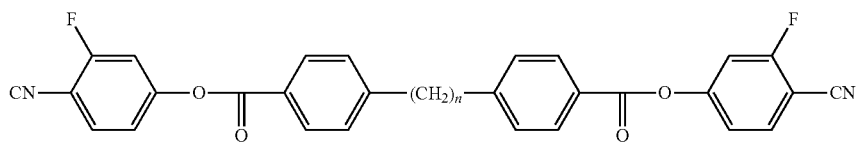
N-GIZIP-n-PZG-N
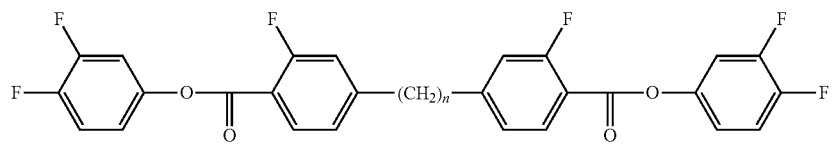
F-GIZIGI-n-GZG-F
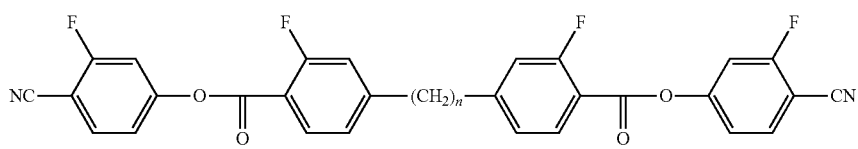
N-GIZIGI-n-GZG-N
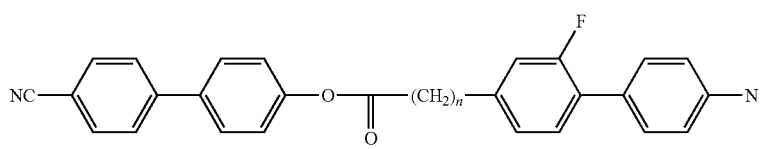
N-PP-ZI-n-GP-N
TABLE E
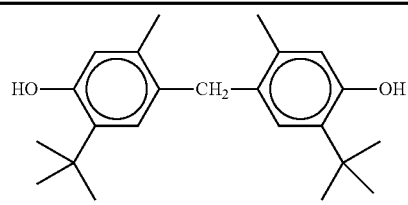

TABLE E-continued
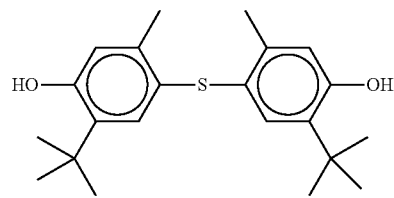
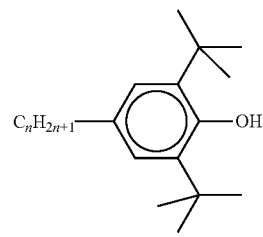
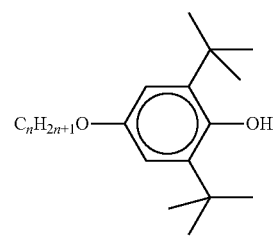
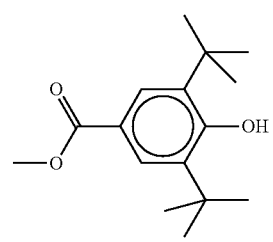
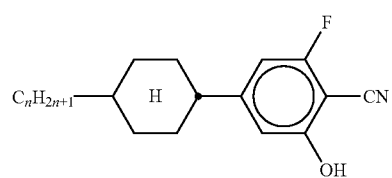
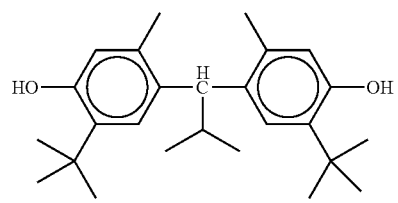
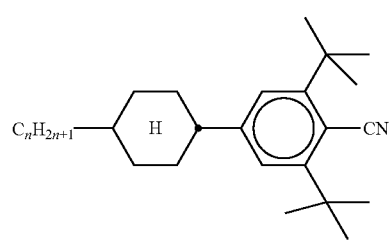

TABLE E-continued
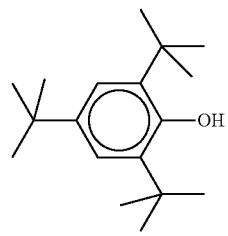
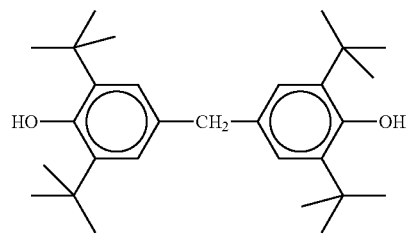
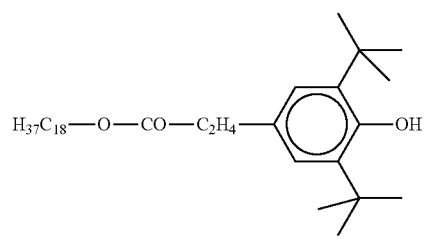
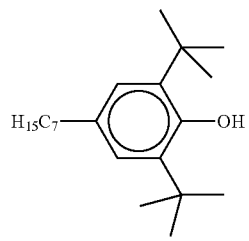
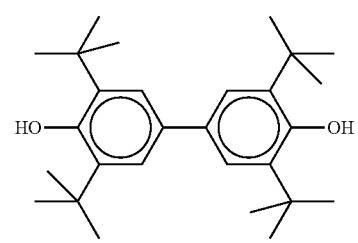
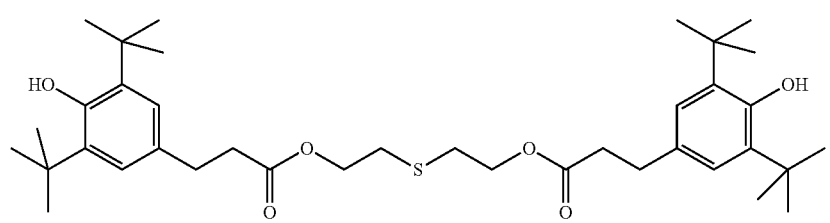 [SMILES: CC(C)(C)c1cc(CCC(=O)OCCSCCOC(=O)CCc2cc(C(C)(C)C)c(O)c(C(C)(C)C)c2)cc(C(C)(C)C)c1O]

TABLE E-continued
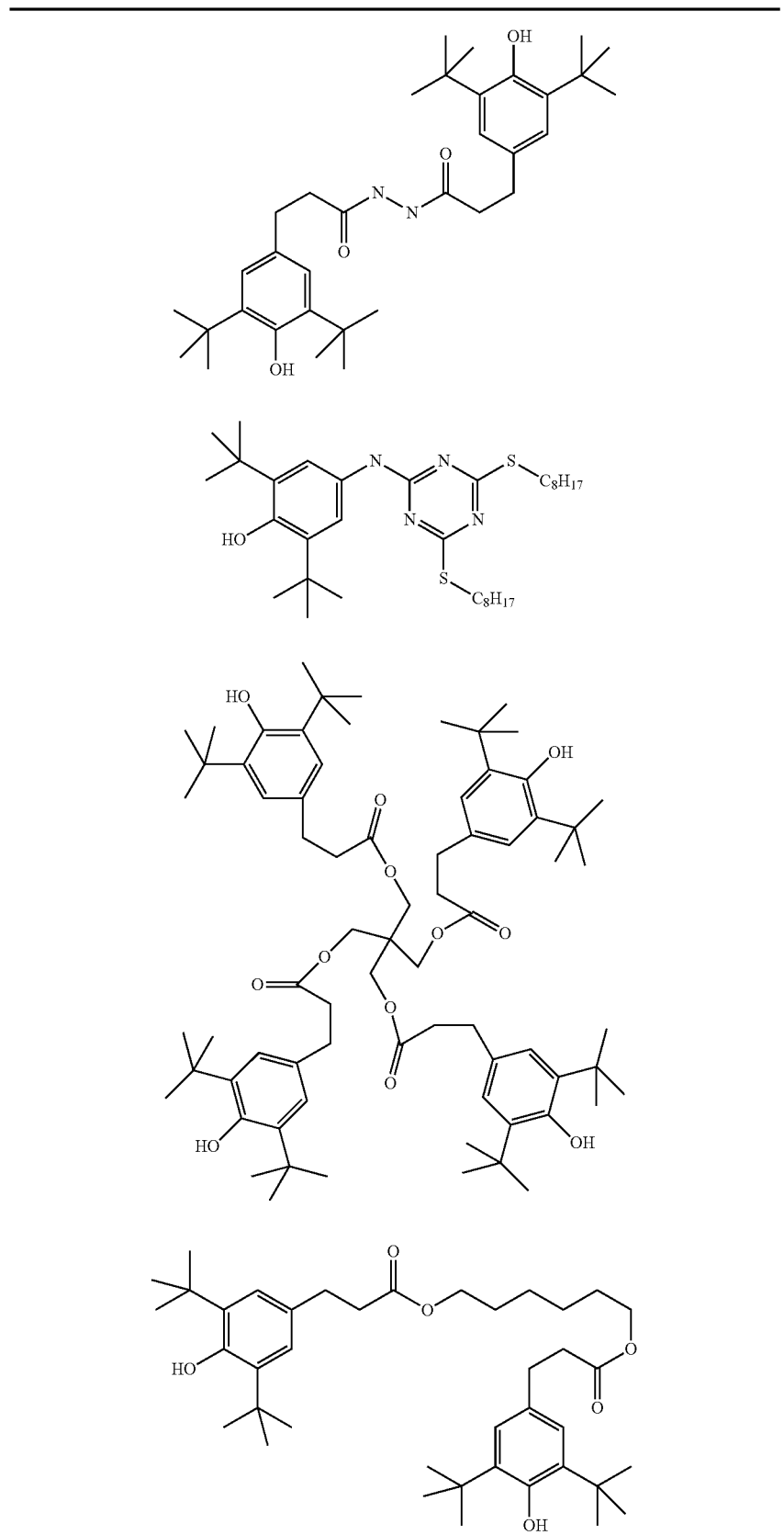

TABLE E-continued
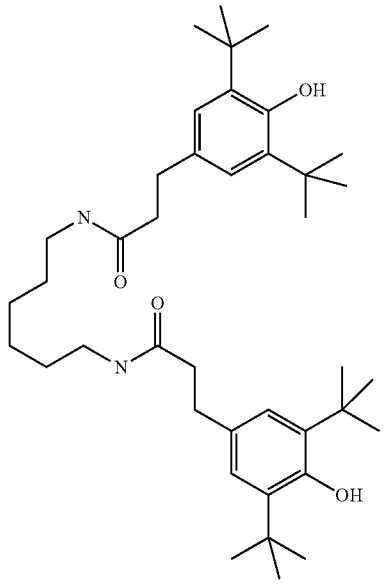 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
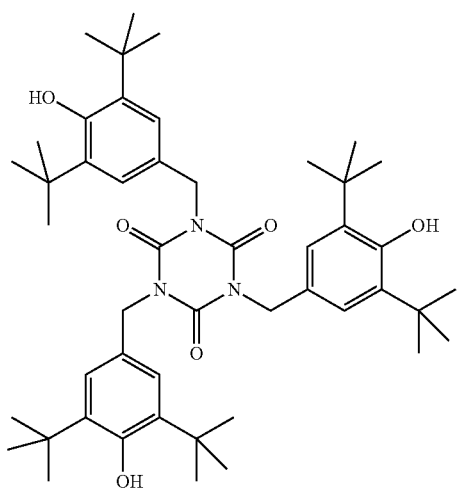 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
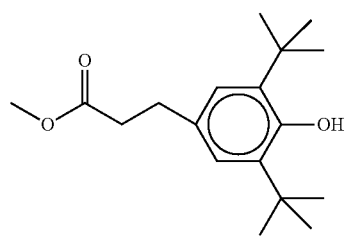
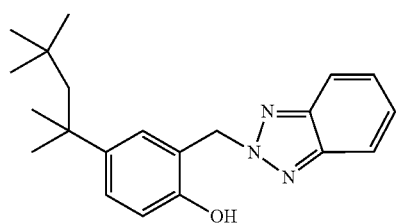 [SMILES: CC(C)(C)CC(C)(C)c1ccc(O)c(Cn2nc3ccccc3n2)c1]

TABLE E-continued
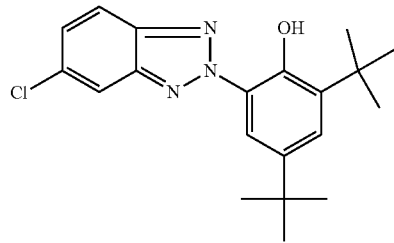 [SMILES: CC(C)(C)c1cc(-n2nc3ccc(Cl)cc3n2)c(O)c(C(C)(C)C)c1]
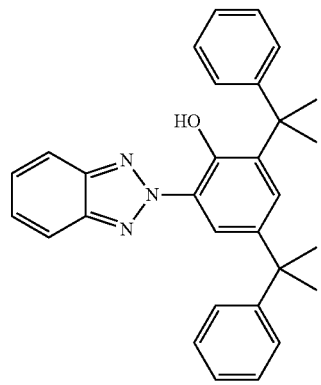 [SMILES: CC(C)(c1ccccc1)c1cc(-n2nc3ccccc3n2)c(O)c(C(C)(C)c2ccccc2)c1]
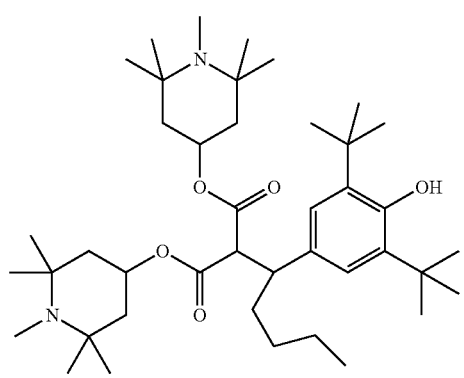 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
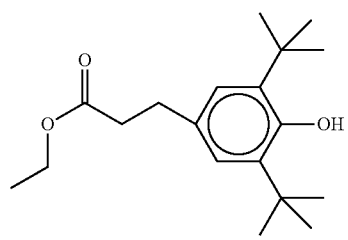
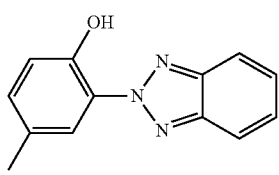 [SMILES: Cc1ccc(O)c(-n2nc3ccccc3n2)c1]
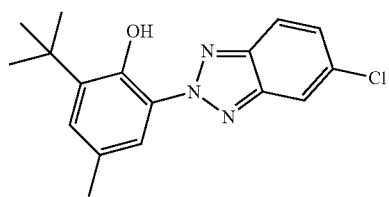 [SMILES: Cc1cc(-n2nc3ccc(Cl)cc3n2)c(O)c(C(C)(C)C)c1]

TABLE E-continued
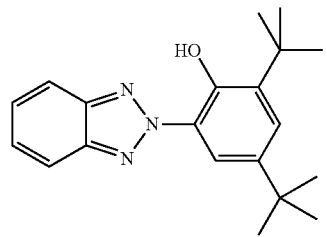 [SMILES: CC(C)(C)c1cc(-n2nc3ccccc3n2)c(O)c(C(C)(C)C)c1]
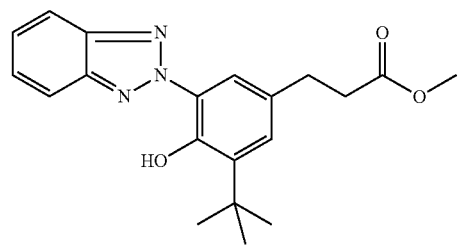 [SMILES: COC(=O)CCc1cc(-n2nc3ccccc3n2)c(O)c(C(C)(C)C)c1]
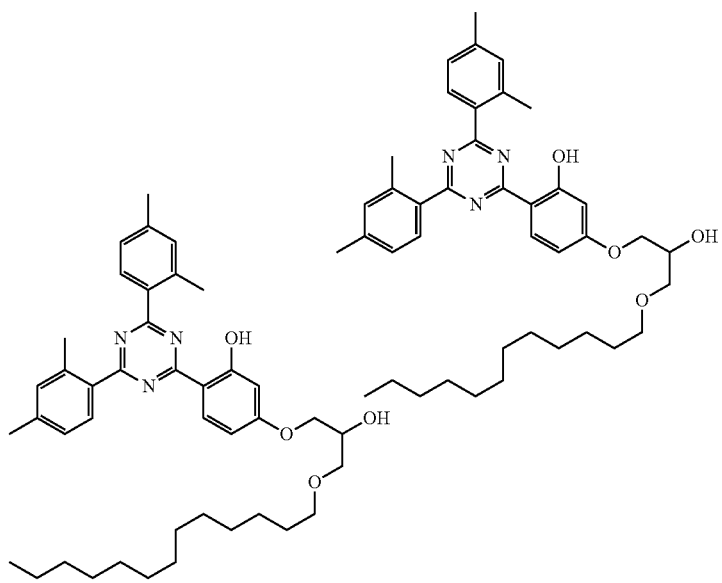
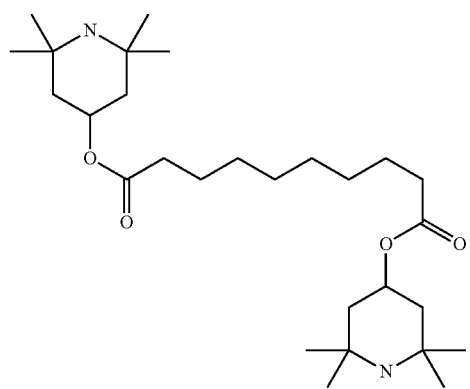

TABLE E-continued

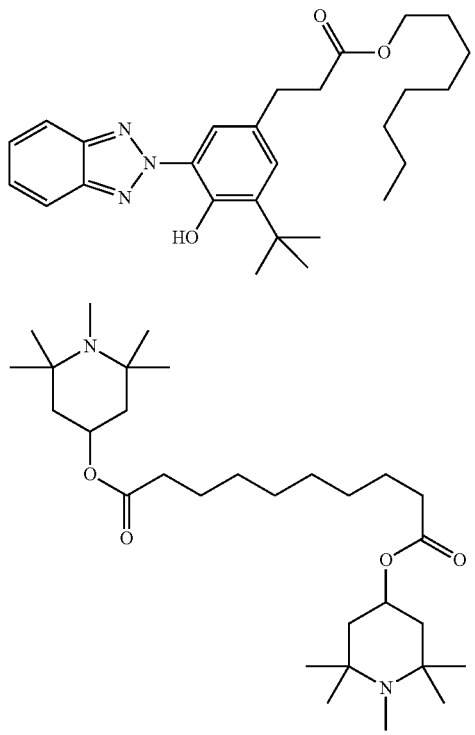

Table E indicates possible stabilisers which can be added to the LC media (n here denotes an integer from 1 to 12, terminal methyl groups are not shown).

The LC media preferably comprise 0 to 10% by weight, in particular 1 ppm to 5% by weight and particularly preferably 1 ppm to 3% by weight, of stabilisers. The LC media preferably comprise one or more stabilisers selected from the group consisting of compounds from Table E.

TABLE F

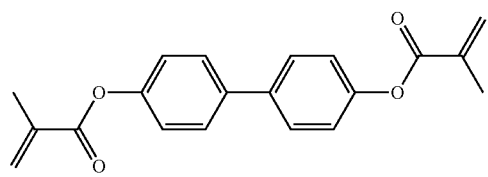

RM-1

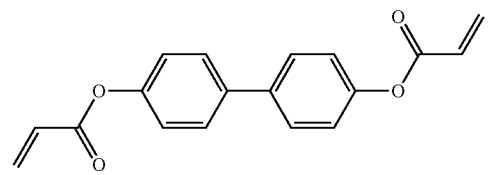

RM-2

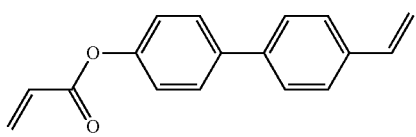 [SMILES: C=CC(=O)Oc1ccc(-c2ccc(C=C)cc2)cc1]

RM-3

TABLE F-continued
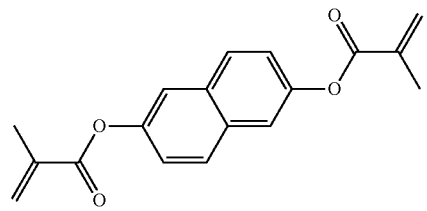 [SMILES: C=C(C)C(=O)Oc1ccc2cc(OC(=O)C(=C)C)ccc2c1]
RM-4
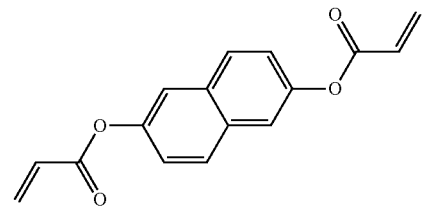 [SMILES: C=CC(=O)Oc1ccc2cc(OC(=O)C=C)ccc2c1]
RM-5
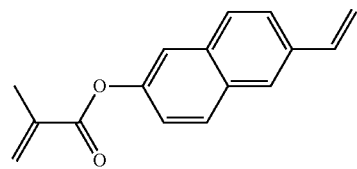 [SMILES: C=Cc1ccc2cc(OC(=O)C(=C)C)ccc2c1]
RM-6
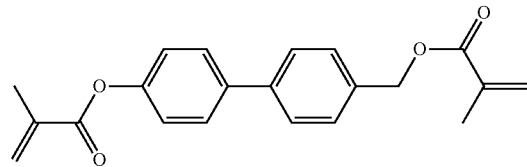 [SMILES: C=C(C)C(=O)OCc1ccc(-c2ccc(OC(=O)C(=C)C)cc2)cc1]
RM-7
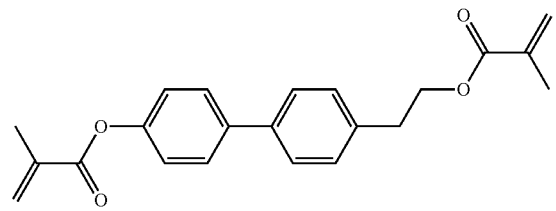
RM-8
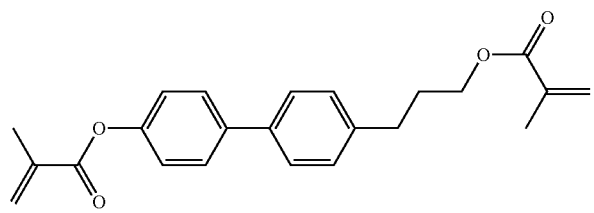 [SMILES: C=C(C)C(=O)OCCCc1ccc(-c2ccc(OC(=O)C(=C)C)cc2)cc1]
RM-9
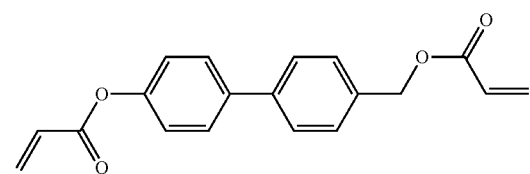 [SMILES: C=CC(=O)OCc1ccc(-c2ccc(OC(=O)C=C)cc2)cc1]
RM-10
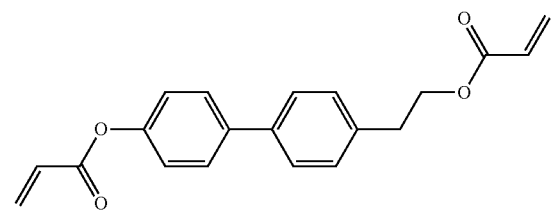 [SMILES: C=CC(=O)OCCc1ccc(-c2ccc(OC(=O)C=C)cc2)cc1]
RM-11

TABLE F-continued
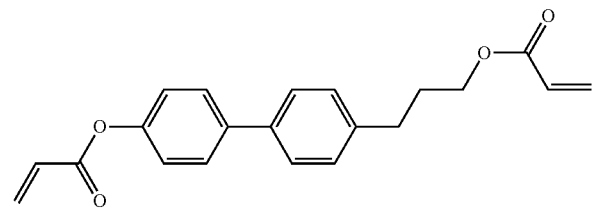 [SMILES: C=CC(=O)OCCCc1ccc(-c2ccc(OC(=O)C=C)cc2)cc1] RM-12
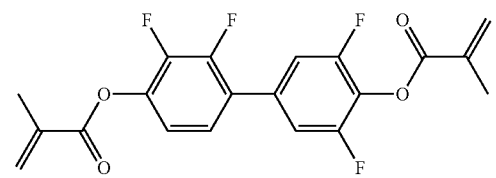 [SMILES: C=C(C)C(=O)Oc1ccc(-c2cc(F)c(OC(=O)C(=C)C)c(F)c2)c(F)c1F] RM-13
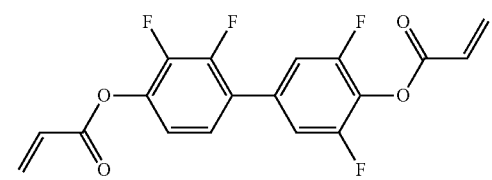 [SMILES: C=CC(=O)Oc1ccc(-c2cc(F)c(OC(=O)C=C)c(F)c2)c(F)c1F] RM-14
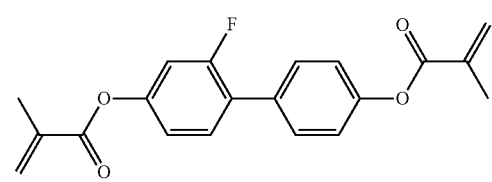 RM-15
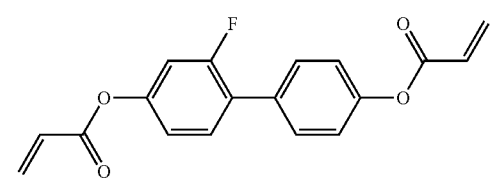 [SMILES: C=CC(=O)Oc1ccc(-c2ccc(OC(=O)C=C)cc2F)cc1] RM-16
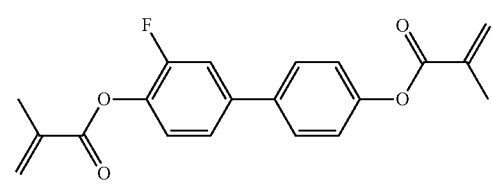 [SMILES: C=C(C)C(=O)Oc1ccc(-c2ccc(OC(=O)C(=C)C)c(F)c2)cc1] RM-17
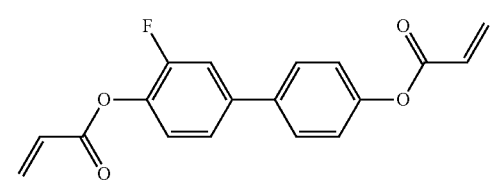 RM-18
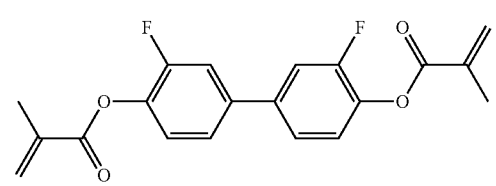 RM-19

TABLE F-continued
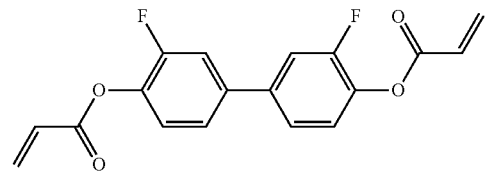
RM-20
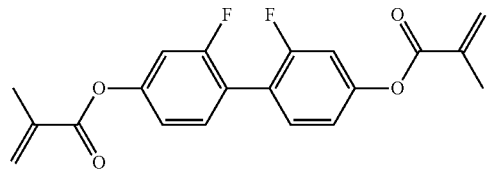
RM-21
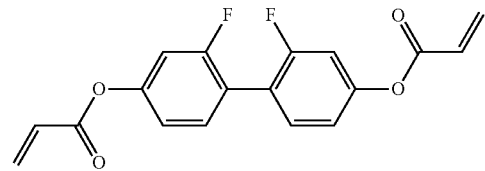
RM-22
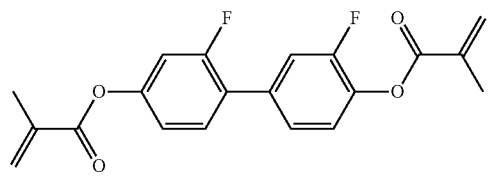 [SMILES: C=C(C)C(=O)Oc1ccc(-c2ccc(OC(=O)C(=C)C)c(F)c2)cc1F]
RM-23
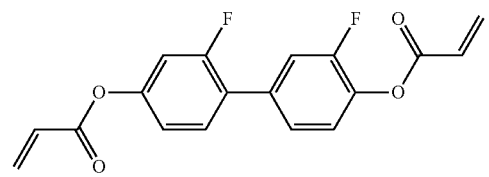 [SMILES: C=CC(=O)Oc1ccc(-c2ccc(OC(=O)C=C)c(F)c2)c(F)c1]
RM-24
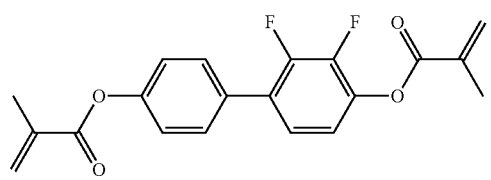 [SMILES: C=C(C)C(=O)Oc1ccc(-c2ccc(OC(=O)C(=C)C)c(F)c2F)cc1]
RM-25
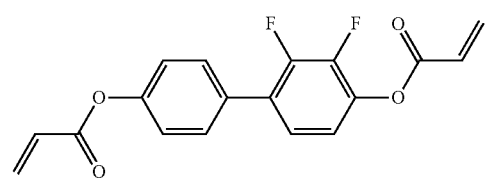
RM-26
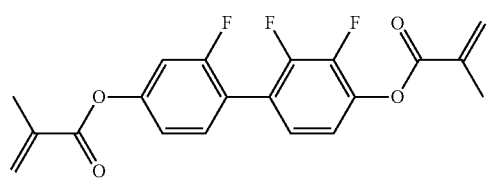
RM-27
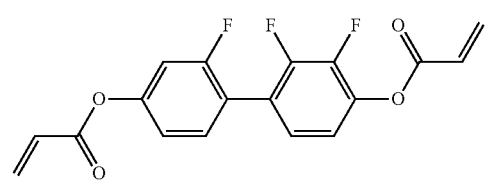 [SMILES: C=CC(=O)Oc1ccc(-c2ccc(OC(=O)C=C)c(F)c2F)c(F)c1]
RM-28

TABLE F-continued
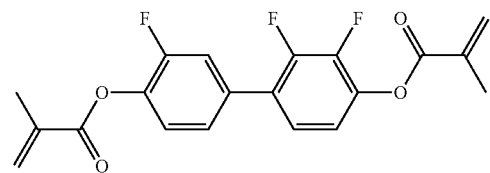 RM-29
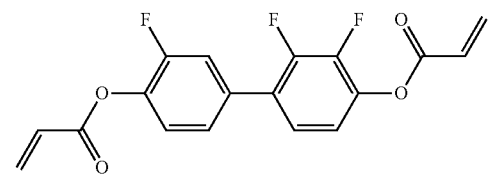 [SMILES: C=CC(=O)Oc1ccc(-c2ccc(OC(=O)C=C)c(F)c2F)cc1F] RM-30
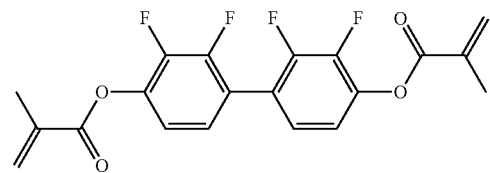 RM-31
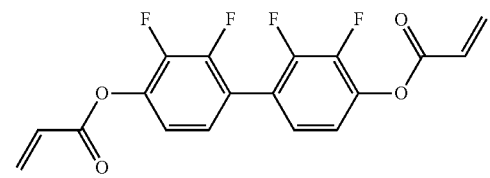 RM-32
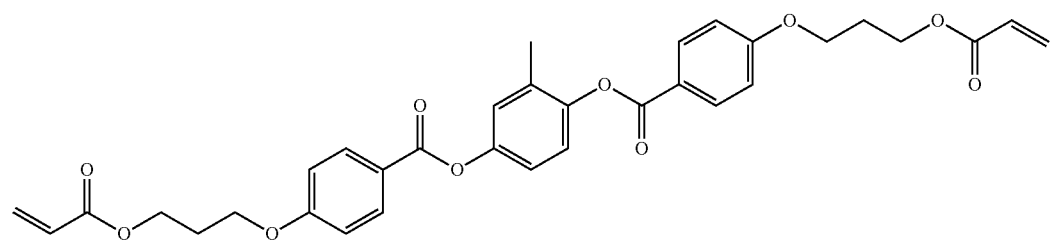 [SMILES: C=CC(=O)OCCCOc1ccc(C(=O)Oc2ccc(OC(=O)c3ccc(OCCCOC(=O)C=C)cc3)c(C)c2)cc1] RM-33
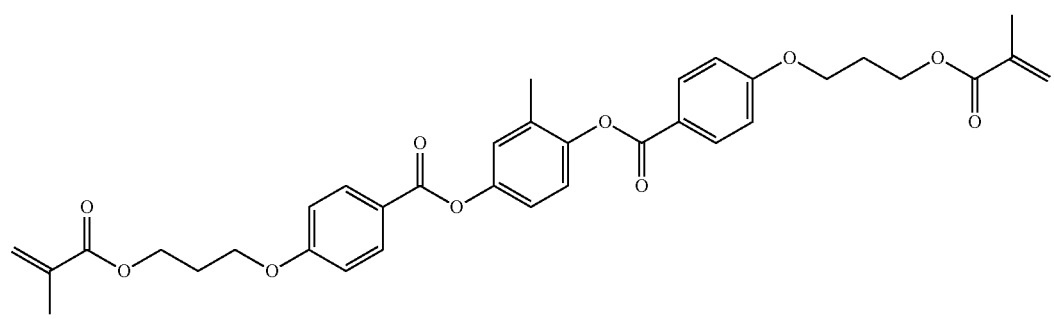 [SMILES: C=C(C)C(=O)OCCCOc1ccc(C(=O)Oc2ccc(OC(=O)c3ccc(OCCCOC(=O)C(=C)C)cc3)c(C)c2)cc1] RM-34
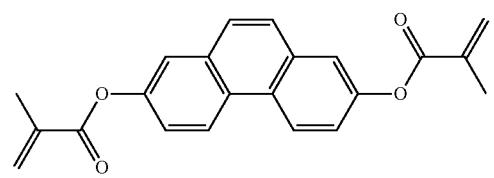 RM-35

TABLE F-continued
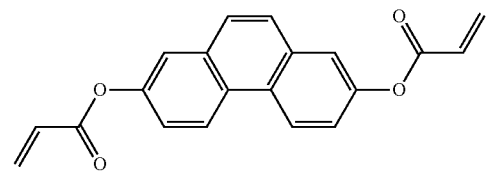 [SMILES: C=CC(=O)Oc1ccc2c(ccc3cc(OC(=O)C=C)ccc32)c1] RM-36
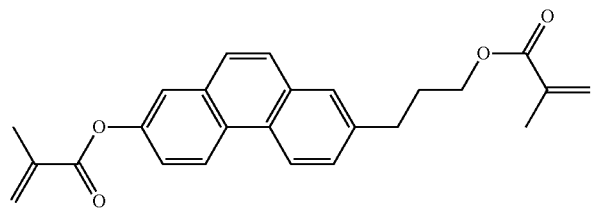 [SMILES: C=C(C)C(=O)OCCCc1ccc2c(ccc3cc(OC(=O)C(=C)C)ccc32)c1] RM-37
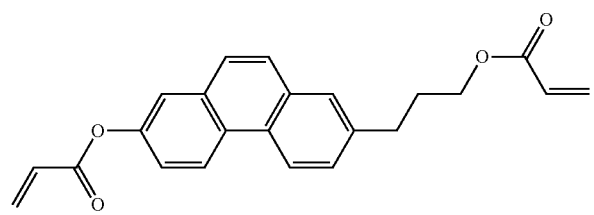 [SMILES: C=CC(=O)OCCCc1ccc2c(ccc3cc(OC(=O)C=C)ccc32)c1] RM-38
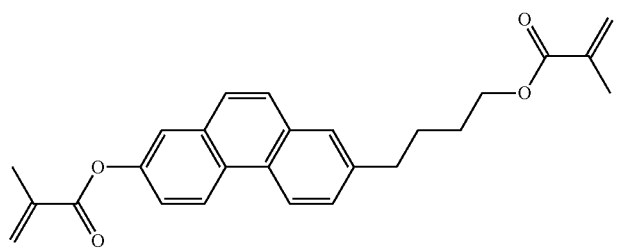 [SMILES: C=C(C)C(=O)OCCCCc1ccc2c(ccc3cc(OC(=O)C(=C)C)ccc32)c1] RM-39
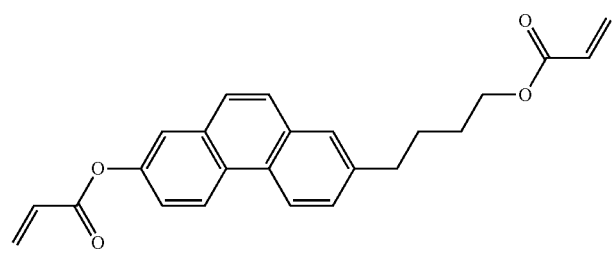 [SMILES: C=CC(=O)OCCCCc1ccc2c(ccc3cc(OC(=O)C=C)ccc32)c1] RM-40
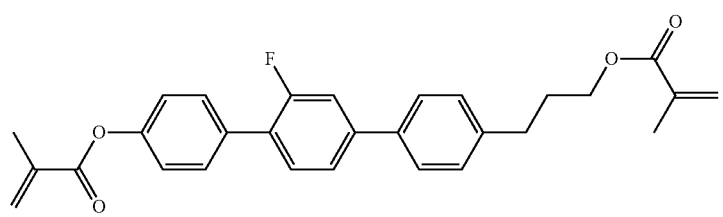 [SMILES: C=C(C)C(=O)OCCCc1ccc(-c2ccc(-c3ccc(OC(=O)C(=C)C)cc3)c(F)c2)cc1] RM-41
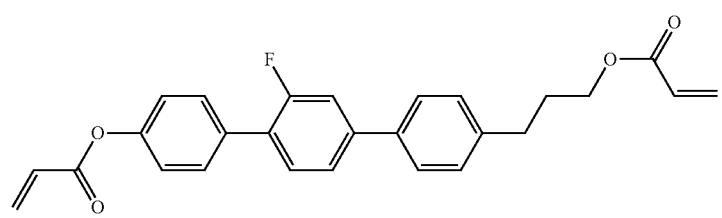 [SMILES: C=CC(=O)OCCCc1ccc(-c2ccc(-c3ccc(OC(=O)C=C)cc3)c(F)c2)cc1] RM-42

TABLE F-continued
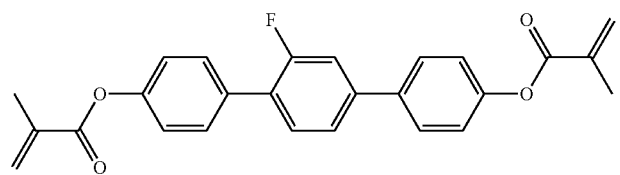 [SMILES: C=C(C)C(=O)Oc1ccc(-c2ccc(-c3ccc(OC(=O)C(=C)C)cc3)c(F)c2)cc1] RM-43
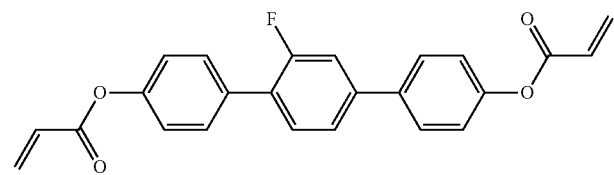 [SMILES: C=CC(=O)Oc1ccc(-c2ccc(-c3ccc(OC(=O)C=C)cc3)c(F)c2)cc1] RM-44
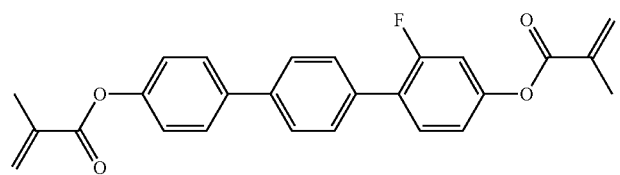 RM-45
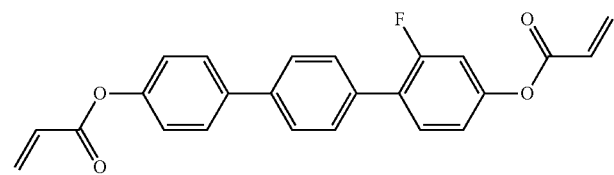 RM-46
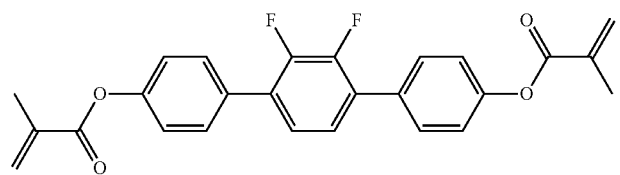 RM-47
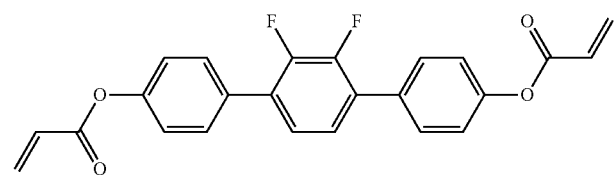 RM-48
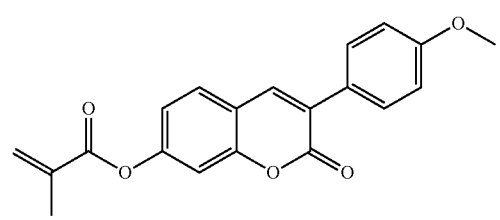 [SMILES: C=C(C)C(=O)Oc1ccc2cc(-c3ccc(OC)cc3)c(=O)oc2c1] RM-49
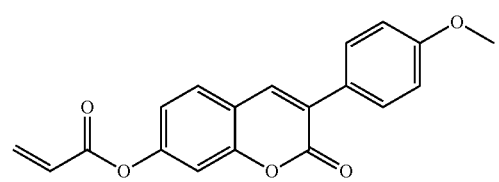 [SMILES: C=CC(=O)Oc1ccc2cc(-c3ccc(OC)cc3)c(=O)oc2c1] RM-50

TABLE F-continued
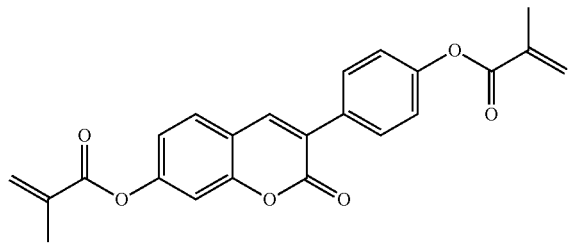 [SMILES: C=C(C)C(=O)Oc1ccc(-c2cc3ccc(OC(=O)C(=C)C)cc3oc2=O)cc1] RM-51
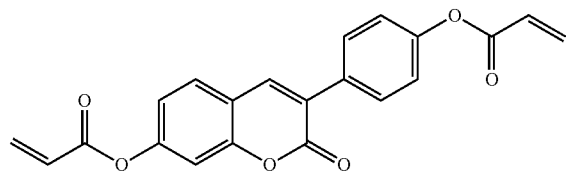 [SMILES: C=CC(=O)Oc1ccc(-c2cc3ccc(OC(=O)C=C)cc3oc2=O)cc1] RM-52
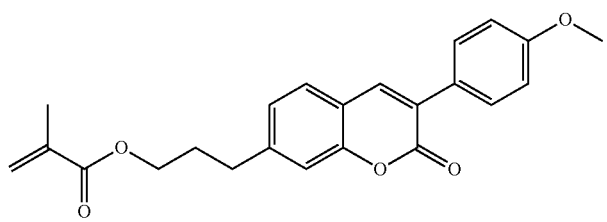 [SMILES: C=C(C)C(=O)OCCCc1ccc2cc(-c3ccc(OC)cc3)c(=O)oc2c1] RM-53
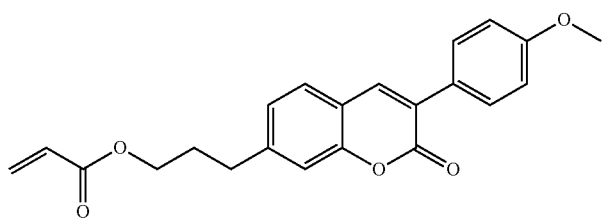 [SMILES: C=CC(=O)OCCCc1ccc2cc(-c3ccc(OC)cc3)c(=O)oc2c1] RM-54
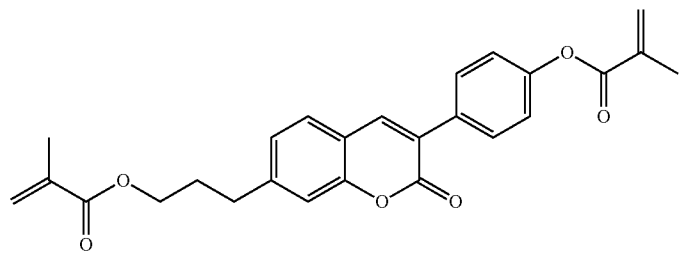 [SMILES: C=C(C)C(=O)OCCCc1ccc2cc(-c3ccc(OC(=O)C(=C)C)cc3)c(=O)oc2c1] RM-55
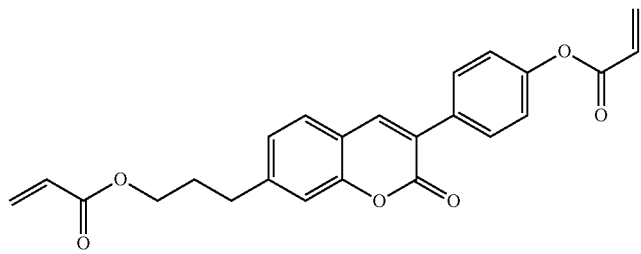 [SMILES: C=CC(=O)OCCCc1ccc2cc(-c3ccc(OC(=O)C=C)cc3)c(=O)oc2c1] RM-56
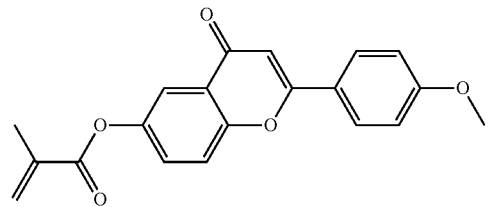 [SMILES: C=C(C)C(=O)Oc1ccc2oc(-c3ccc(OC)cc3)cc(=O)c2c1] RM-57

TABLE F-continued
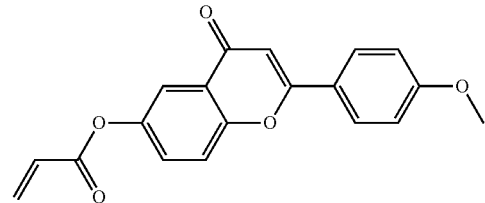 [SMILES: C=CC(=O)Oc1ccc2oc(-c3ccc(OC)cc3)cc(=O)c2c1]
RM-58
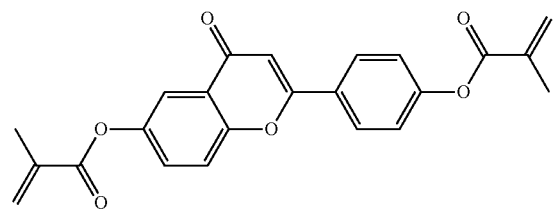 [SMILES: C=C(C)C(=O)Oc1ccc(-c2cc(=O)c3cc(OC(=O)C(=C)C)ccc3o2)cc1]
RM-59
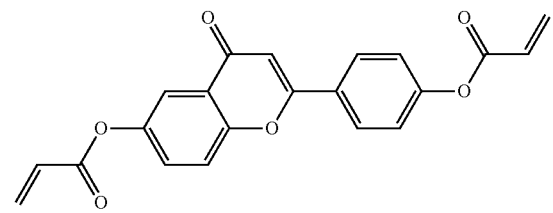 [SMILES: C=CC(=O)Oc1ccc(-c2cc(=O)c3cc(OC(=O)C=C)ccc3o2)cc1]
RM-60
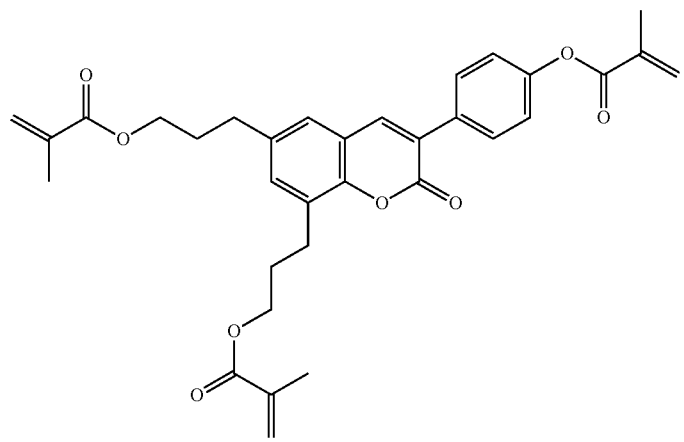 [SMILES: C=C(C)C(=O)OCCCc1cc(CCCOC(=O)C(=C)C)c2oc(=O)c(-c3ccc(OC(=O)C(=C)C)cc3)cc2c1]
RM-61
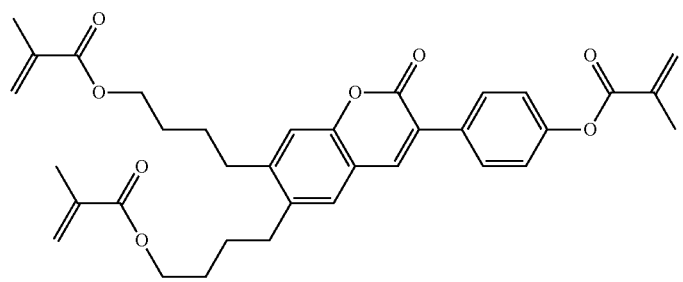 [SMILES: C=C(C)C(=O)OCCCCc1cc2cc(-c3ccc(OC(=O)C(=C)C)cc3)c(=O)oc2cc1CCCCOC(=O)C(=C)C]
RM-62

TABLE F-continued
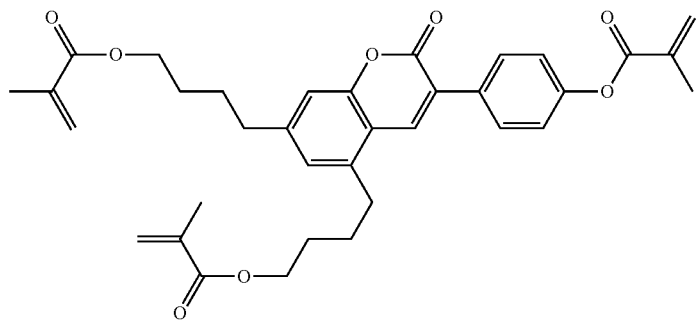 [SMILES: C=C(C)C(=O)OCCCCc1cc(CCCCOC(=O)C(=C)C)c2cc(-c3ccc(OC(=O)C(=C)C)cc3)c(=O)oc2c1]
RM-63
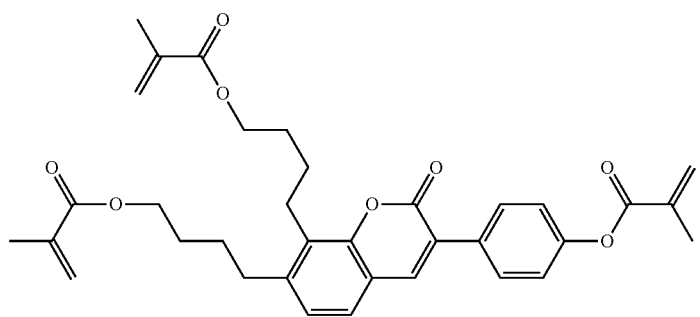 [SMILES: C=C(C)C(=O)OCCCCc1ccc2cc(-c3ccc(OC(=O)C(=C)C)cc3)c(=O)oc2c1CCCCOC(=O)C(=C)C]
RM-64
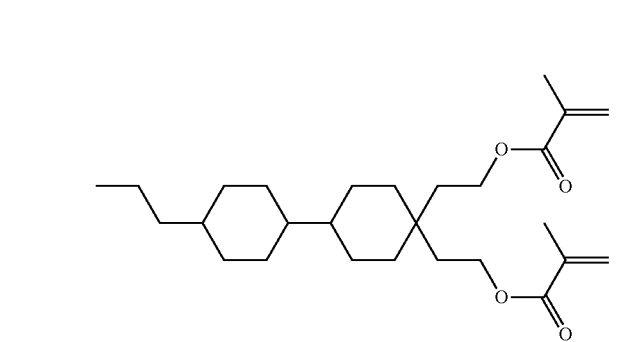 [SMILES: C=C(C)C(=O)OCCC1(CCOC(=O)C(=C)C)CCC(C2CCC(CCC)CC2)CC1]
RM-65
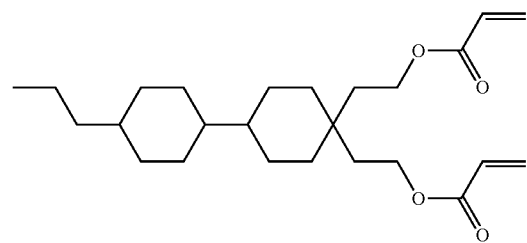 [SMILES: C=CC(=O)OCCC1(CCOC(=O)C=C)CCC(C2CCC(CCC)CC2)CC1]
RM-66
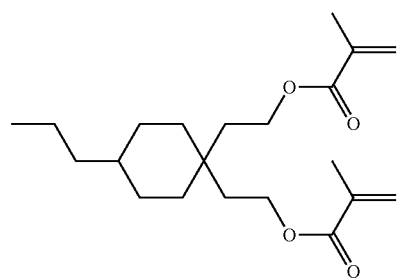 [SMILES: C=C(C)C(=O)OCCC1(CCOC(=O)C(=C)C)CCC(CCC)CC1]
RM-67

TABLE F-continued
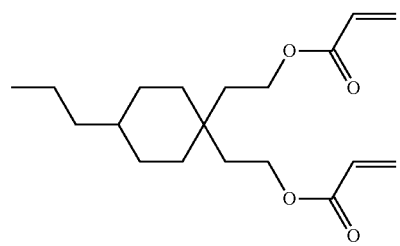 [SMILES: C=CC(=O)OCCC1(CCOC(=O)C=C)CCC(CCC)CC1]
RM-68
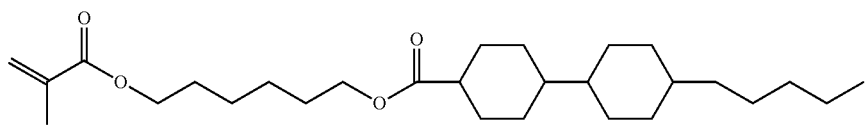 [SMILES: C=C(C)C(=O)OCCCCCCOC(=O)C1CCC(C2CCC(CCCCC)CC2)CC1]
RM-69
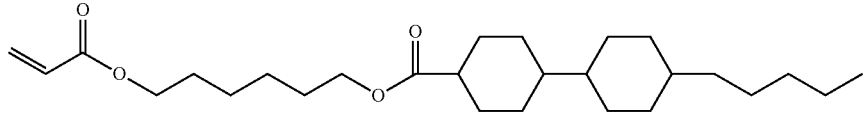
RM-70
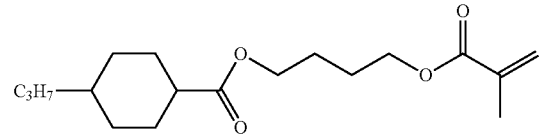
RM-71
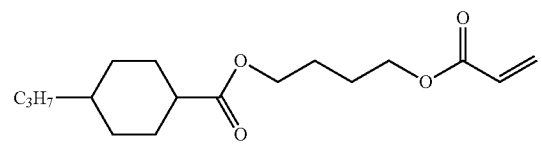
RM-72
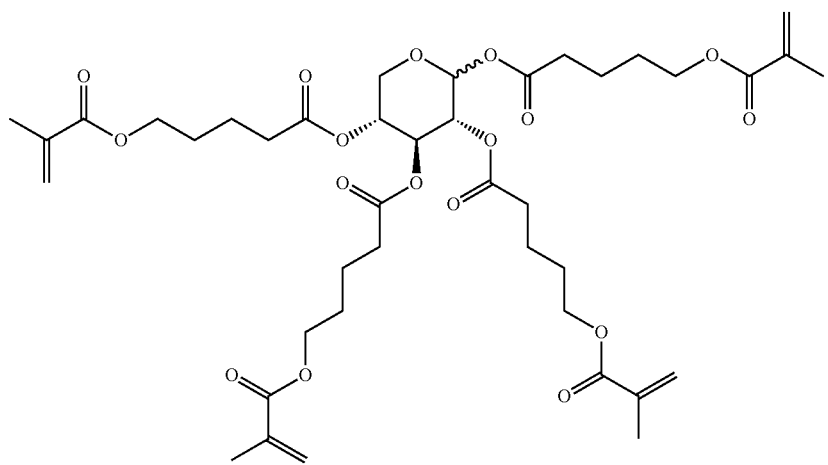 [SMILES: C=C(C)C(=O)OCCCCC(=O)OC1OC[C@@H](OC(=O)CCCCOC(=O)C(=C)C)[C@H](OC(=O)CCCCOC(=O)C(=C)C)[C@H]1OC(=O)CCCCOC(=O)C(=C)C]
RM-73

TABLE F-continued
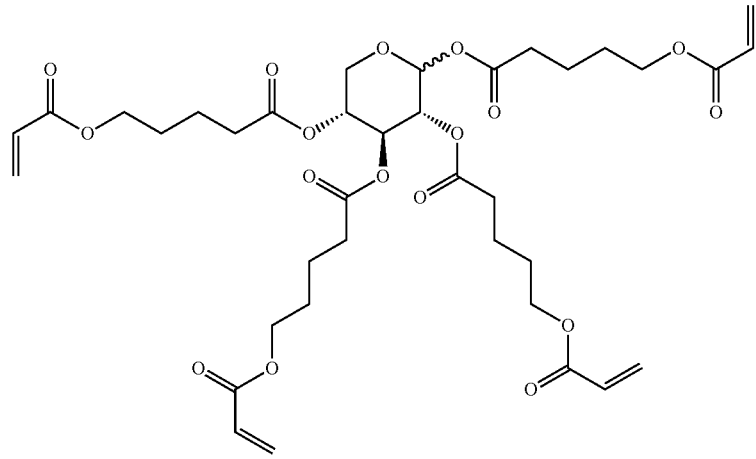 [SMILES: C=CC(=O)OCCCCC(=O)OC1OC[C@@H](OC(=O)CCCCOC(=O)C=C)[C@H](OC(=O)CCCCOC(=O)C=C)[C@H]1OC(=O)CCCCOC(=O)C=C]
RM-74
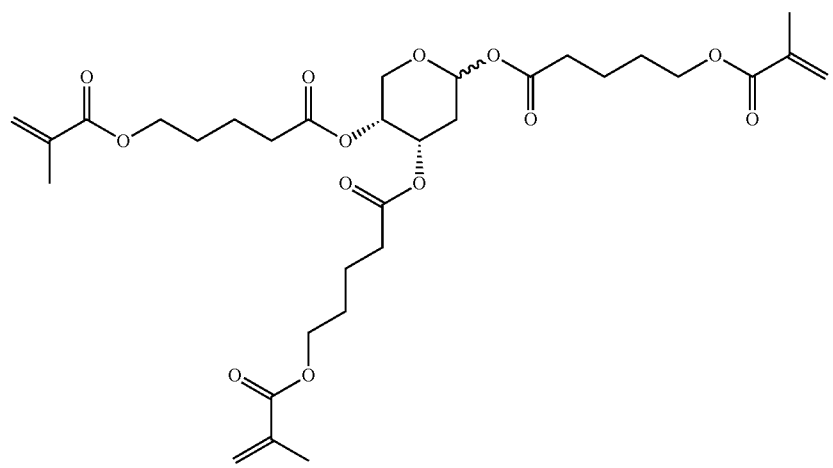 [SMILES: C=C(C)C(=O)OCCCCC(=O)OC1C[C@H](OC(=O)CCCCOC(=O)C(=C)C)[C@H](OC(=O)CCCCOC(=O)C(=C)C)CO1]
RM-75
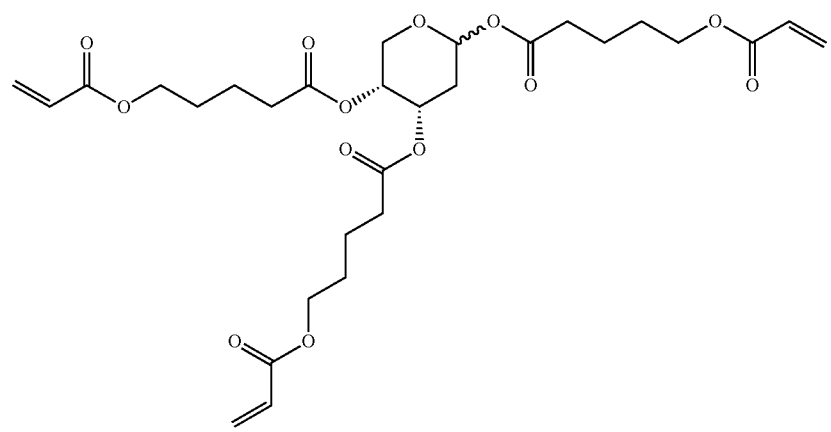 [SMILES: C=CC(=O)OCCCCC(=O)OC1C[C@H](OC(=O)CCCCOC(=O)C=C)[C@H](OC(=O)CCCCOC(=O)C=C)CO1]
RM-76
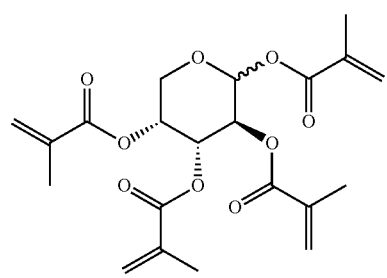 [SMILES: C=C(C)C(=O)OC1OC[C@@H](OC(=O)C(=C)C)[C@@H](OC(=O)C(=C)C)[C@@H]1OC(=O)C(=C)C]
RM-77

TABLE F-continued
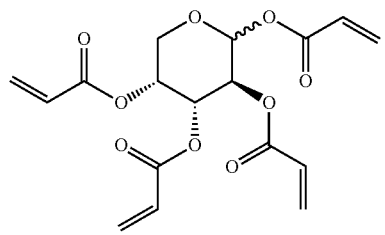 [SMILES: C=CC(=O)OC1OC[C@@H](OC(=O)C=C)[C@@H](OC(=O)C=C)[C@@H]1OC(=O)C=C] RM-78
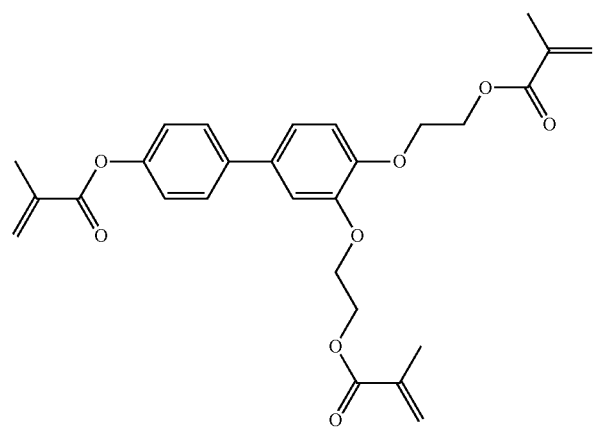 [SMILES: C=C(C)C(=O)OCCOc1ccc(-c2ccc(OC(=O)C(=C)C)cc2)cc1OCCOC(=O)C(=C)C] RM-79
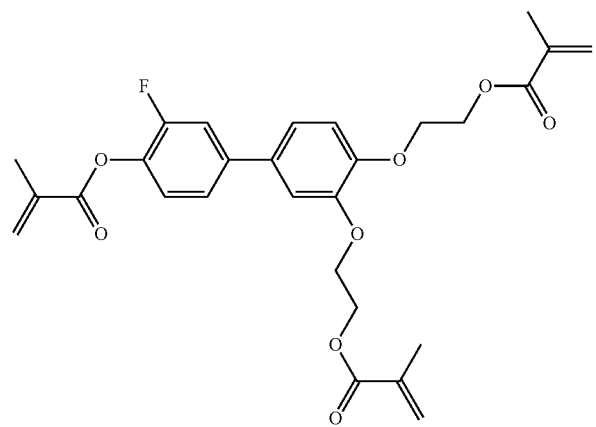 [SMILES: C=C(C)C(=O)OCCOc1ccc(-c2ccc(OC(=O)C(=C)C)c(F)c2)cc1OCCOC(=O)C(=C)C] RM-80
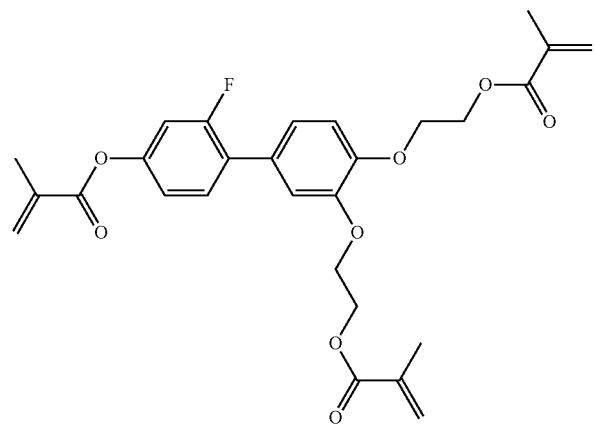 [SMILES: C=C(C)C(=O)OCCOc1ccc(-c2ccc(OC(=O)C(=C)C)cc2F)cc1OCCOC(=O)C(=C)C] RM-81

TABLE F-continued
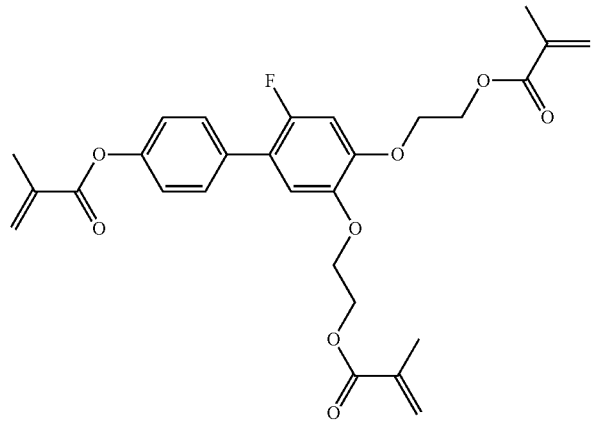 [SMILES: C=C(C)C(=O)OCCOc1cc(F)c(-c2ccc(OC(=O)C(=C)C)cc2)cc1OCCOC(=O)C(=C)C]
RM-82
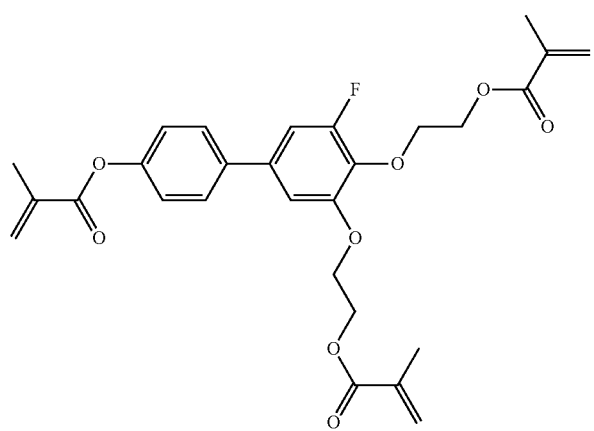 [SMILES: C=C(C)C(=O)OCCOc1cc(-c2ccc(OC(=O)C(=C)C)cc2)cc(F)c1OCCOC(=O)C(=C)C]
RM-83
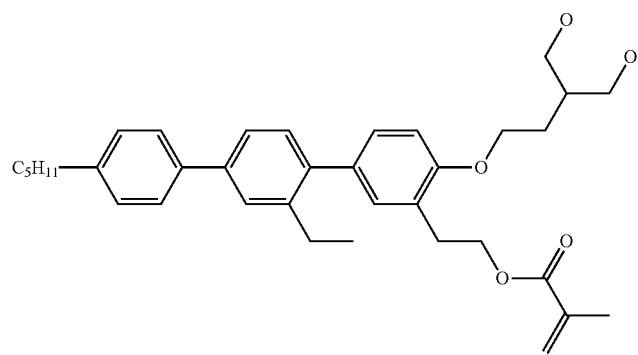
RM-84
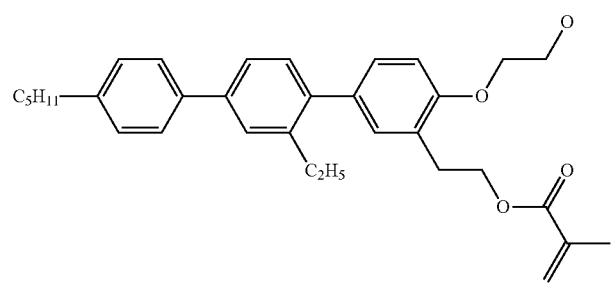
RM-85

Table F indicates possible reactive mesogens which can be used in the polymerisable component of LC media.

The LC media preferably comprise one or more reactive mesogens selected from the group consisting of compounds from Table F.

EXAMPLES

Mixture Example

The following liquid crystalline host mixture is prepared.

| No. | Compound | Amount in %-w/w |
|---|---|---|
| 1 | R-5011 | 2.0 |
| 2 | N-PP-ZI-9-Z-GP-F | 13.7 |
| 3 | N-PP-ZI-7-Z-GP-F | 21.4 |
| 4 | F-PGI-ZI-9-Z-PUU-N | 12.0 |
| 5 | F-UIGI-ZI-9-Z-GP-N | 22.0 |
| 6 | F-PGI-9-GP-F | 4.0 |
| 7 | N-GIZIP-7-PZG-N | 4.7 |
| 8 | CCP-3-2 | 3.5 |
| 9 | CC-5-V | 5.8 |
| 10 | CCY-4-O2 | 3.6 |
| 11 | CPY-3-O2 | 4.4 |
| 12 | PY-3-O2 | 2.9 |

To 95.9% w/w of this mixture, 0.1% Irgacure 651 and 4% w/w of RM-33 (Table F) are added to form mixture M1

Test Cell:

A fully ITO coated substrate (40 nm ITO electrode, 600 nm SiNx dielectric layer,) a polyimide solution (AL-3046, JSR Corporation) is spin coated and then dried for 90 min in an oven at 180° C. The approx. 50 nm thick orientation layer is rubbed with a rayon cloth. A fully ITO coated substrate is also coated with AL-3046(2nd substrate array), the surface of the PI is rubbed and the two substrate arrays are assembled by using a UV curable adhesive (loaded with 3 μm spacer) to align both rubbing directions in anti-parallel condition. From the assembled substrate array pair, the single cells are cutted out by scribing the glass surface with a glass scribing wheel. The resulting test cell is then filled with mixture (M1) by capillary action.

When no electric field is applied, the cholesteric liquid crystalline medium exhibits Grandjean texture due to planar anchoring conditions imposed by the anti-parallel rubbed polyimide alignment layers.

Example 1

Mixture M-1 was introduced into a test cell as described above.

The cell is heated to the isotropic phase of the LC medium (104° C.) and an electrode field (12 V, 610 Hz square wave driving) is applied to the LC medium between alignment electrode and driving electrode whilst cooling slowly (−2° C./min) from isotropic phase to 95° C. to give a ULH Alignment. The field was then increased to 20V and one half of the cell was cured by exposure to UV (375 nm) for 60 s, the field was reduced to 4V and the other half of the cell was cured by exposure to UV (375 nm) for 60 s. The switching behaviour of the cell was observed by polarising optical microscopy.

The half of the cell which had been cured while under the application of 20V ac was fully switching)(+/−45° at 24V. The half of the cell which had been cured while under the application of 4V ac was fully switching at 32V.

Example 2

Mixture M-1 was introduced into a test cell as described above.

The cell is heated to the isotropic phase of the LC medium (104° C.) and an electrode field (12 V, 610 Hz square wave driving) is applied to the LC medium between the opposing electrodes whilst cooling slowly (−2° C./min) from isotropic phase to 95° C. to give a ULH Alignment. The field was then increased to 20V and the cell was cured by exposure to UV (375 nm) for 60 s. The switching behaviour of the cell was observed by polarising optical microscopy (cf. Table 1).

Examples 3

Mixture M-1 was introduced into a test cell as described above.

The cell is heated to the isotropic phase of the LC medium (104° C.) and an electrode field (12 V, 610 Hz square wave driving) is applied to the LC medium between the opposing electrodes whilst cooling slowly (−2° C./min) from isotropic phase to 95° C. to give a ULH Alignment. The field was then decreased to 4V and the cell was cured by exposure to UV (375 nm) for 60 s. The switching behaviour of the cell was observed by polarising optical microscopy (cf. Table 1).

Comparative Example 1

Mixture M-1 was introduced into a test cell as described above.

The cell is heated to the isotropic phase of the LC medium (104° C.) and an electrode field (12 V, 610 Hz square wave driving) is applied to the LC medium between the opposing electrodes whilst cooling slowly (−2° C./min) from isotropic phase to 35° C. to give a ULH Alignment. The cell was cured by exposure to UV (375 nm) for 60 s, while no electric field is applied. The switching behaviour of the cell was observed by polarising optical microscopy (cf. Table 1).

Comparative Example 2

Mixture M-1 was introduced into a test cell as described above.

The cell is heated to the isotropic phase of the LC medium (104° C.) and an electrode field (12 V, 610 Hz square wave driving) is applied to the LC medium between alignment electrode and driving electrode whilst cooling slowly (−2° C./min) from isotropic phase to 95° C. to give a ULH Alignment. The switching behaviour of the uncured cell was observed by polarising optical microscopy (cf. Table 1).

The cell properties of examples 2 and 3 and comparative example 1 and 2 are summarized in the following table:

TABLE 1

| Cell properties | | | |
|---|---|---|---|
| Curing Conditions (° C./V) | e/K ($V^{-1}$) | Vop (V) | Switching time @15 V |
| 35/0 | 1.0 | 54 | 5.2 ms |
| 95/4 | 2.11 | 25 | 6 ms |
| 95/20 | 2.74 | 20 | 5 ms |
| uncured | 2.7 | 20 | 3.5 ms |

The invention claimed is:
1. A process of preparing a light modulation element comprising the steps of a) providing a layer of a liquid crystal medium comprising one or more bimesogenic compounds, one or more chiral compounds, and one or more polymerisable compounds between two substrates, wherein at least one substrate is transparent to light and an electrode is provided on each of the opposing substrates, b) heating the liquid crystal medium to its isotropic phase, c) cooling the liquid crystal medium between 1° C. up to 10° or less below the clearing point of the medium while applying voltage between the electrodes, which is sufficient to switch the liquid crystal medium between switched states, d) at the cooled temperature of between 1° C. up to 10° or less below the clearing point of the medium exposing said layer of the liquid crystal medium to photoradiation that induces photopolymerisation of the polymerisable compounds while applying voltage between the electrodes.

2. The process according to claim 1, wherein the LC medium in step b) is heated 1° C. or more above the clearing point of the medium.

3. The process according to claim 1, wherein the applied voltage in step c) is higher than in step d).

4. The process according to claim 1, wherein the voltage in step c) is from 5 to 30 V.

5. The process according to claim 1, wherein the proportion of the polymerisable compounds in the LC medium is from 0.1 to 20%, and the proportion of the unpolymerisable liquid crystal molecules in the LC medium is from 80 to 99.9%.

6. The process according to claim 1, wherein the cooling rate in step c) is −2° C./min or less.

7. The process according to claim 1, wherein the cooling rate in step c) is −10° C./min to −2° C./min.

8. The process according to claim 1, wherein the liquid crystal medium is cooled to between 1° C. to 5° C. below the clearing point of the medium, and the exposing of said layer of the liquid crystal medium to photoradiation is at said cooled temperature of between 1° C. to 5° C. below the clearing point of the medium.

9. The process according to claim 1, wherein the liquid crystal medium is cooled to between 5° C. to 10° C. below the clearing point of the medium, and the exposing of said layer of the liquid crystal medium to photoradiation is at said cooled temperature of between 5° C. to 10° C. below the clearing point of the medium.

10. The process according to claim 1, wherein the liquid crystal medium has a clearing point of 65° C. or more.

11. The process according to claim 1, wherein the liquid crystal medium has a clearing point of 80° C. or more.

12. The process according to claim 1, wherein the liquid crystal medium has a clearing point of 90° C. or more.

13. The process according to claim 1, wherein the liquid crystal medium comprises one or more bimesogenic compounds of formulae A-I to A-III,

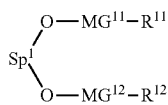

A-I

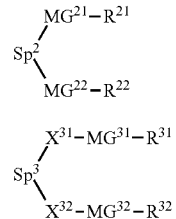

A-II

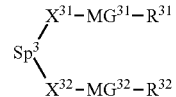

A-III wherein $R^{11}$, $R^{12}$, $R^{21}$, $R^{22}$, $R^{31}$ and $R^{32}$ are each independently H, F, Cl, CN, NCS or a straight-chain or branched alkyl group with 1 to 25 C atoms which is unsubstituted or mono- or polysubstituted by halogen or CN, in which optionally one or more non-adjacent $CH_2$ groups are replaced, in each occurrence independently from one another, by —O—, —S—, —NH—, —N(CH$_3$)—, —CO—, —COO—, —OCO—, —O—CO—O—, —S—CO—, —CO—S—, —CH=CH—, —CH=CF—, —CF=CF— or —C≡C— in such a manner that oxygen atoms are not linked directly to one another, $MG^{11}$, $MG^{12}$, $MG^{21}$, $MG^{22}$, $MG^{31}$ and $MG^{32}$ are each independently a mesogenic group, $Sp^1$, $Sp^2$ and $Sp^3$ are each independently a spacer group containing 5 to 40 C atoms, in which one or more non-adjacent $CH_2$ groups, with the exception of the $CH_2$ groups of $Sp^1$ linked to O-$MG^{11}$ and/or O-$MG^{12}$, of $Sp^2$ linked to $MG^{21}$ and/or $MG^{22}$ and of $Sp^3$ linked to $X^{31}$ and $X^{32}$, are optionally replaced by —O—, —S—, —NH—, —N(CH$_3$)—, —CO—, —O—CO—, —S—CO—, —O—COO—, —CO—S—, —CO—O—, —CH(halogen)-, —CH(CN)—, —CH=CH— or —C≡C—, in such a way that no two 0-atoms are adjacent to one another, no two —CH=CH— groups are adjacent to each other, and no two groups selected from the group consisting of —O—CO—, —S—CO—, —O—COO—, —CO—S—, —CO—O— and —CH=CH— are adjacent to each other, and $X^{31}$ and $X^{32}$ are independently from one another a linking group selected from —CO—O—, —O—CO—, —CH=CH—, —C≡C— or —S—, and, alternatively, one of them may also be either —O— or a single bond, and, again alternatively, one of them may be —O— and the other one a single bond.

14. The process according to claim 13, wherein $Sp^1$, $Sp^2$ and $Sp^3$ are each independently —(CH$_2$)$_n$—, wherein one or more —CH$_2$— groups are optionally replaced by —CO—, and n is an integer from 1 to 15.

15. The process according to claim 1, wherein the liquid crystal medium comprises one or more bimesogenic compounds of the following formulae

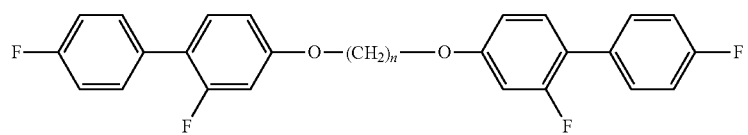
A-I-1
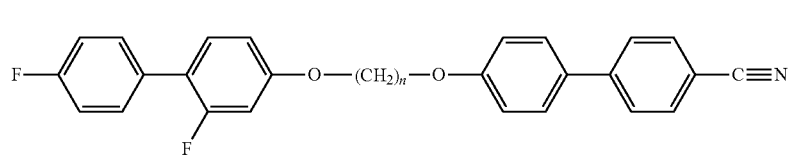
A-I-2
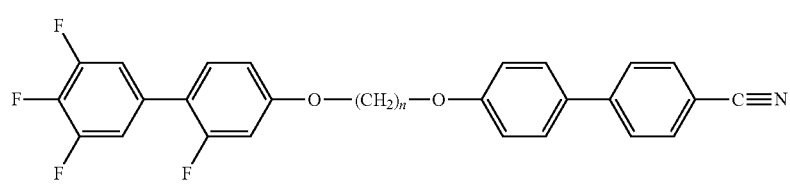
A-I-3
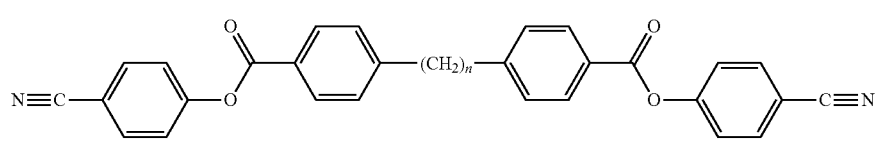
A-II-1
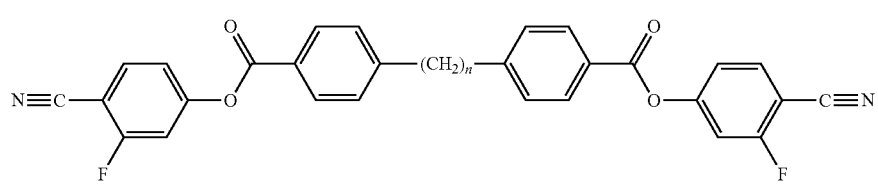
A-II-2
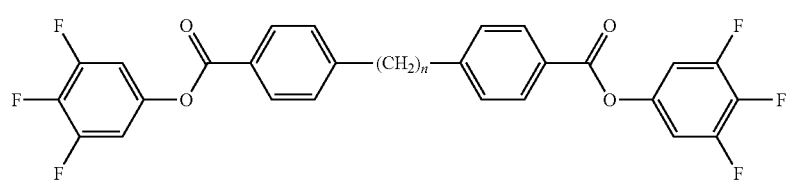
A-II-3
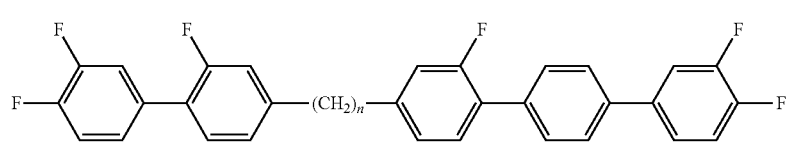
A-II-4
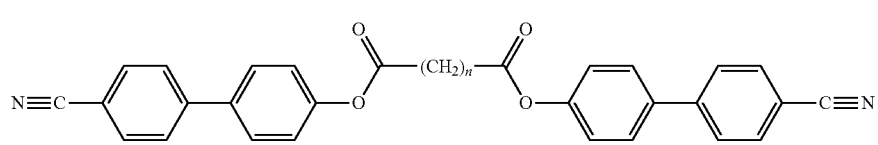
A-III-1
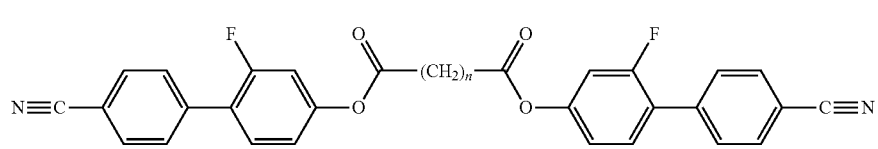
A-III-2
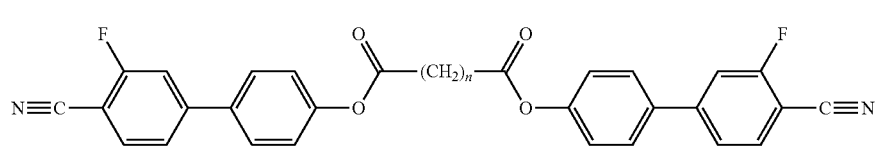
A-III-3

-continued
A-III-4
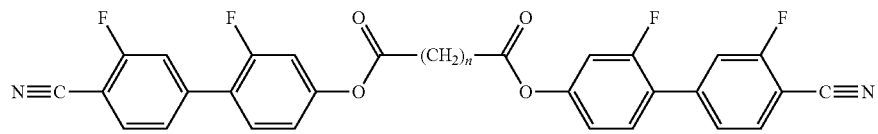
A-III-5
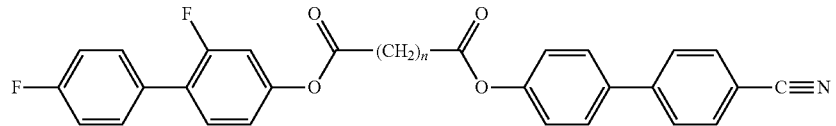
A-III-6
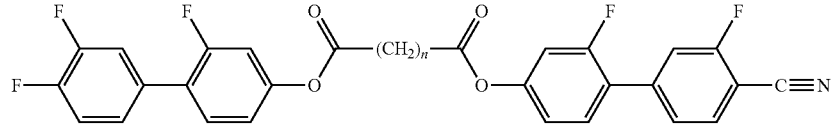
A-III-7
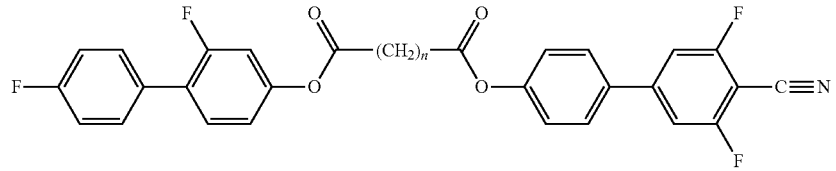
A-III-8
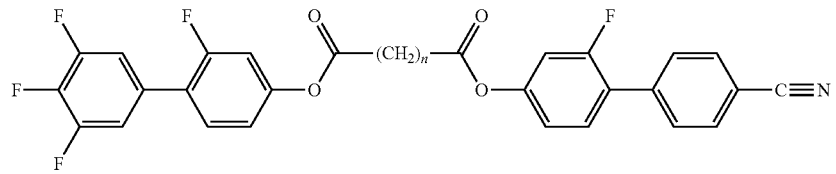
A-III-9
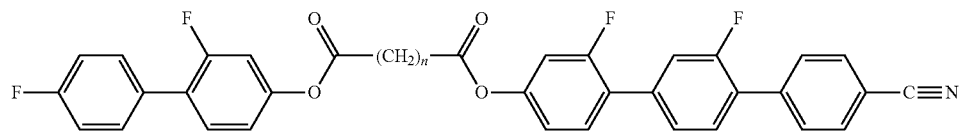
A-III-10
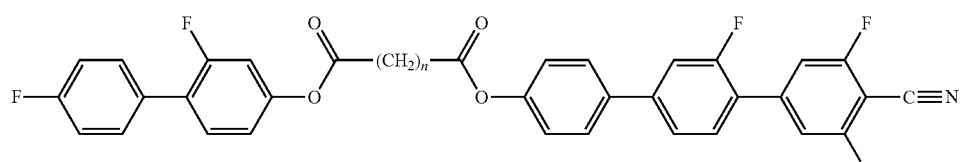
A-III-11
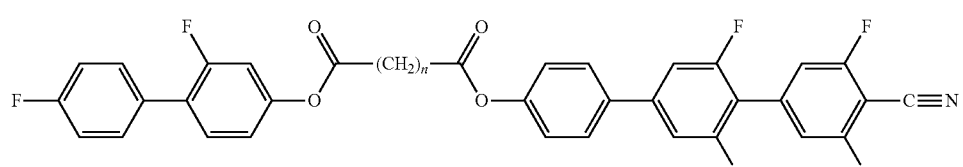
A-III-12
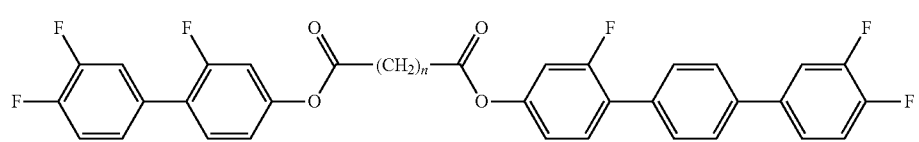
wherein n is an integer from 1 to 15.
16. The process according to claim 15, wherein n is 3, 5, 7 or 9.
* * * * *